(12) United States Patent
Mohanty et al.

(10) Patent No.: US 12,459,977 B2
(45) Date of Patent: Nov. 4, 2025

(54) OPTOGENETIC MODULATION BY MULTI-CHARACTERISTIC OPSINS FOR VISION RESTORATION AND OTHER APPLICATIONS THEREOF

(71) Applicant: Nanoscope Therapeutics, Inc., Bedford, TX (US)

(72) Inventors: Samarendra Mohanty, Arlington, TX (US); Subrata Batabyal, Arlington, TX (US)

(73) Assignee: Nanoscope Therapeutics, Inc., Bedford, TX (US)

( * ) Notice: Subject to any disclaimer, the term of this patent is extended or adjusted under 35 U.S.C. 154(b) by 730 days.

(21) Appl. No.: 17/532,849

(22) Filed: Nov. 22, 2021

(65) Prior Publication Data

US 2022/0162275 A1  May 26, 2022

Related U.S. Application Data

(63) Continuation-in-part of application No. 16/347,375, filed as application No. PCT/US2017/059922 on Nov. 3, 2017, now Pat. No. 11,180,537.

(60) Provisional application No. 62/418,196, filed on Nov. 6, 2016.

(51) Int. Cl.
  *C07K 14/47*   (2006.01)
  *A61K 9/00*    (2006.01)
  *A61P 27/02*   (2006.01)
  *C12N 15/86*   (2006.01)
  *A61K 38/00*   (2006.01)

(52) U.S. Cl.
  CPC .......... *C07K 14/47* (2013.01); *A61K 9/0048* (2013.01); *A61P 27/02* (2018.01); *C12N 15/86* (2013.01); *A61K 38/00* (2013.01)

(58) Field of Classification Search
  CPC .... C07K 14/47; C07K 14/705; A61K 9/0048; A61K 38/00; A61P 27/02; C12N 15/86; C12N 2750/14143
  See application file for complete search history.

(56) References Cited

PUBLICATIONS

Bowie (Science, 1990, 247:1306-1310) (Year: 1990).*
Burgess (J. Cell Biol. 111:2129-2138, 1990) (Year: 1990).*
Lazar (Mol. Cell. Biol., 8:1247-1252, 1988) (Year: 1988).*

* cited by examiner

*Primary Examiner* — Sudhakar Katakam
(74) *Attorney, Agent, or Firm* — ENTRALTA PLLC; Peter D. Weinstein; James F. Fleming

(57) ABSTRACT

This invention, in one aspect, relates generally to compositions and methods for modulating cellular activities by synthetic opsins. Further, the invention provides method for the use of synthetic opsins for vision restoration and other applications, wherein the amino acid sequence of the synthetic opsin is modified to provide enhanced light sensitivity, kinetics and ion-selectivity.

34 Claims, 21 Drawing Sheets

Specification includes a Sequence Listing.

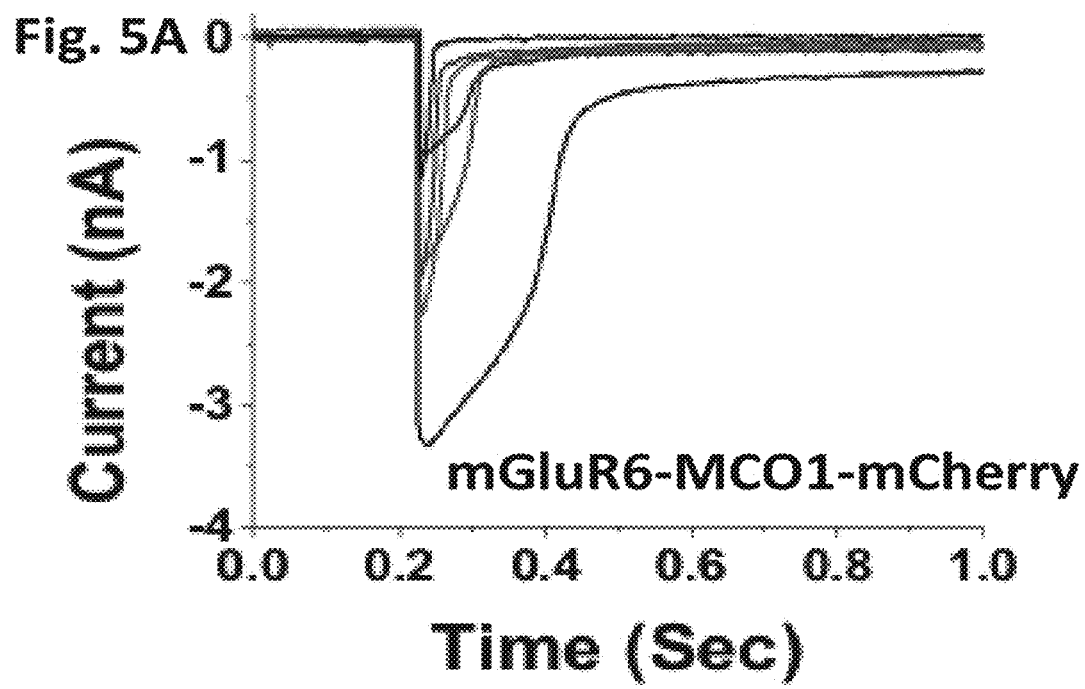
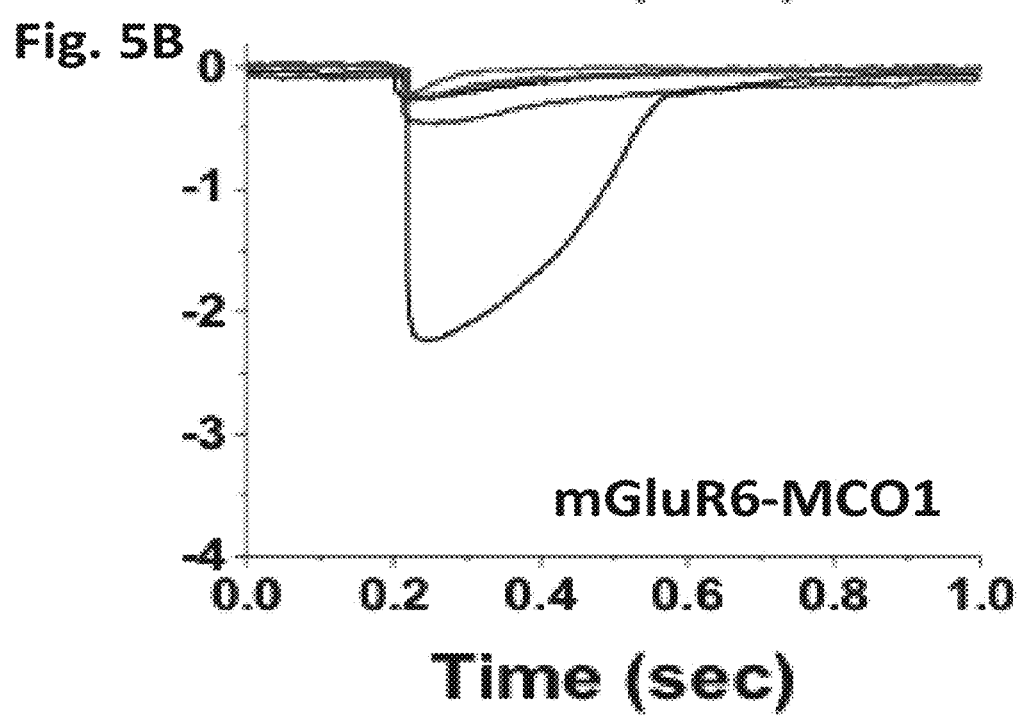

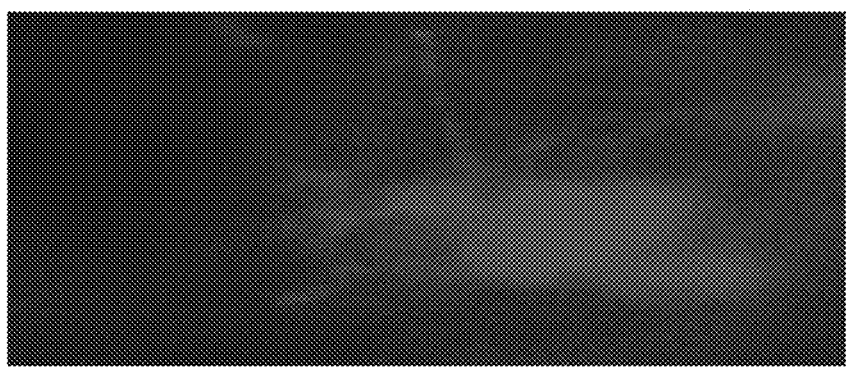
Fig. 8A
Fig. 8B
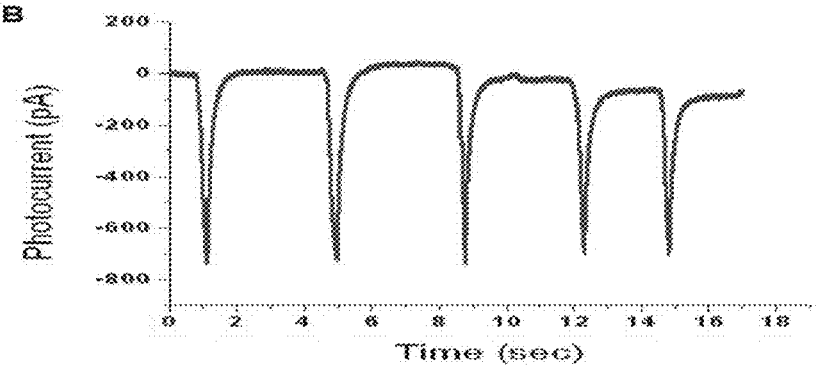
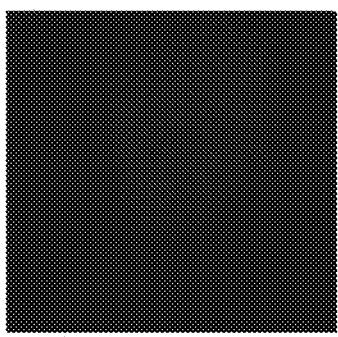
Fig. 9A
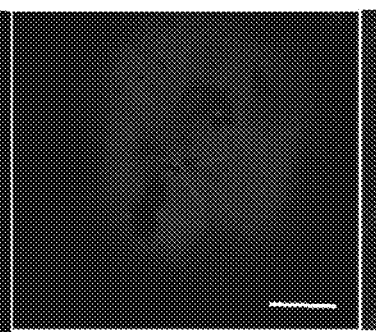
Fig. 9B
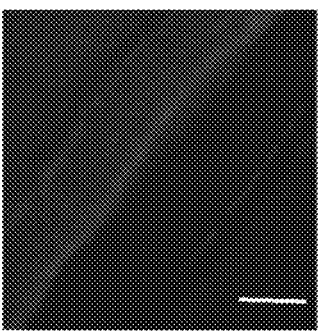
Fig. 9C
Fig. 9D
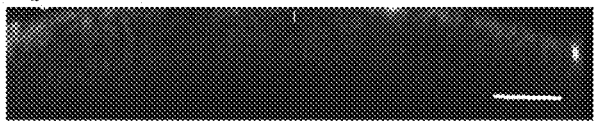
Fig. 9E
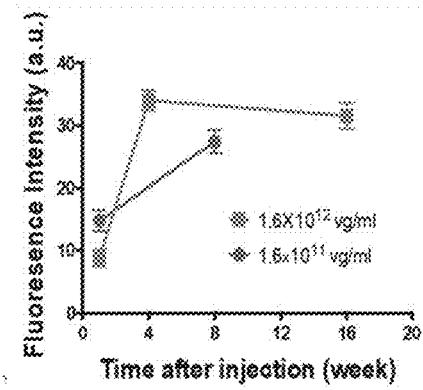
Fig. 9F
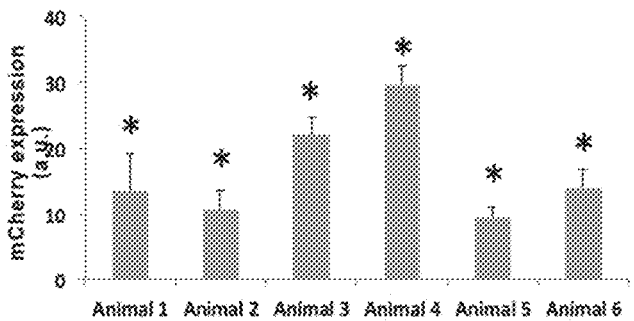

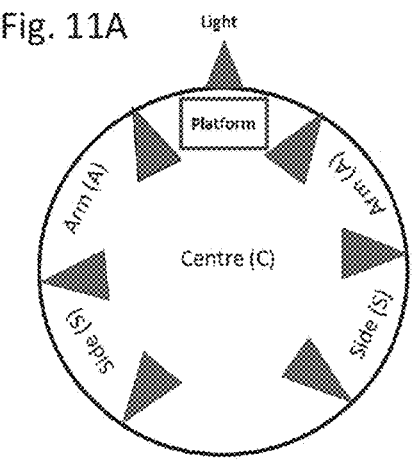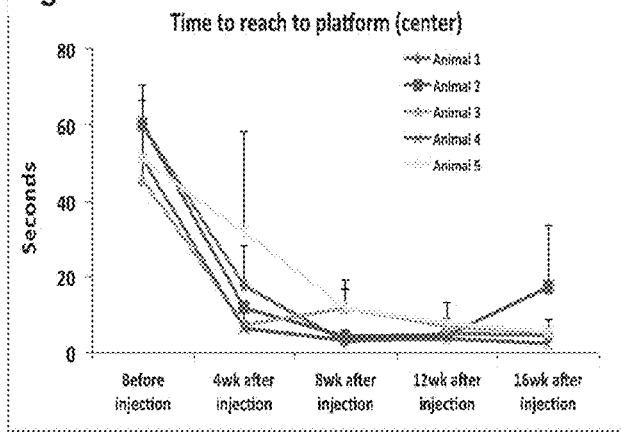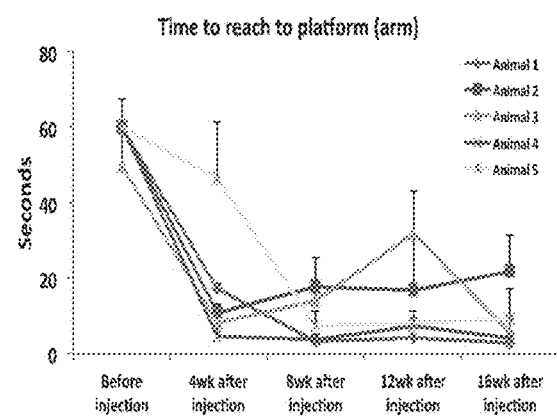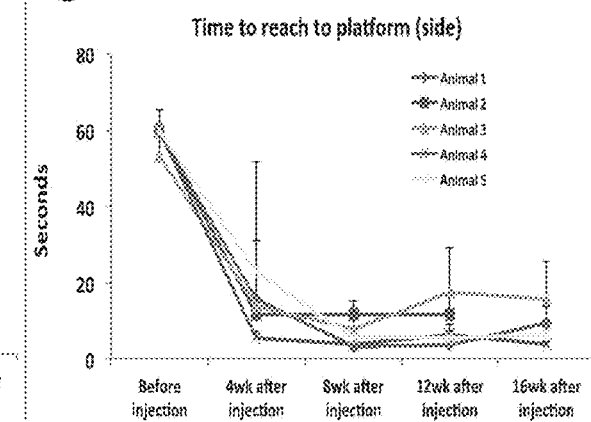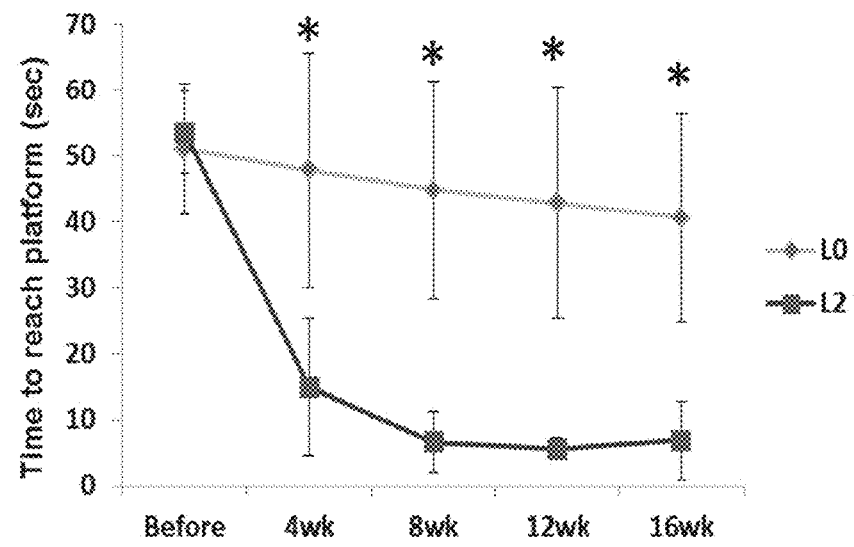

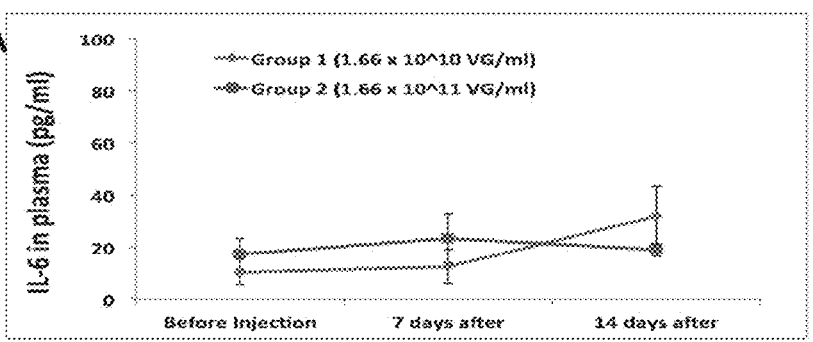
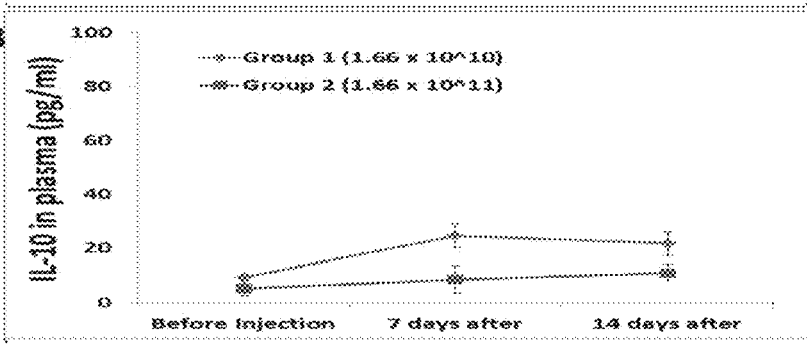
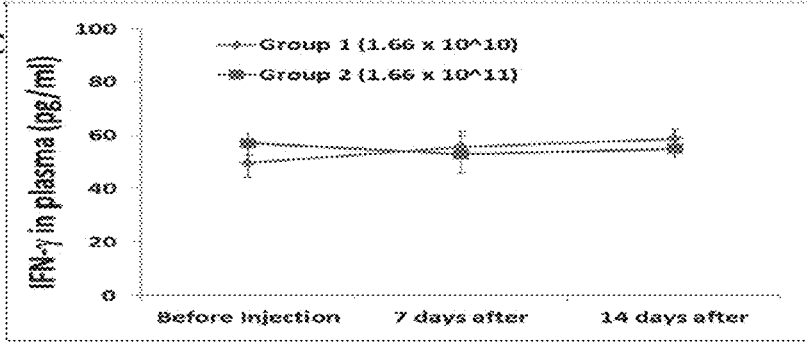
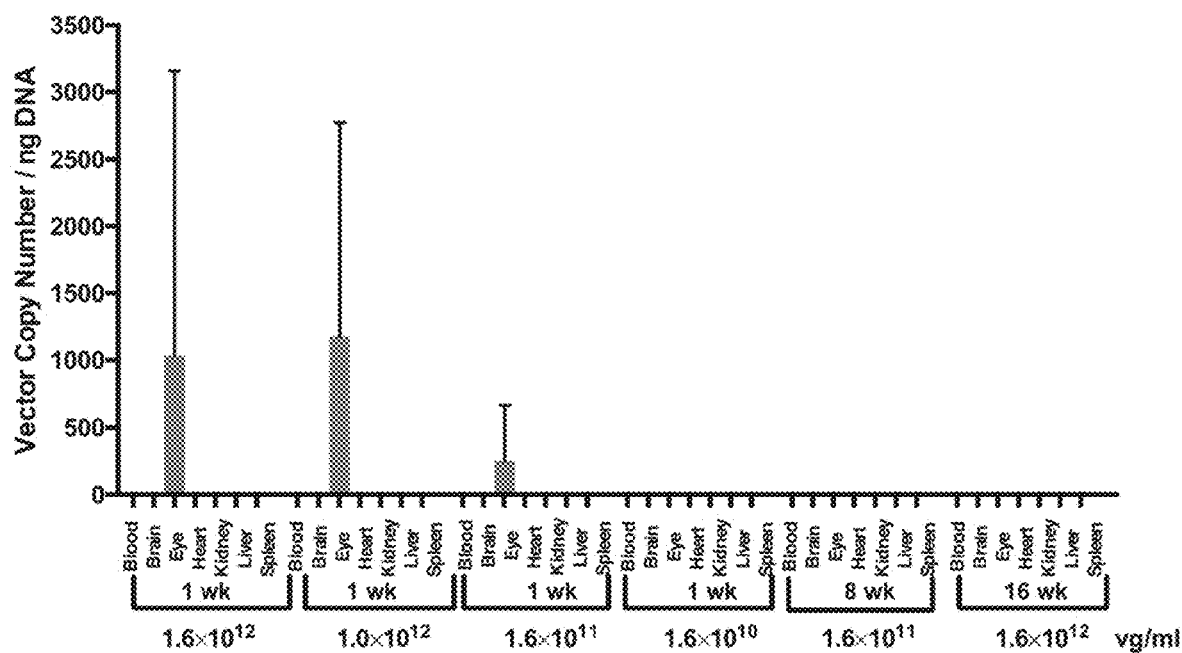
Fig. 17

Fig. 18A
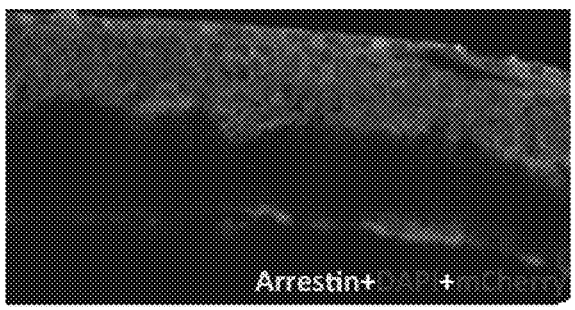
Arrestin+  +
Fig. 18B
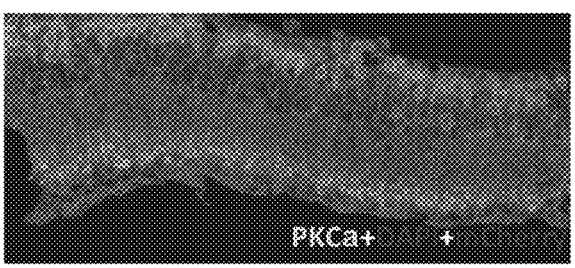
PKCa+  +
Fig. 18C
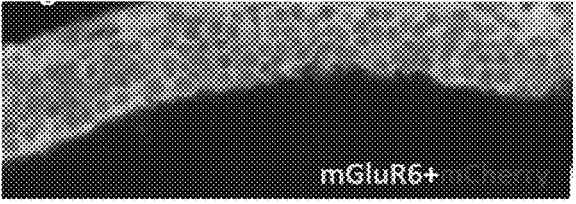
mGluR6+
Fig. 18D
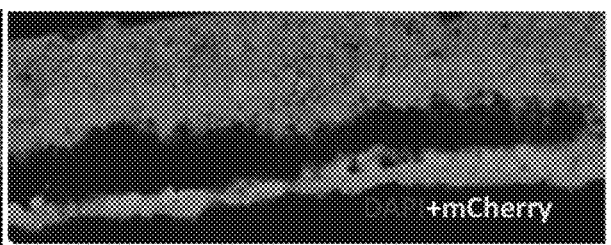
+mCherry
Fig. 18E
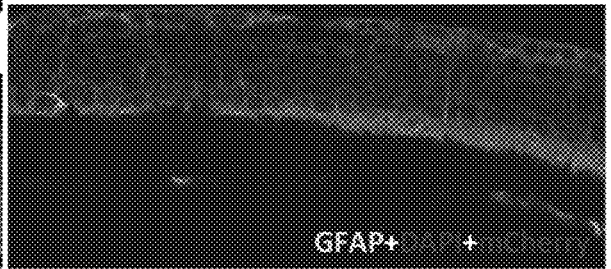
GFAP+  +
Fig. 18F
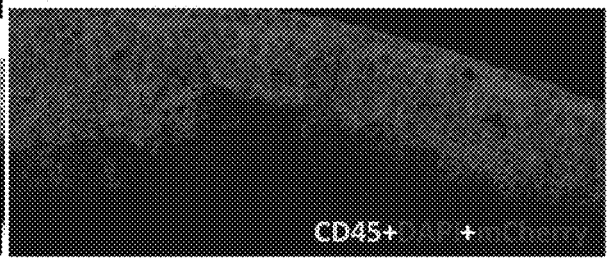
CD45+  +
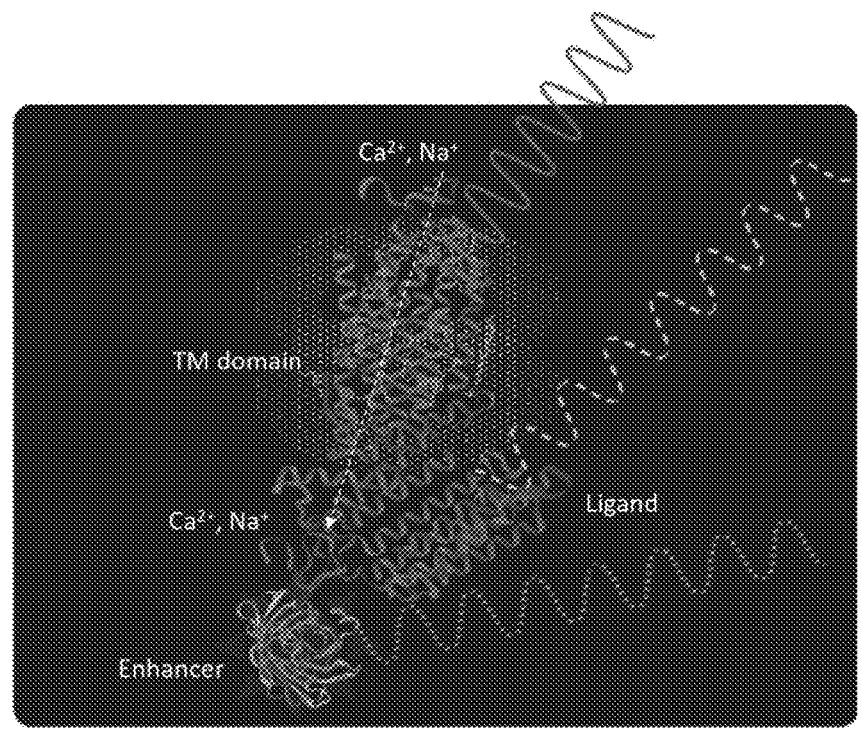
Fig. 19

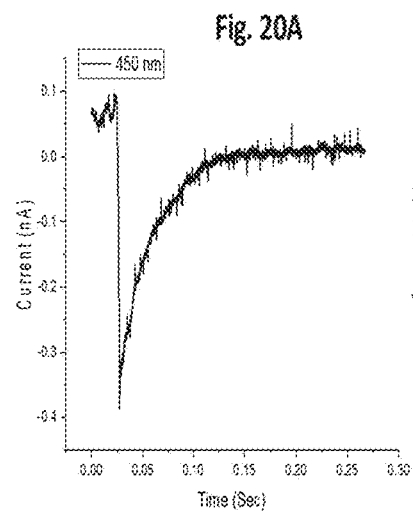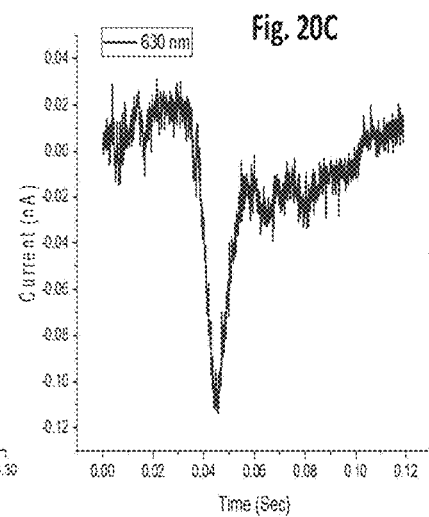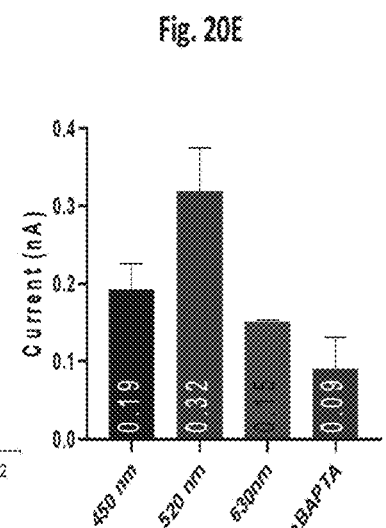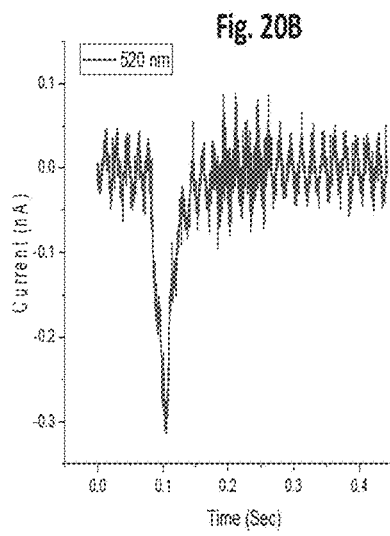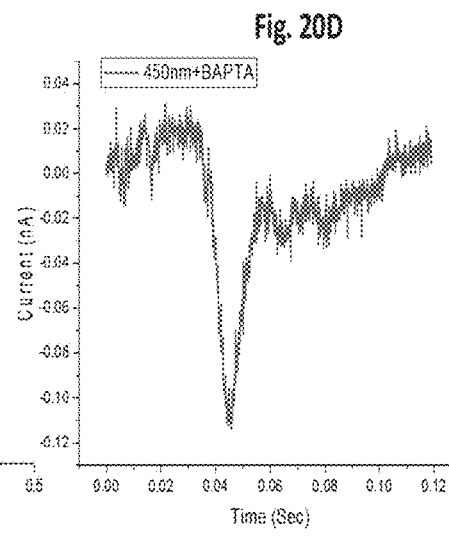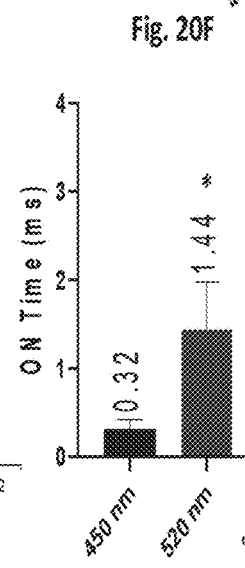

SEQUENCE LISTING

<160> NUMBER OF SEQ ID NOS: 12

<210> SEQ ID NO 1
<211> LENGTH: 665
<212> TYPE: PRT
<213> ORGANISM: artificial
<220> FEATURE:
<223> OTHER INFORMATION: Amino acid sequence of Multi-Characteristics
      Opsin-1 (MCO1)

<400> SEQUENCE: 1

Met Asp Tyr Gly Gly Ala Leu Ser Ala Val Gly Arg Glu Leu Leu Phe
1               5                   10                  15

Val Thr Asn Pro Val Val Asn Gly Ser Val Leu Val Pro Glu Asp
            20                  25                  30

Gln Cys Tyr Cys Ala Gly Trp Ile Glu Ser Arg Gly Thr Asn Gly Ala
            35                  40                  45

Gln Thr Ala Ser Asn Val Leu Gln Trp Leu Ala Ala Gly Phe Ser Ile
        50                  55                  60

Leu Leu Leu Met Phe Tyr Ala Tyr Gln Thr Trp Lys Ser Thr Cys Gly
65                  70                  75                  80

Trp Glu Glu Ile Tyr Val Cys Ala Ile Glu Met Val Lys Val Ile Leu
                85                  90                  95

Glu Phe Phe Phe Glu Phe Lys Asn Pro Ser Met Leu Tyr Leu Ala Thr
            100                 105                 110

Gly His Arg Val Gln Trp Leu Arg Tyr Ala Glu Trp Leu Leu Thr Cys
        115                 120                 125

Pro Val Ile Ser Ile His Leu Ser Asn Leu Thr Gly Leu Ser Asn Asp
        130                 135                 140

Tyr Ser Arg Arg Thr Met Gly Leu Leu Val Ser Asp Ile Gly Thr Ile
145                 150                 155                 160

Val Trp Gly Ala Thr Ser Ala Met Ala Thr Gly Tyr Val Lys Val Ile
                165                 170                 175

Phe Phe Cys Leu Gly Leu Cys Tyr Gly Ala Asn Thr Phe Phe His Ala
            180                 185                 190

Ala Lys Ala Tyr Ile Glu Gly Tyr His Thr Val Pro Lys Gly Arg Cys
        195                 200                 205

Arg Gln Val Val Thr Gly Met Ala Trp Leu Phe Phe Val Ser Trp Gly
210                 215                 220

Met Phe Pro Ile Leu Phe Ile Leu Gly Pro Glu Gly Phe Gly Val Leu
225                 230                 235                 240

Ser Val Tyr Gly Ser Thr Val Gly His Thr Ile Ile Asp Leu Met Ser
                245                 250                 255

Lys Asn Cys Trp Gly Leu Leu Gly His Tyr Leu Arg Val Leu Ile His
            260                 265                 270

Glu His Ile Leu Ile His Gly Asp Ile Arg Lys Thr Thr Lys Leu Asn
        275                 280                 285

Ile Gly Gly Thr Glu Ile Glu Val Glu Thr Leu Val Glu Asp Glu Ser
290                 295                 300

Glu Ala Gly Ser Val Asn Lys Gly Thr Gly Lys Met Ala Glu Leu Ile
305                 310                 315                 320

Ser Ser Ala Thr Arg Ser Leu Phe Ala Ala Gly Gly Ile Asn Pro Trp
                325                 330                 335

Pro Asn Pro Tyr His His Glu Asp Met Gly Cys Gly Gly Met Thr Pro
            340                 345                 350

Thr Gly Glu Cys Phe Ser Thr Glu Trp Trp Cys Asp Pro Ser Tyr Gly
        355                 360                 365

Leu Ser Asp Ala Gly Tyr Gly Tyr Cys Phe Val Glu Ala Thr Gly Gly
        370                 375                 380

Tyr Leu Val Val Gly Val Glu Lys Lys Gln Ala Trp Leu His Ser Arg
385                 390                 395                 400

Gly Thr Pro Gly Glu Lys Ile Gly Ala Gln Val Cys Gln Trp Ile Ala
            405                 410                 415

Phe Ser Ile Ala Ile Ala Leu Leu Thr Phe Tyr Gly Phe Ser Ala Trp
            420                 425                 430

Lys Ala Thr Cys Gly Trp Glu Glu Val Tyr Val Cys Val Glu Val
            435                 440                 445

Leu Phe Val Thr Leu Glu Ile Phe Lys Glu Phe Ser Ser Pro Ala Thr
            450                 455                 460

Val Tyr Leu Ser Thr Gly Asn His Ala Tyr Cys Leu Arg Tyr Phe Glu
465                 470                 475                 480

Trp Leu Leu Ser Cys Pro Val Ile Leu Ile Arg Leu Ser Asn Leu Ser
            485                 490                 495

Gly Leu Lys Asn Asp Tyr Ser Lys Arg Thr Met Gly Leu Ile Val Ser
            500                 505                 510

Cys Val Gly Met Ile Val Phe Gly Met Ala Ala Gly Leu Ala Thr Asp
            515                 520                 525

Trp Leu Lys Trp Leu Leu Tyr Ile Val Ser Cys Ile Tyr Gly Gly Tyr
            530                 535                 540

Met Tyr Phe Gln Ala Ala Lys Cys Tyr Val Glu Ala Asn His Ser Val
545                 550                 555                 560

Pro Lys Gly His Cys Arg Met Val Val Lys Leu Met Ala Tyr Ala Tyr
            565                 570                 575

Phe Ala Ser Trp Gly Ser Tyr Pro Ile Leu Trp Ala Val Gly Pro Glu
            580                 585                 590

Gly Leu Leu Lys Leu Ser Pro Tyr Ala Asn Ser Ile Gly His Ser Ile
            595                 600                 605

Cys Glu Ile Ile Ala Lys Glu Phe Trp Thr Phe Leu Ala His Leu
610                 615                 620

Arg Ile Lys Ile His Glu His Ile Leu Ile His Gly Asp Ile Arg Lys
625                 630                 635                 640

Thr Thr Lys Met Glu Ile Gly Gly Glu Val Glu Val Glu Glu Phe
            645                 650                 655

Val Glu Glu Glu Asp Glu Asp Thr Val
            660                 665

<210> SEQ ID NO 2
<211> LENGTH: 1995
<212> TYPE: DNA
<213> ORGANISM: artificial
<220> FEATURE:
<223> OTHER INFORMATION: DNA sequence of Multi-Characteristics Opsin-1
      (MCO1)

<400> SEQUENCE: 2
atggattatg gcggcgcgct gagcgcggtg ggccgcgaac tgctgtttgt gaccaacccg      60
gtggtggtga acggcagcgt gctggtgccg aagatcagt gctattgcgc gggctggatt     120
gaaagccgcg gcaccaacgg cgcgcagacc gcgagcaacg tgctgcagtg ctggcggcg     180 ggctttagca ttctgctgct gatgttttat gcgtatcaga cctggaaaag cacctgcggc     240
tgggaagaaa tttatgtgtg cgcgattgaa atggtgaaag tgattctgga attttttttt     300
gaatttaaaa acccgagcat gctgtatctg gcgaccggcc atcgcgtgca gtggctgcgc     360
tatgcggaat ggctgctgac ctgccccggtg attagcattc atctgagcaa cctgaccggc     420
ctgagcaacg attatagccg ccgcaccatg ggcctgctgg tgagcgatat tggcaccatt     480

-continued

```
gtgtggggcg cgaccagcgc gatggcgacc ggctatgtga aagtgatttt tttttgcctg    540
ggcctgtgct atggcgcgaa cacctttttt catgcggcga aagcgtatat tgaaggctat    600
cataccgtgc cgaaaggccg ctgccgccag gtggtgaccg gcatggcgtg gctgtttttt    660
gtgagctggg gcatgtttcc gattctgttt attctgggcc ggaaggcttt ggcgtgctg     720
agcgtgtatg cagcaccgt gggccatacc attattgatc tgatgagcaa aaactgctgg    780
ggcctgctgg ccattatct gcgcgtgctg attcatgaac atattctgat tcatggcgat    840
attcgcaaaa ccaccaaact gaacattggc ggcaccgaaa ttgaagtgga aaccctggtg    900
gaagatgaat cggaagcggg ctcggtgaac aaaggcaccg gcaaaatggc tgagctgatc    960
agcagcgcca ccagatctct gtttgccgcc ggaggcatca acccttggcc taacccctac   1020
caccacgagg acatgggctg tgaggaatg acacctacag gcgagtgctt cagcaccgag   1080
tggtggtgtg acccttctta cggactgagc gacgccggat acggatattg cttcgtggag   1140
gccacaggcg gctacctggt cgtgggagtg gagaagaagc aggcttggct gcacagcaga   1200
ggcacaccag gagaaaagat cggcgcccag gtctgccagt ggattgcttt cagcatcgcc   1260
atcgccctgc tgacattcta cggcttcagc gcctggaagg ccacttgcgg ttgggaggag   1320
gtctacgtct gttgcgtcga ggtgctgttc gtgaccctgg agatcttcaa ggagttcagc   1380
agccccgcca cagtgtacct gtctaccggc aaccacgcct attgcctgcg ctacttcgag   1440
tggctgctgt cttgccccgt gatcctgatc agactgagca acctgagcgg cctgaagaac   1500
gactacagca agcggaccat gggcctgatc gtgtcttgcg tgggaatgat cgtgttcggc   1560
atggccgcag gactggctac cgattggctc aagtggctgc tgtatatcgt gtcttgcatc   1620
tacgcggct acatgtactt ccaggccgcc aagtgctacg tggaagccaa ccacagcgtg   1680
cctaaaggcc attgccgcat ggtcgtgaag ctgatggcct acgcttactt cgcctcttgg   1740
ggcagctacc caatcctctg gcagtgggga ccagaaggac tgctgaagct gagcccttac   1800
gccaacagca tcggccacag catctgcgag atcatcgcca aggagttttg gaccttcctg   1860
gcccaccacc tgaggatcaa gatccacgag cacatcctga tccacggcga catccggaag   1920
accaccaaga tggagatcgg aggcgaggag gtggaagtgg aagagttcgt ggaggaggag   1980
gacgaggaca cagtg                                                     1995
```

<210> SEQ ID NO 3
<211> LENGTH: 658
<212> TYPE: PRT
<213> ORGANISM: artificial
<220> FEATURE:
<223> OTHER INFORMATION: Amino acid sequence of Multi-Characteristics Opsin-2 (MCO2)

<400> SEQUENCE: 3

```
Met Asp Tyr Gly Gly Ala Leu Ser Ala Val Gly Arg Glu Leu Leu Phe
1               5                   10                  15

Val Thr Asn Pro Val Val Asn Gly Ser Val Leu Val Pro Glu Asp
            20                  25                  30

Gln Cys Tyr Cys Ala Gly Trp Ile Glu Ser Arg Gly Thr Asn Gly Ala
        35                  40                  45

Gln Thr Ala Ser Asn Val Leu Gln Trp Leu Ala Ala Gly Phe Ser Ile
    50                  55                  60

Leu Leu Leu Met Phe Tyr Ala Tyr Gln Thr Trp Lys Ser Thr Cys Gly
65                  70                  75                  80
```

```
Trp Glu Glu Ile Tyr Val Cys Ala Ile Glu Met Val Lys Val Ile Leu
             85                  90                  95

Glu Phe Phe Phe Glu Phe Lys Asn Pro Ser Met Leu Tyr Leu Ala Thr
            100                 105                 110

Gly His Arg Val Gln Trp Leu Arg Tyr Ala Glu Trp Leu Leu Thr Cys
            115                 120                 125

Pro Val Ile Leu Ile His Leu Ser Asn Leu Thr Gly Leu Ser Asn Asp
130                 135                 140

Tyr Ser Arg Arg Thr Met Gly Leu Leu Val Ser Asp Ile Gly Thr Ile
145                 150                 155                 160

Val Trp Gly Ala Thr Ser Ala Met Ala Thr Gly Tyr Val Lys Val Ile
                165                 170                 175

Phe Phe Cys Leu Gly Leu Cys Tyr Gly Ala Asn Thr Phe Phe His Ala
            180                 185                 190

Ala Lys Ala Tyr Ile Glu Gly Tyr His Thr Val Pro Lys Gly Arg Cys
        195                 200                 205

Arg Gln Val Val Thr Gly Met Ala Trp Leu Phe Phe Val Ser Trp Gly
    210                 215                 220

Met Phe Pro Ile Leu Phe Ile Leu Gly Pro Glu Gly Phe Gly Val Leu
225                 230                 235                 240

Ser Val Tyr Gly Ser Thr Val Gly His Thr Ile Ile Asp Leu Met Ser
                245                 250                 255

Lys Asn Cys Trp Gly Leu Leu Gly His Tyr Leu Arg Val Leu Ile His
            260                 265                 270

Glu His Ile Leu Ile His Gly Asp Ile Arg Lys Thr Thr Lys Leu Asn
        275                 280                 285

Ile Gly Gly Thr Glu Ile Glu Val Glu Thr Leu Val Glu Asp Glu Ser
    290                 295                 300

Glu Ala Gly Ser Met Ala Glu Leu Ile Ser Ser Ala Thr Arg Ser Leu
305                 310                 315                 320

Phe Ala Ala Gly Gly Ile Asn Pro Trp Pro Asn Pro Tyr His His Glu
                325                 330                 335

Asp Met Gly Cys Gly Gly Met Thr Pro Thr Gly Glu Cys Phe Ser Thr
            340                 345                 350

Glu Trp Trp Cys Asp Pro Ser Tyr Gly Leu Ser Asp Ala Gly Tyr Gly
        355                 360                 365

Tyr Cys Phe Val Glu Ala Thr Gly Gly Tyr Leu Val Val Gly Val Glu
    370                 375                 380

Lys Lys Gln Ala Trp Leu His Ser Arg Gly Thr Pro Gly Glu Lys Ile
385                 390                 395                 400

Gly Ala Gln Val Cys Gln Trp Ile Ala Phe Ser Ile Ala Ile Ala Leu
                405                 410                 415

Leu Thr Phe Tyr Gly Phe Ser Ala Trp Lys Ala Thr Cys Gly Trp Glu
            420                 425                 430

Glu Val Tyr Val Cys Cys Val Glu Val Leu Phe Val Thr Leu Glu Ile
        435                 440                 445

Phe Lys Glu Phe Ser Ser Pro Ala Thr Val Tyr Leu Ser Thr Gly Asn
    450                 455                 460

His Ala Tyr Cys Leu Arg Tyr Phe Glu Trp Leu Leu Ser Cys Pro Val
465                 470                 475                 480

Ile Leu Ile Arg Leu Ser Asn Leu Ser Gly Leu Lys Asn Asp Tyr Ser
                485                 490                 495
```

```
Lys Arg Thr Met Gly Leu Ile Val Ser Cys Val Gly Met Ile Val Phe
                500                 505                 510
Gly Met Ala Ala Gly Leu Ala Thr Asp Trp Leu Lys Trp Leu Leu Tyr
            515                 520                 525
Ile Val Ser Cys Ile Tyr Gly Gly Tyr Met Tyr Phe Gln Ala Ala Lys
        530                 535                 540
Cys Tyr Val Glu Ala Asn His Ser Val Pro Lys Gly His Cys Arg Met
545                 550                 555                 560
Val Val Lys Leu Met Ala Tyr Ala Tyr Phe Ala Ser Trp Gly Ser Tyr
                565                 570                 575
Pro Ile Leu Trp Ala Val Gly Pro Glu Gly Leu Leu Lys Leu Ser Pro
            580                 585                 590
Tyr Ala Asn Ser Ile Gly His Ser Ile Cys Glu Ile Ile Ala Lys Glu
        595                 600                 605
Phe Trp Thr Phe Leu Ala His His Leu Arg Ile Lys Ile His Glu His
610                 615                 620
Ile Leu Ile His Gly Asp Ile Arg Lys Thr Thr Lys Met Glu Ile Gly
625                 630                 635                 640
Gly Glu Glu Val Glu Val Glu Glu Phe Val Glu Glu Glu Asp Glu Asp
                645                 650                 655
Thr Val

<210> SEQ ID NO 4
<211> LENGTH: 1998
<212> TYPE: DNA
<213> ORGANISM: artificial
<220> FEATURE:
<223> OTHER INFORMATION: DNA sequence of Multi-Characteristics Opsin-2
      (MCO2)

<400> SEQUENCE: 4
atggactatg gcggagcatt gagtgcagtt gggcgagaat tgctgttcgt gacgaatccc      60
gttgttgtaa acggaagtgt actggtgcca aagaccaat gttattgcgc gggctggata     120
gagtcgcgcg aacgaatgg agcacagaca gcgtccaacg tactgcaatg gctcgccgct     180
ggtttctcta tcctgttgtt gatgttctac gcatatcaaa cgtggaaaag cacctgcggg     240
tgggaggaaa tatatgtgtg tgccatcgag atggtaaaag taattttaga gttttttttt     300
gaattcaaga accctcaat gttgtacctt gctacggggc atagagttca atggcttcgg     360
tatgcggaat ggctcttgac atgtccagta atactaattc atcttagtaa cttaacggga     420
ctctctaacg actattcacg gcgtaccatg ggactactgg tgtcagacat gggacgata     480
gtatggggag cgacgagcgc aatggctaca ggctacgtaa aggttatctt tttctgcctc     540
gggctttgtt acggcgcgaa taccttcttt catgccgcaa aggcctacat agagggttac     600
cataccgtac cgaaagggcg gtgccggcaa gtcgtcacag aatggcttg ctcttctttt     660
gtgagttggg gaatgttccc tatcctattt atcttagggc ctgagggttt cggcgtgctt     720
agtgtttacg gcagtacggt cggtcacacg atcatcgacc tgatgtcaaa gaattgctgg     780
ggcttgcttg tcattatttt gcgtgtgtta atccacgaac atattctgat tcatggtgac     840
atccgaaaaa ctaccaaact caatattggc ggcacagaga tagaggttga acgttggtc     900
gaggacgagt ctgaagcggg gtcaatggcg gaactaattt catctgcaac acgtcgcta     960
tttgctgccg gggggataaa tccctggccc aaccegtatc accacgaaga tatgggatgc    1020
ggagggatga ctcccacagg agagtgtttt tcgaccgaat ggtggtgtga cccctcgtac    1080
```

```
gggttatcag atgcaggcta tggttattgt tcgtggagg ccacgggtgg ttatttagtc   1140
gtaggggtag agaagaaaca ggcatggctt cattcccggg gaaccccggg ggagaaaatt   1200
ggagctcagg tatgccagtg gatagcgttt tctatcgcga tagctctcct gacttttat    1260
ggattttcgg cttggaaggc cacgtgcgga tgggaagagg tatacgtatg ttgcgtcgaa   1320
gtgcttttcg taactctgga aatatttaaa gaattctcaa gtccggccac agtttatttg   1380
agcactggca accacgccta ttgtttgcgg tattttgagt ggctattatc ttgccctgtt   1440
attcttatac ggttatcaaa cctatcgggt ctgaagaatg attattccaa gagaaccatg   1500
ggcctaattg tcagttgcgt cgggatgatc gtgttcggga tggccgcggg tcttgcaacg   1560
gactggctta agtggctatt atacatcgtc agctgcattt acggtggtta catgtacttt   1620
caagcggcta agtgctatgt ggaggcgaac cattcagtcc cgaaaggcca ctgtcgcatg   1680
gtggttaagt taatggcgta tgcgtacttc gcttcgtggg gttcatatcc aatcctgtgg   1740
gcggtcggac ctgaaggtct cctgaaactg agccccctatg cgaactccat aggacattcc   1800
atctgtgaga tcatcgccaa ggaattctgg accttcttag ctcaccattt gcggattaag   1860
atccatgaac acattctcat tcacggtgat attaggaaaa ctaccaagat ggagataggt   1920
ggagaagagg tggaggtaga agagtttgta gaagaggagg acgaggacac tgtagtatca   1980
aaggggggaag aagacaat                                                1998
```

<210> SEQ ID NO 5
<211> LENGTH: 699
<212> TYPE: PRT
<213> ORGANISM: artificial
<220> FEATURE:
<223> OTHER INFORMATION: Amino acid sequence of Multi-Characteristics
      Opsin-1T (MCO1T)

<400> SEQUENCE: 5

```
Met Asp Tyr Gly Gly Ala Leu Ser Ala Val Gly Arg Glu Leu Leu Phe
1               5                   10                  15

Val Thr Asn Pro Val Val Asn Gly Ser Val Leu Val Pro Glu Asp
            20                  25                  30

Gln Cys Tyr Cys Ala Gly Trp Ile Glu Ser Arg Gly Thr Asn Gly Ala
        35                  40                  45

Gln Thr Ala Ser Asn Val Leu Gln Trp Leu Ala Ala Gly Phe Ser Ile
    50                  55                  60

Leu Leu Leu Met Phe Tyr Ala Tyr Gln Thr Trp Lys Ser Thr Cys Gly
65                  70                  75                  80

Trp Glu Glu Ile Tyr Val Cys Ala Ile Glu Met Val Lys Val Ile Leu
                85                  90                  95

Glu Phe Phe Phe Glu Phe Lys Asn Pro Ser Met Leu Tyr Leu Ala Thr
            100                 105                 110

Gly His Arg Val Gln Trp Leu Arg Tyr Ala Glu Trp Leu Leu Thr Cys
        115                 120                 125

Pro Val Ile Ser Ile His Leu Ser Asn Leu Thr Gly Leu Ser Asn Asp
    130                 135                 140

Tyr Ser Arg Arg Thr Met Gly Leu Leu Val Ser Asp Ile Gly Thr Ile
145                 150                 155                 160

Val Trp Gly Ala Thr Ser Ala Met Ala Thr Gly Tyr Val Lys Val Ile
                165                 170                 175

Phe Phe Cys Leu Gly Leu Cys Tyr Gly Ala Asn Thr Phe Phe His Ala
            180                 185                 190
```

```
Ala Lys Ala Tyr Ile Glu Gly Tyr His Thr Val Pro Lys Gly Arg Cys
        195                 200                 205

Arg Gln Val Val Thr Gly Met Ala Trp Leu Phe Phe Val Ser Trp Gly
        210                 215                 220

Met Phe Pro Ile Leu Phe Ile Leu Gly Pro Glu Gly Phe Gly Val Leu
225                 230                 235                 240

Ser Val Tyr Gly Ser Thr Val Gly His Thr Ile Ile Asp Leu Met Ser
                245                 250                 255

Lys Asn Cys Trp Gly Leu Leu Gly His Tyr Leu Arg Val Leu Ile His
                260                 265                 270

Glu His Ile Leu Ile His Gly Asp Ile Arg Lys Thr Thr Lys Leu Asn
        275                 280                 285

Ile Gly Gly Thr Glu Ile Glu Val Glu Thr Leu Val Glu Asp Glu Ser
        290                 295                 300

Glu Ala Gly Ser Val Asn Lys Gly Thr Gly Lys Thr Pro Ala Arg Trp
305                 310                 315                 320

Val Trp Ile Ser Leu Tyr Tyr Ala Ala Phe Tyr Val Val Met Thr Gly
                325                 330                 335

Leu Phe Ala Leu Cys Ile Tyr Val Leu Met Gln Thr Ile Met Ala Glu
                340                 345                 350

Leu Ile Ser Ser Ala Thr Arg Ser Leu Phe Ala Ala Gly Gly Ile Asn
        355                 360                 365

Pro Trp Pro Asn Pro Tyr His His Glu Asp Met Gly Cys Gly Gly Met
        370                 375                 380

Thr Pro Thr Gly Glu Cys Phe Ser Thr Glu Trp Trp Cys Asp Pro Ser
385                 390                 395                 400

Tyr Gly Leu Ser Asp Ala Gly Tyr Gly Tyr Cys Phe Val Glu Ala Thr
                405                 410                 415

Gly Gly Tyr Leu Val Val Gly Val Glu Lys Lys Gln Ala Trp Leu His
                420                 425                 430

Ser Arg Gly Thr Pro Gly Glu Lys Ile Gly Ala Gln Val Cys Gln Trp
        435                 440                 445

Ile Ala Phe Ser Ile Ala Ile Ala Leu Leu Thr Phe Tyr Gly Phe Ser
        450                 455                 460

Ala Trp Lys Ala Thr Cys Gly Trp Glu Glu Val Tyr Val Cys Cys Val
465                 470                 475                 480

Glu Val Leu Phe Val Thr Leu Glu Ile Phe Lys Glu Phe Ser Ser Pro
                485                 490                 495

Ala Thr Val Tyr Leu Ser Thr Gly Asn His Ala Tyr Cys Leu Arg Tyr
                500                 505                 510

Phe Glu Trp Leu Leu Ser Cys Pro Val Ile Leu Ile Arg Leu Ser Asn
        515                 520                 525

Leu Ser Gly Leu Lys Asn Asp Tyr Ser Lys Arg Thr Met Gly Leu Ile
        530                 535                 540

Val Ser Cys Val Gly Met Ile Val Phe Gly Met Ala Ala Gly Leu Ala
545                 550                 555                 560

Thr Asp Trp Leu Lys Trp Leu Tyr Ile Val Ser Cys Ile Tyr Gly
                565                 570                 575

Gly Tyr Met Tyr Phe Gln Ala Ala Lys Cys Tyr Val Glu Ala Asn His
                580                 585                 590

Ser Val Pro Lys Gly His Cys Arg Met Val Val Lys Leu Met Ala Tyr
        595                 600                 605
```

```
Ala Tyr Phe Ala Ser Trp Gly Ser Tyr Pro Ile Leu Trp Ala Val Gly
        610                 615                 620

Pro Glu Gly Leu Leu Lys Leu Ser Pro Tyr Ala Asn Ser Ile Gly His
    625                 630                 635                 640

Ser Ile Cys Glu Ile Ile Ala Lys Glu Phe Trp Thr Phe Leu Ala His
                645                 650                 655

His Leu Arg Ile Lys Ile His Glu His Ile Leu Ile His Gly Asp Ile
            660                 665                 670

Arg Lys Thr Thr Lys Met Glu Ile Gly Gly Glu Val Glu Val Glu
    675                 680                 685

Glu Phe Val Glu Glu Glu Asp Glu Asp Thr Val
    690                 695

<210> SEQ ID NO 6
<211> LENGTH: 2097
<212> TYPE: DNA
<213> ORGANISM: artificial
<220> FEATURE:
<223> OTHER INFORMATION: DNA sequence of Multi-Characteristics Opsin-1T
      (MCO1T)

<400> SEQUENCE: 6
atggattacg gaggagcact gagcgctgtt ggccgcgagt tgctatttgt gaccaacccc    60
gtcgtggtca atggcagcgt ccttgtgcct gaggatcaat gttattgcgc tgggtggatt   120
gaatcccgag gtacaaatgg tgcccagacg gcaagcaacg ttttgcaatg ctagcagct   180 gggttttcaa ttctactttt aatgttttac gcttatcaaa cctggaagag tacatgtggc   240
tgggaggaaa tttatgtctg cgctattgaa atggttaaag taattttgga atttttttt   300 gaatttaaga atccatcaat gttgtatctt gccacaggtc acagggtcca atggctccga   360
tacgcggaat ggcttctaac ttgccctgtt atttccattc acctaagcaa tctgactggc   420
ctttcgaatg actatagcag acgcaccatg ggactgttag ttagtgacat agggactata   480
gtttggggtg ccactagcgc catggcgacc ggttatgtta agtaatttt tttctgcctt   540 gggttgtgtt atggcgctaa cacttttttc cacgctgcta agcatatat agaagggtac   600 catacggtgc ccaaaggaag atgtcgccaa gtagttacag ggatggcgtg gctgttcttt   660
gtgagctggg ggatgttccc tatactgttt atccttggtc cagagggttt tggagtccta   720
agcgtgtacg gcagtactgt tgggcatact ataatagatt tgatgagcaa aaactgctgg   780
gggcttctcg ggcattattt acgagttctt attcacgaac atattttaat tcatggggat   840
atcagaaaaa caacgaaact aaatatagga ggcacggaaa tagaggttga aacgctcgtc   900
gaagacgaat cagaggccgg ctccgtgaat aagggaactg gtaaaactcc tgctcgctgg   960
gtatggatat cgctttacta cgcagcattt tacgtagtta tgactgggct ttttgctttg  1020
tgcatatacg tgctaatgca gacgattatg gctgagctaa tttcatctgc aactagatcc  1080
cttttcgcgg caggagggat caaccccctgg cccaatccat atcatcatga agatatgggc  1140
tgtggcggta tgaccccaac tggtgagtgc ttttctaccg aatggtggtg tgatccgagt  1200
tacggtctgt cagatgctgg gtatggttat tgctttgtcg aagccacggg gggatacctt  1260
gtcgtcggag tagagaaaaa acaggcctgg ctccattccc gggggacccc aggagagaag  1320
ataggggccc aagtttgcca gtggatcgca tttagtattg cgatcgcatt actgacattc  1380
tatggtttct cagcgtggaa ggcaacctgc ggctgggagg aggtttacgt atgctgtgtt  1440
gaggtactgt tcgtaaccct tgagattttc aaagagtttt cttctccggc gacggtctat  1500
```

```
ctcagtaccg gtaaccatgc atattgttta cgttatttcg aatggttgct ttcttgccca   1560
gtgattttga tacgcttgag taatttatct ggcctaaaga acgactatag caagcgaacc   1620
atgggactta ttgtatcttg tgttggcatg atagttttg gtatggcagc cgggctcgcc    1680
actgactggc tgaagtggtt gctctatata gtgagctgta tttatggtgg ctacatgtac   1740
tttcaggcgg ccaagtgtta cgttgaagca aaccattcgg tacctaaagg acattgccgt   1800
atggtagtta agctgatggc gtatgcgtac ttcgcgagct ggggcagcta ccccattctg   1860
tgggcggtgg gaccagaggg gttacttaag ttgtcgccct atgctaattc aataggccat   1920
agcatctgtg agattatcgc gaaggaattt tggactttcc tagcacatca ccttcgaatt   1980
aaaatacacg aacacatact cattcacggg gacatacgca agacaaccaa gatggaaatc   2040
ggaggtgagg aagtggaagt agaggagttt gtagaggagg aagatgagga cacggtt     2097
```

<210> SEQ ID NO 7
<211> LENGTH: 691
<212> TYPE: PRT
<213> ORGANISM: artificial
<220> FEATURE:
<223> OTHER INFORMATION: Amino acid sequence of Multi-Characteristics Opsin-2T (MCO2T)

<400> SEQUENCE: 7

```
Met Asp Tyr Gly Gly Ala Leu Ser Ala Val Gly Arg Glu Leu Leu Phe
1               5                   10                  15

Val Thr Asn Pro Val Val Asn Gly Ser Val Leu Val Pro Glu Asp
            20                  25                  30

Gln Cys Tyr Cys Ala Gly Trp Ile Glu Ser Arg Gly Thr Asn Gly Ala
        35                  40                  45

Gln Thr Ala Ser Asn Val Leu Gln Trp Leu Ala Ala Gly Phe Ser Ile
    50                  55                  60

Leu Leu Leu Met Phe Tyr Ala Tyr Gln Thr Trp Lys Ser Thr Cys Gly
65                  70                  75                  80

Trp Glu Glu Ile Tyr Val Cys Ala Ile Glu Met Val Lys Val Ile Leu
                85                  90                  95

Glu Phe Phe Phe Glu Phe Lys Asn Pro Ser Met Leu Tyr Leu Ala Thr
            100                 105                 110

Gly His Arg Val Gln Trp Leu Arg Tyr Ala Glu Trp Leu Leu Thr Cys
        115                 120                 125

Pro Val Ile Leu Ile His Leu Ser Asn Leu Thr Gly Leu Ser Asn Asp
    130                 135                 140

Tyr Ser Arg Arg Thr Met Gly Leu Leu Val Ser Asp Ile Gly Thr Ile
145                 150                 155                 160

Val Trp Gly Ala Thr Ser Ala Met Ala Thr Gly Tyr Val Lys Val Ile
                165                 170                 175

Phe Phe Cys Leu Gly Leu Cys Tyr Gly Ala Asn Thr Phe Phe His Ala
            180                 185                 190

Ala Lys Ala Tyr Ile Glu Gly Tyr His Thr Val Pro Lys Gly Arg Cys
        195                 200                 205

Arg Gln Val Val Thr Gly Met Ala Trp Leu Phe Phe Val Ser Trp Gly
    210                 215                 220

Met Phe Pro Ile Leu Phe Ile Leu Gly Pro Glu Gly Phe Gly Val Leu
225                 230                 235                 240

Ser Val Tyr Gly Ser Thr Val Gly His Thr Ile Ile Asp Leu Met Ser
                245                 250                 255
```

```
Lys Asn Cys Trp Gly Leu Leu Gly His Tyr Leu Arg Val Leu Ile His
            260                 265                 270

Glu His Ile Leu Ile His Gly Asp Ile Arg Lys Thr Thr Lys Leu Asn
            275                 280                 285

Ile Gly Gly Thr Glu Ile Glu Val Glu Thr Leu Val Glu Asp Glu Ser
            290                 295                 300

Glu Ala Gly Ser Pro Ala Arg Trp Val Trp Ile Ser Leu Tyr Ala Ala
305                 310                 315                 320

Ala Phe Tyr Val Val Met Thr Gly Leu Phe Ala Leu Cys Ile Tyr Val
                    325                 330                 335

Leu Met Gln Thr Ile Met Ala Glu Leu Ile Ser Ser Ala Thr Arg Ser
            340                 345                 350

Leu Phe Ala Ala Gly Ile Asn Pro Trp Pro Asn Pro Tyr His His
            355                 360                 365

Glu Asp Met Gly Cys Gly Gly Met Thr Pro Thr Gly Glu Cys Phe Ser
            370                 375                 380

Thr Glu Trp Trp Cys Asp Pro Ser Tyr Gly Leu Ser Asp Ala Gly Tyr
385                 390                 395                 400

Gly Tyr Cys Phe Val Glu Ala Thr Gly Gly Tyr Leu Val Val Gly Val
                    405                 410                 415

Glu Lys Lys Gln Ala Trp Leu His Ser Arg Gly Thr Pro Gly Glu Lys
            420                 425                 430

Ile Gly Ala Gln Val Cys Gln Trp Ile Ala Phe Ser Ile Ala Ile Ala
            435                 440                 445

Leu Leu Thr Phe Tyr Gly Phe Ser Ala Trp Lys Ala Thr Cys Gly Trp
            450                 455                 460

Glu Glu Val Tyr Val Cys Cys Val Glu Val Leu Phe Val Thr Leu Glu
465                 470                 475                 480

Ile Phe Lys Glu Phe Ser Ser Pro Ala Thr Val Tyr Leu Ser Thr Gly
                    485                 490                 495

Asn His Ala Tyr Cys Leu Arg Tyr Phe Glu Trp Leu Leu Ser Cys Pro
            500                 505                 510

Val Ile Leu Ile Arg Leu Ser Asn Leu Ser Gly Leu Lys Asn Asp Tyr
            515                 520                 525

Ser Lys Arg Thr Met Gly Leu Ile Val Ser Cys Val Gly Met Ile Val
            530                 535                 540

Phe Gly Met Ala Ala Gly Leu Ala Thr Asp Trp Leu Lys Trp Leu Leu
545                 550                 555                 560

Tyr Ile Val Ser Cys Ile Tyr Gly Gly Tyr Met Tyr Phe Gln Ala Ala
                    565                 570                 575

Lys Cys Tyr Val Glu Ala Asn His Ser Val Pro Lys Gly His Cys Arg
            580                 585                 590

Met Val Val Lys Leu Met Ala Tyr Ala Tyr Phe Ala Ser Trp Gly Ser
            595                 600                 605

Tyr Pro Ile Leu Trp Ala Val Gly Pro Glu Gly Leu Leu Lys Leu Ser
            610                 615                 620

Pro Tyr Ala Asn Ser Ile Gly His Ser Ile Cys Glu Ile Ile Ala Lys
625                 630                 635                 640

Glu Phe Trp Thr Phe Leu Ala His His Leu Arg Ile Lys Ile His Glu
                    645                 650                 655

His Ile Leu Ile His Gly Asp Ile Arg Lys Thr Thr Lys Met Glu Ile
            660                 665                 670
```

Gly Gly Glu Glu Val Glu Val Glu Glu Phe Val Glu Glu Glu Asp Glu
        675                 680                 685

Asp Thr Val
    690

<210> SEQ ID NO 8
<211> LENGTH: 2073
<212> TYPE: DNA
<213> ORGANISM: artificial
<220> FEATURE:
<223> OTHER INFORMATION: DNA sequence of Multi-Characteristics Opsin-2T
      (MCO2T)

<400> SEQUENCE: 8

| | | | | | |
|---|---|---|---|---|---|
| atggactatg | gaggagcact | gtcagccgtt | gggagagagt | tgttgtttgt | taccaatcct | 60 |
| gtagtagtca | atggcagtgt | gcttgtacca | gaggatcaat | gctactgtgc | cgggtggata | 120 |
| gagtcccggg | gaaccaacgg | ggcacaaact | gcgagtaacg | ttctgcaatg | ctagcagca | 180 |
| ggctttagca | tactgctact | aatgttctat | gcttaccaaa | catggaagtc | gacttgcggg | 240 |
| tgggaggaga | tatacgtctg | cgcaattgaa | atggtcaagg | ttattctcga | gttcttcttc | 300 |
| gaattcaaaa | acccatcaat | gttatactta | gcgacaggac | atcgagtcca | gtggttacgt | 360 |
| tacgccgagt | ggctcctgac | gtgcccggta | attttaatcc | acctctctaa | tttgaccgga | 420 |
| ctttccaatg | attacagtcg | aagaactatg | ggctattag | tctctgacat | cgggactatt | 480 |
| gtctggggtg | cgactagcgc | tatggctacc | gggtatgtaa | aagtcatctt | cttctgttta | 540 |
| ggactgtgct | acggcgcgaa | tacattcttt | cacgctgcga | agcttatat | tgaaggctat | 600 |
| cacactgtac | ctaaaggtcg | gtgtaggcag | gtcgtcaccg | gtatggcgtg | ttgttcttc | 660 |
| gtatcatggg | gaatgtttcc | aatcttgttt | atactaggtc | ccgaaggatt | tggagtgttg | 720 |
| tccgtttacg | gatcaacagt | aggccacact | attatcgatt | tgatgtctaa | aaactgctgg | 780 |
| gggcttttag | gtcactatct | aagggtgctc | attcatgagc | acatattaat | ccatggcgat | 840 |
| atcagaaaga | cgacgaaact | gaatattgga | ggcactgaga | tcgaagtaga | gacgcttgtc | 900 |
| gaagacgaat | ccgaagctgg | tagccccgca | cgctgggtct | ggatatcttt | gtactatgcc | 960 |
| gccttctatg | ttgttatgac | aggactcttt | gctttatgca | tctatgtcct | aatgcaaact | 1020 |
| attatggctg | aacttatatc | atcggcaaca | aggagtttat | ttgcggctgg | gggaataaat | 1080 |
| ccgtggccca | accccctacca | tcatgaagat | atgggttgcg | gcggcatgac | ccgacaggg | 1140 |
| gaatgcttct | cgacggagtg | gtggtgtgat | ccttcttatg | gactgagtga | tgctgggtat | 1200 |
| ggctattgct | tcgtagaggc | tacgggggg | tacttggtcg | ttggagtcga | gaaaaacag | 1260 |
| gcatggttac | atagcagggg | gactcctgga | gagaaaatag | gtgcccaggt | ttgtcaatgg | 1320 |
| attgctttct | cgattgcaat | agctctgtta | acgttctatg | ggttctccgc | gtggaaggct | 1380 |
| acttgtggct | gggaagaggt | atatgttgt | tgtgttgaag | ttctatttgt | aacacttgag | 1440 |
| atatttaaag | aattttcttc | acccgcaacg | gtctacttaa | gtacaggcaa | tcatgcatac | 1500 |
| tgtctaagat | acttcgaatg | gctcttatca | tgtccggtga | tcttaattcg | actctcgaac | 1560 |
| ctctctggac | tcaagaatga | ctatagtaag | aggactatgg | gactcattgt | gtcgtgcgtt | 1620 |
| ggtatgattg | tgtttggtat | ggcggcaggg | ctggctacgg | actggctaaa | gtggctgcta | 1680 |
| tatatagtga | gctgtatcta | tggcggttac | atgtatttcc | aggcggccaa | gtgttatgtc | 1740 |
| gaggcgaatc | actcggtccc | caaaggtcat | tgtcggatgg | tggtcaagct | tatgcgctac | 1800 |
| gcatatttcg | ccagctgggg | atcgtacccg | atactttggg | ccgttggccc | agaagggcta | 1860 |

-continued

```
ctaaagttga gcccgtacgc caattcaatt gggcatagta tctgtgagat aattgctaag    1920
gagttttgga cgttttagc tcaccatctg agaattaaga ttcatgagca catcttaatt    1980 cacgggata tccgcaagac taccaagatg gagataggtg gggaggaggt ggaggtagaa    2040
gagtttgtag aagaagagga tgaagatact gta                                 2073

<210> SEQ ID NO 9
<211> LENGTH: 200
<212> TYPE: DNA
<213> ORGANISM: artificial
<220> FEATURE:
<223> OTHER INFORMATION: DNA sequences of promoter (mGluR6) used
      upstream of MCO-sequences
<220> FEATURE:
<221> NAME/KEY: misc_feature
<222> LOCATION: (6)..(7)
<223> OTHER INFORMATION: n is a, c, g, or t

<400> SEQUENCE: 9
cagggnngat tgattattga ctagtgatct ccagatggct aaacttttaa atcatgaatg     60
aagtagatat taccaaattg cttttcagc atccatttag ataatcatgt tttttgcctt    120
taatctgtta atgtagtgaa ttacagaaat acatttccta aatcattaca tcccccaaat   180
cgttaatctg ctaaagtaca                                                200

<210> SEQ ID NO 10
<211> LENGTH: 681
<212> TYPE: DNA
<213> ORGANISM: artificial
<220> FEATURE:
<223> OTHER INFORMATION: DNA sequences of reporter-stabilizer (mCherry)
      used downstream of MCO-sequences for confirming expression in
      specific cells

<400> SEQUENCE: 10
atggccatca tcaaggagtt catgcgcttc aaggtgcaca tggagggctc cggaacggcc     60
cgagttcgag atcgagggcg agggcgaggg ccgcccctac gagggcaccc agaccgccaa   120
gctgaaggtg accaagggtg gccccctgcc cttcgcctgg gacatcctgt cccctcagtt   180
catgtacggc tccaaggcct acgtgaagca ccccgccgac atccccgact acttgaagct   240
gtccttcccc gagggcttca gtgggagcg cgtgatgaac ttcgaggacg gcggcgtggt   300
gaccgtgacc caggactcct ccctgcagga cggcgagttc atctacaagg tgaagctgcg   360
cggcaccaac ttccccctcg acggccccgt aatgcagaag aagaccatgg gctgggaggc   420
ctcctccgag cggatgtacc ccgaggacgg cgccctgaag ggcgagatca gcagaggct   480 gaagctgaag gacggcggcc actacacgct gaggtcaaga ccacctacaa ggccaagaag   540
cccgtgcagc tgcccggcgc ctacaacgtc aacatcaagt tggacatcac ctcccacaac   600
gaggactaca ccatcgtgga acagtacgaa cgcgccgagg ccgccactc caccggcggc   660 atggacgagc tgtacaagta a                                             681

<210> SEQ ID NO 11
<211> LENGTH: 900
<212> TYPE: PRT
<213> ORGANISM: artificial
<220> FEATURE:
<223> OTHER INFORMATION: Amino acid and DNA sequences of Enhanced Multi-
      Characteristics Opsin-1 (eMCO1)
```

<400> SEQUENCE: 11

```
Met Asp Tyr Gly Gly Ala Leu Ser Ala Val Gly Arg Glu Leu Leu Phe
1               5                   10                  15

Val Thr Asn Pro Val Val Asn Gly Ser Val Leu Val Pro Glu Asp
            20                  25                  30

Gln Cys Tyr Cys Ala Gly Trp Ile Glu Ser Arg Gly Thr Asn Gly Ala
        35                  40                  45

Gln Thr Ala Ser Asn Val Leu Gln Trp Leu Ala Ala Gly Phe Ser Ile
    50                  55                  60

Leu Leu Leu Met Phe Tyr Ala Tyr Gln Thr Trp Lys Ser Thr Cys Gly
65                  70                  75                  80

Trp Glu Glu Ile Tyr Val Cys Ala Ile Glu Met Val Lys Val Ile Leu
                85                  90                  95

Glu Phe Phe Phe Glu Phe Lys Asn Pro Ser Met Leu Tyr Leu Ala Thr
            100                 105                 110

Gly His Arg Val Gln Trp Leu Arg Tyr Ala Glu Trp Leu Leu Thr Cys
        115                 120                 125

Pro Val Ile Cys Ile His Leu Ser Asn Leu Thr Gly Leu Ser Asn Asp
    130                 135                 140

Tyr Ser Arg Arg Thr Met Gly Leu Leu Val Ser Asp Ile Gly Thr Ile
145                 150                 155                 160

Val Trp Gly Ala Thr Ser Ala Met Ala Thr Gly Tyr Val Lys Val Ile
                165                 170                 175

Phe Phe Cys Leu Gly Leu Cys Tyr Gly Ala Asn Thr Phe Phe His Ala
            180                 185                 190

Ala Lys Ala Tyr Ile Glu Gly Tyr His Thr Val Pro Lys Gly Arg Cys
        195                 200                 205

Arg Gln Val Val Thr Gly Met Ala Trp Leu Phe Phe Val Ser Trp Gly
    210                 215                 220

Met Phe Pro Ile Leu Phe Ile Leu Gly Pro Glu Gly Phe Gly Val Leu
225                 230                 235                 240

Ser Val Tyr Gly Ser Thr Val Gly His Thr Ile Ile Asp Leu Met Ser
                245                 250                 255

Lys Asn Cys Trp Gly Leu Leu Gly His Tyr Leu Arg Val Leu Ile His
            260                 265                 270

Glu His Ile Leu Ile His Gly Asp Ile Arg Lys Thr Thr Lys Leu Asn
        275                 280                 285

Ile Gly Gly Thr Glu Ile Glu Val Glu Thr Leu Val Glu Asp Glu Ala
    290                 295                 300

Glu Ala Gly Ala Val Asn Lys Gly Thr Gly Lys Met Ala Glu Leu Ile
305                 310                 315                 320

Ser Ser Ala Thr Arg Ser Leu Phe Ala Ala Gly Gly Ile Asn Pro Trp
                325                 330                 335

Pro Asn Pro Tyr His His Glu Asp Met Gly Cys Gly Met Thr Pro
            340                 345                 350

Thr Gly Glu Cys Phe Ser Thr Glu Trp Trp Cys Asp Pro Ser Tyr Gly
        355                 360                 365

Leu Ser Asp Ala Gly Tyr Gly Tyr Cys Phe Val Glu Ala Thr Gly Gly
    370                 375                 380

Tyr Leu Val Val Gly Val Glu Lys Lys Gln Ala Trp Leu His Ser Arg
385                 390                 395                 400
```

-continued

```
Gly Thr Pro Gly Glu Lys Ile Gly Ala Gln Val Cys Gln Trp Ile Ala
            405                 410                 415
Phe Ser Ile Ala Ile Ala Leu Leu Thr Phe Tyr Gly Phe Ser Ala Trp
        420                 425                 430
Lys Ala Thr Cys Gly Trp Glu Glu Val Tyr Val Cys Cys Val Glu Val
            435                 440                 445
Leu Phe Val Thr Leu Glu Ile Phe Lys Glu Phe Ser Ser Pro Ala Thr
    450                 455                 460
Val Tyr Leu Ser Thr Gly Asn His Ala Tyr Cys Leu Arg Tyr Phe Glu
465                 470                 475                 480
Trp Leu Leu Ser Cys Pro Val Ile Leu Ile Arg Leu Ser Asn Leu Ser
                485                 490                 495
Gly Leu Lys Asn Asp Tyr Ser Lys Arg Thr Met Gly Leu Ile Val Ser
            500                 505                 510
Cys Val Gly Met Ile Val Phe Gly Met Ala Ala Gly Leu Ala Thr Asp
        515                 520                 525
Trp Leu Lys Trp Leu Leu Tyr Ile Val Ser Cys Ile Tyr Gly Gly Tyr
    530                 535                 540
Met Tyr Phe Gln Ala Ala Lys Cys Tyr Val Glu Ala Asn His Ser Val
545                 550                 555                 560
Pro Lys Gly His Cys Arg Met Val Val Lys Leu Met Ala Tyr Ala Tyr
                565                 570                 575
Phe Ala Ser Trp Gly Ser Tyr Pro Ile Leu Trp Ala Val Gly Pro Glu
            580                 585                 590
Gly Leu Leu Lys Leu Ser Pro Tyr Ala Asn Ser Ile Gly His Ser Ile
        595                 600                 605
Cys Asp Ile Ile Ala Lys Glu Phe Trp Thr Phe Leu Ala His His Leu
    610                 615                 620
Arg Ile Lys Ile His Glu His Ile Leu Ile His Gly Asp Ile Arg Lys
625                 630                 635                 640
Thr Thr Lys Met Glu Ile Gly Gly Glu Glu Val Glu Val Glu Glu Phe
                645                 650                 655
Val Glu Glu Glu Asp Glu Asp Thr Val Val Ser Lys Gly Glu Glu Asp
            660                 665                 670
Asn Met Ala Ile Ile Lys Glu Phe Met Arg Phe Lys Val His Met Glu
        675                 680                 685
Gly Ser Val Asn Gly His Glu Phe Glu Ile Glu Gly Glu Gly Glu Gly
    690                 695                 700
Arg Pro Tyr Glu Gly Thr Gln Thr Ala Lys Leu Lys Val Thr Lys Gly
705                 710                 715                 720
Gly Pro Leu Pro Phe Ala Trp Asp Ile Leu Ser Pro Gln Phe Met Tyr
                725                 730                 735
Gly Ser Lys Ala Tyr Val Lys His Pro Ala Asp Ile Pro Asp Tyr Leu
            740                 745                 750
Lys Leu Ser Phe Pro Glu Gly Phe Lys Trp Glu Arg Val Met Asn Phe
        755                 760                 765
Glu Asp Gly Gly Val Val Thr Val Thr Gln Asp Ser Ser Leu Gln Asp
    770                 775                 780
Gly Glu Phe Ile Tyr Lys Val Lys Leu Arg Gly Thr Asn Phe Pro Ser
785                 790                 795                 800
Asp Gly Pro Val Met Gln Lys Lys Thr Met Gly Trp Glu Ala Ser Ser
                805                 810                 815
```

```
Glu Arg Met Tyr Pro Glu Asp Gly Ala Leu Lys Gly Glu Ile Lys Gln
            820                 825                 830

Arg Leu Lys Leu Lys Asp Gly Gly His Tyr Asp Ala Glu Val Lys Thr
        835                 840                 845

Thr Tyr Lys Ala Lys Lys Pro Val Gln Leu Pro Gly Ala Tyr Asn Val
    850                 855                 860

Asn Ile Lys Leu Asp Ile Thr Ser His Asn Glu Asp Tyr Thr Ile Val
865                 870                 875                 880

Glu Gln Tyr Glu Arg Ala Glu Gly Arg His Ser Thr Gly Gly Met Asp
                885                 890                 895

Glu Leu Tyr Lys
            900

<210> SEQ ID NO 12
<211> LENGTH: 2703
<212> TYPE: DNA
<213> ORGANISM: artificial
<220> FEATURE:
<223> OTHER INFORMATION: DNA sequence of Enhanced Multi-Characteristics
      Opsin-1 (eMCO1)

<400> SEQUENCE: 12
```

| | | | | | |
|---|---|---|---|---|---|
| atggattatg | gcggcgcgct | gagcgcggtg | ggccgcgaac | tgctgtttgt | gaccaacccg | 60 |
| gtggtggtga | acggcagcgt | gctggtgccg | gaagatcagt | gctattgcgc | gggctggatt | 120 |
| gaaagccgcg | gcaccaacgg | cgcgcagacc | gcgagcaacg | tgctgcagtg | gctggcggcg | 180 |
| ggctttagca | ttctgctgct | gatgttttat | gcgtatcaga | cctggaaaag | cacctgcggc | 240 |
| tgggaagaaa | tttatgtgtg | cgcgattgaa | atggtgaaag | tgattctgga | attttttttt | 300 |
| gaatttaaaa | acccgagcat | gctgtatctg | gcgaccggcc | atcgcgtgca | gtggctgcgc | 360 |
| tatgcggaat | ggctgctgac | ctgcccggtg | atttgcattc | atctgagcaa | cctgaccggc | 420 |
| ctgagcaacg | attatagccg | ccgcaccatg | ggcctgctgg | tgagcgatat | tggcaccatt | 480 |
| gtgtggggcg | cgaccagcgc | gatggcgacc | ggctatgtga | aagtgatttt | tttttgcctg | 540 |
| ggcctgtgct | atggcgcgaa | cacctttttt | catgcggcga | aagcgtatat | tgaaggctat | 600 |
| cataccgtgc | cgaaaggccg | ctgccgccag | gtggtgaccg | gcatggcgtg | gctgtttttt | 660 |
| gtgagctggg | gcatgtttcc | gattctgttt | attctgggcc | cggaaggctt | tggcgtgctg | 720 |
| agcgtgtatg | gcagcaccgt | gggccatacc | attattgatc | tgatgagcaa | aaactgctgg | 780 |
| ggcctgctgg | gccattatct | gcgcgtgctg | attcatgaac | atattctgat | tcatggcgat | 840 |
| attcgcaaaa | ccaccaaact | gaacattggc | ggcaccgaaa | ttgaagtgga | acccctggtg | 900 |
| gaagatgaag | cggaagcggg | cgcggtgaac | aaaggcaccg | gcaaaatggc | tgagctgatc | 960 |
| agcagcgcca | ccagatctct | gtttgccgcc | ggaggcatca | acccttggcc | taaccccctac | 1020 |
| caccacgagg | acatgggctg | tggaggaatg | acacctacag | gcgagtgctt | cagcaccgag | 1080 |
| tggtggtgtg | accttcttta | cggactgagc | gacgccggat | acggatattg | cttcgtggag | 1140 |
| gccacaggcg | gctacctggt | cgtgggagtg | gagaagaagc | aggcttggct | gcacagcaga | 1200 |
| ggcacaccag | agaaaagat | cggcgcccag | gtctgccagt | ggattgcttt | cagcatcgcc | 1260 |
| atcgccctgc | tgacattcta | cggcttcagc | gcctggaagg | ccacttgcgg | ttgggaggag | 1320 |
| gtctacgtct | gttgcgtcga | ggtgctgttc | gtgaccctgg | agatcttcaa | ggagttcagc | 1380 |
| agccccgcca | cagtgtacct | gtctaccggc | aaccacgcct | attgcctgcg | ctacttcgag | 1440 |
| tggctgctgt | cttgccccgt | gatcctgatc | agactgagca | acctgagcgg | cctgaagaac | 1500 |

-continued

```
gactacagca agcggaccat gggcctgatc gtgtcttgcg tgggaatgat cgtgttcggc   1560
atggccgcag gactggctac cgattggctc aagtggctgc tgtatatcgt gtcttgcatc   1620
tacggcggct acatgtactt ccaggccgcc aagtgctacg tggaagccaa ccacagcgtg   1680
cctaaaggcc attgccgcat ggtcgtgaag ctgatggcct acgcttactt cgcctcttgg   1740
ggcagctacc caatcctctg ggcagtggga ccagaaggac tgctgaagct gagcccttac   1800
gccaacagca tcggccacag catctgcgac atcatcgcca aggagttttg gaccttcctg   1860
gcccaccacc tgaggatcaa gatccacgag cacatcctga tccacggcga catccggaag   1920
accaccaaga tggagatcgg aggcgaggag gtggaagtgg aagagttcgt ggaggaggag   1980
gacgaggaca cagtggtgag caagggcgag gaggataaca tggccatcat caaggagttc   2040
atgcgcttca aggtgcacat ggagggctcc gtgaacggcc acgagttcga gatcgagggc   2100
gagggcgagg gccgcccta cgagggcacc cagaccgcca agctgaaggt gaccaagggt   2160 ggcccctgc ccttcgcctg ggacatcctg tcccctcagt tcatgtacgg ctccaaggcc   2220
tacgtgaagc accccgccga catccccgac tacttgaagc tgtccttccc cgagggcttc   2280
aagtgggagc gcgtgatgaa cttcgaggac ggcggcgtgg tgaccgtgac ccaggactcc   2340
tccctgcagg acggcgagtt catctacaag gtgaagctgc gcggcaccaa cttcccctcc   2400
gacggccccg taatgcagaa gaagaccatg ggctgggagg cctcctccga gcggatgtac   2460
cccgaggacg gcgccctgaa gggcgagatc aagcagaggc tgaagctgaa ggacggcggc   2520
cactacgacg ctgaggtcaa gaccacctac aaggccaaga gcccgtgca gctgcccggc   2580 gcctacaacg tcaacatcaa gttggacatc acctcccaca acgaggacta caccatcgtg   2640
gaacagtacg aacgcgccga gggccgccac tccaccggcg gcatggacga gctgtacaag   2700
taa                                                                 2703
```

OPTOGENETIC MODULATION BY MULTI-CHARACTERISTIC OPSINS FOR VISION RESTORATION AND OTHER APPLICATIONS THEREOF

The entire content of the following electronic submission of the sequence listing via the USPTO EFS-WEB server, as authorized and set forth in MPEP § 1730 II.B.2 (a) (C), is hereby expressly incorporated by reference in its entirety for all purposes. The sequence listing is identified on the electronically filed text file as follows: File Name: NT1-002US_ST25; Date of Creation: Dec. 16, 2021; Size (bytes): 48 KB.

CROSS-REFERENCE

This application is continuation-in-part of U.S. patent application Ser. No. 16/347,375 filed May 3, 2019, which in turn claims the benefit of priority to PCT application no. PCT/US2017/059922 filed on Nov. 3, 2017 and further claims the benefit of priority to U.S. provisional application Ser. No. 62/418,196, filed Nov. 11, 2016, all of which are hereby incorporated by reference in their entirety.

FIELD OF THE INVENTION

This invention relates generally to compositions and methods for modulating cellular activities by synthetic opsins. The invention provides enhanced light sensitivity to neurons for vision restoration and other therapeutic applications.

BACKGROUND OF THE INVENTION

In retinal degenerative diseases such as dry age-related macular degeneration (AMD) and Retinitis Pigmentosa (RP), the photoreceptors (e.g., rods and cones) that are responsible for conversion of light into electro-chemical signals, are degenerated. This prevents the generation of photo-induced signals in retina, which breaks the vision-sensory related cascade of events within the visual system. Loss of photoreceptor cells and/or loss of photoreceptor cell function are the primary causes of reduced light sensitivity and blindness.

SUMMARY OF THE INVENTION

In an aspect of the invention, the present disclosure provides several light-sensitive ion-channel and ligand molecules, methods of their preparation and different uses, including vision restoration. In another aspect, the invention comprises isolated nucleic acid sequences that encode light-sensitive ion-channels, ligands and constructs, including plasmids and other nucleic acid vectors that comprise such nucleic acid sequences.

In one aspect, the disclosure provides light-sensitive ion-channel and ligands (Multi-Characteristics Opsins) that are synthetic in origin, These Multi-Characteristics Opsins or MCOs: (i) have high photosensitivity at multiple visible wavelengths and (ii) can be packaged into a genomic vector such as a plasmid that can be packaged into a virus. The virus can include an adeno-associated virus or a lentivirus.

In addition, the disclosure in some aspects provides expression of MCOs in cells in-vitro or in-vivo as well as methods for modulating cellular activities by these synthetic opsins. In one aspect, the Multi-Characteristics Opsins are highly sensitive to visible light and ambient-light activatable. In some aspect, expression of a specific MCO in cell produces a long-lasting inward current in response to white light similar to that found in an unmodified photoreceptor-rod signal.

In another aspect, the disclosure provides a synthetic, ambient-light activatable, fast, enhanced Multi-Characteristics Opsin (eMCO1) which has a stabilizer-biomarker that play an active role in stabilizing eMCO1 expression on the cell membrane. In another aspect of the invention, the stabilized eMCO1 has a higher percentage of beta sheets and a lower percentage of a disordered structure (i.e. less prone to cleavage). In a further aspect, the stabilized eMCO1 enhances the photo-induced current in the cells expressing eMCO1.

In another aspect, the disclosure provides a synthetic, ambient-light activatable, fast, enhanced Multi-Characteristic Opsin (eMCO1) that contains a stabilizer-biomarker can be used to confirm the MCO gene expression in targeted cells.

According to another aspect of the invention, the light emitted from the stabilizer-biomarker present in the enhanced Multi-Characteristics Opsin enhances the photo-induced current in the cells expressing eMCO1 by light emitted/re-emitted from the stabilizer-biomarker molecule.

According to another aspect of the invention, the disclosed invention provides method for the use of synthetic opsins for vision restoration and other applications. In an aspect of the invention, the amino acid sequence of the synthetic opsin is modified to provide enhanced light sensitivity, kinetics and ion-selectivity.

In an aspect of the present invention, a method of delivering MCO to degenerated retinas in order to restore light sensitivity is provided. In another aspect, efficient and stable in-vivo expression of MCO-reporter protein in the retina occurs after intravitreal injection of Adeno-Associated Virus carrying MCO. In a further aspect, expression of MCO in the retina of an individual suffering from retinal degeneration can provide for the behavioral restoration of vision. In an aspect of the invention, the improvement in visually guided behavior occurs even at light intensity levels that are orders of magnitude lower than that required for Channelrhodopsin-2 opsin.

According to yet another aspect, the present disclosure provides a method of efficient restoration of vision in human. The method include use of MCO that is expressed in retinal cells. In another aspect, the MCO produces a slower depolarizing phase after initial response to a white light that is similar to a photoreceptor-rod signal. In a further aspect, an opsin can be delivered to retinal cells in-vivo by Adeno-Associated Virus (AAV) or a lentivirus administered to the eye of an individual that contains a nucleic acid vector comprising a promoter-MCO-gene, and/or a Pronase E and/or Alpha-Aminoadipic Acid (AAA). In an aspect the AAV and/or lentivirus can be modified or enhanced to increase efficiency to a targeted retinal layer that crosses the thick inner limiting membrane in humans.

In an aspect of the invention, an individual is administered a virus mediated MCO to treat diverse retinal degenerations in individuals suffering such diseases, including retinal degeneration or dystrophy.

In another aspect, the present disclosure provides the use of opsin that produces a slower depolarizing phase after an initial response to white light, which is similar to a characteristic photoreceptor-rod signal. In an aspect, this results in the restoration of vision in blind individuals.

In an aspect of the invention, the nucleic acid molecule(s) encode for any of the polypeptides described herein. In another aspect, the nucleic acid molecule(s) is formulated to include a pharmaceutically acceptable carrier.

In another aspect, a method is provided wherein cells are contacted with or have been transformed with an isolated nucleic acid molecule that encodes for an isolated polypeptide molecule of the invention, including an MCO, and MCO1 and an eMCO1. In an aspect, the cells are rod bipolar cells, ON-type retinal ganglion cells, or ON-type bipolar cells.

In another aspect, a method is provided to use an opsin to modulate a cell and tissue function, and for use in diagnosis and treatment of retinal disorders.

In one embodiment, the present invention discloses a recombinant, ambient-light activatable, enhanced, fast Multi-Characteristics Opsin (eMCO1) chimeric protein comprising: an MCO1 protein mutated to modulate at least one of ion selectivity, light sensitivity, or kinetics of the MCO1 protein. In an aspect, the MCO1 protein has SEQ ID NO: 1, 3, 5, 7, or 11. In one aspect, one or more of the following single or combinations of mutations modulate ion selectivity, light sensitivity, or kinetics, wherein the mutation is selected from at least one of: S to C substitution at an amino acid residue corresponding to amino acid 132 of the MCO1 sequence; E to A substitution at an amino acid residue corresponding to amino acid 123 of the MCO1 sequence; D to A substitution at an amino acid residue corresponding to amino acid 253 of the MCO1 sequence; R to A substitution at an amino acid residue corresponding to amino acid 120 of the MCO1 sequence; Q to A, substitution at an amino acid residue corresponding to amino acid 56 of the MCO1 sequence; K to A substitution at an amino acid residue corresponding to amino acid 93 of the MCO1 sequence; E to A substitution at an amino acid residue corresponding to amino acid 90 of the MCO1 sequence; E to Q substitution at an amino acid residue corresponding to amino acid 90 of the MCO1 sequence; E to A substitution at an amino acid residue corresponding to amino acid 97 of the MCO1 sequence; E to A substitution at an amino acid residue corresponding to amino acid 101 of the MCO1 sequence; N to D substitution at an amino acid residue corresponding to amino acid 258 of the MCO1 sequence; E to T substitution at an amino acid residue corresponding to amino acid 83 of the MCO1 sequence; E to T substitution at an amino acid residue corresponding to amino acid 123 of the MCO1 sequence; or S to D substitution at an amino acid residue corresponding to amino acid 63 of the MCO1 chimeric protein sequence.

In another aspect, a protein is a recombinant, ambient-light activatable, slow Multi-Characteristics Opsin (MCO2) chimeric protein; wherein 7 amino acid residues (VNKGTGK) from 309 to 315 are deleted in the molecule of claim 1 to improve the gene expression on membrane; wherein S132L mutation is carried out in the trans-membrane domain 2 of SEQ ID NO: 1 to cause increased binding affinity towards retinal and increased light sensitivity; wherein the opsin is encoded in 658 amino acids; and wherein the MCO2-sensitized cell generates a slowly decaying inward current after initial fast current response to a pulse of white light. In one aspect, a single or a combination of mutations is selected from E473A, D603A, R469A of SEQ ID NO:1 that further modulate at least one of the ion selectivity, light sensitivity, or kinetics of the molecule. In another aspect, a trans-membrane sequence (TPARWVWISLYYAAFYVVMTGLFALCIYVLMQTI) is inserted after amino acid residue 315 in MCO1 (SEQ ID NOS:1 or 2) or 308 amino acid residues in MCO2 (SEQ ID NOS:3 or 4).

In another aspect, a recombinant, ambient-light activatable, fast, enhanced Multi-Characteristics Opsin (eMCO1) comprises MCO1 sequence (SEQ ID NO: 1) and a stabilizer-biomarker sequence. In one aspect, the recombinant eMCO1 further comprises at least one of: the stabilizer-biomarker is 900 amino acids of SEQ ID NO: 11; the stabilizer-biomarker is connected downstream with the ligand non-4-transmembrane domain by a linking sequence; a light emitted from the stabilizer-biomarker stabilizes eMCO1 expression in a membrane with higher percentage of beta sheets and lower percentage of disordered structure and is less prone to cleavage that a non-modified MCO1; the stabilizer-biomarker molecule enhances a photo-induced current in cells expressing eMCO1 by better orientation-stabilization of eMCO1 across a membrane; the stabilizer-biomarker molecule enhances a photo-induced current in cells expressing eMCO1 by light emitted/re-emitted from the stabilizer-biomarker molecule; a promoter is used upstream to eMCO1 to target specific cells; the promoter-eMCO1 gene is packaged in a viral vector; cells can be transfected with the promoter-eMCO1 gene using chemical, viral, or physical transfection; an examination of eMCO1 containing stabilizer-biomarker expression in retina (by fundoscopy) is an indicator for determining efficacy of gene delivery to targeted tissue(s); a light emitted/re-emitted by the stabilizer-biomarker is monitored used to determine presence of eMCO1 expression; or a loss of expression requires re-delivery of the promoter-eMCO1 gene to re-photosensitize/functionalize target cells. In another aspect, the recombinant cMOC1 further comprises a reporter-gene is downstream from the MCO1 gene to detect cellular expression/activation, wherein the promoter-MCO1-reporter gene is packaged in a viral vector; and wherein cells can be transfected by the promoter-MCO1-reporter gene using either chemical, viral or physical method. In another aspect, MCO-sensitized cells are highly sensitive to light and can be activated at low intensity (~0.02 mW/mm$^2$) ambient light. In another aspect, the MCO-sensitized retinal neurons (e.g. retinal ganglion cells, bipolar cells) produces a slower depolarizing phase after initial response to white light similar to a wild-type photoreceptor-rod signal. In another aspect, the opsin is sensitive to any wavelength of light in a visible and a near-infrared range. In another aspect, the opsin is activated by a single-photon including direct, and indirect (e.g., fluorescence, phosphorescence, up/down conversion) illumination light in a visible and a near-infrared range.

In another aspect, the present invention discloses methods and uses of the MCO1, MCO2 or eMCO1, or mutants thereof for restoration of lost vision. In one aspect, the vision loss is due to any degenerative retinal disease; wherein delivery of a recombinant MCO-gene to targeted cells is carried out by an intravitreal/sub-retinal injection of a virus carrying promoter-MCO-gene in an eye, in combination with Pronase E and/or alpha-aminoadipic acid (AAA) for enhancing delivery efficiency, or both; wherein delivery of the MCO-gene is carried out by intravitreal/sub-retinal injection of promotor-MCO-gene plasmids in eye, followed by either chemical, or physical transduction method or a combination thereof; wherein the MCO-gene delivery into eye does not cause either undesired expression in non-targeted cells and organs, or any adverse reaction or cytotoxicity in the treated eye; wherein significant visually guided behavioral improvement is observed after delivery of MCO-gene; or wherein reinjection and transfection of the MCO-gene is carried out in case of deficiency in MCO-gene expression.

In another aspect, the present invention discloses methods and uses of the MCO1, MCO2 or eMCO1 for preventing or slowing down the vision loss, wherein the MCO-gene is delivered to retinal cells during progressive photoreceptor loss through transduction, including, through the use of a viral vector, including an AAV or lentivirus; wherein light stimulation of the MCO-sensitized retinal cells is carried out to prevent or slow down the photoreceptor loss; and wherein the light stimulation dose is optimized for maximal efficacy.

In another aspect, the present invention discloses methods and uses of the MCO1, MCO2 or eMCO1 for restoration of vision by regenerating the damaged RGC axons: wherein the MCO-gene is delivered to retinal ganglion cells through transduction, including, through the use of a viral vector, including an AAV or lentivirus during or after axonal degeneration; wherein light stimulation of the MCO-sensitized RGCs is carried out to slow down the rate of degeneration and/or to regenerate the axons; and wherein the light stimulation dose is optimized for minimizing the degeneration and/or maximizing the axonal regeneration.

In another aspect, the present invention discloses methods and uses of the MCO1, MCO2 or eMCO1 for stimulation of different types of excitable cells including neurons, cardiac cells: wherein the use comprises delivery of the MCO-gene by either chemical, viral or physical transduction transformation method; wherein activation of MCO is achieved upon illumination of light; and wherein the effect is measured by electro/opto-physiology.

In another aspect, the present invention discloses methods and uses of the MCO1, MCO2 or eMCO1 for treatment of disorders: wherein the use comprises delivery of the MCO-gene to different organs by either chemical, viral or physical transduction method; wherein activation of MCO is achieved upon illumination of light; and wherein an effect is measured by an electrophysiology or other functional and behavioral analysis.

In another aspect, the present invention discloses a polypeptide comprising a sequence comprising at least 75%, 85%, 95% or 100% identity to SEQ ID NO: 1, 3, 5, 7 or 11, wherein said polypeptide exhibits the photosensitivity characteristics of the protein of at least one of SEQ ID NO: 1, 3, 5, 7, or 11.

In another aspect, the present invention discloses a recombinant nucleic acid encoding a polypeptide having at least 75%, 85%, 95% or 100% identity to SEQ ID NO: 1, 3, 5, 7 or 11, wherein said polypeptide exhibits the photosensitivity characteristics of the protein of at least one of SEQ ID NO: 1, 3, 5, 7 or 11. In one aspect, the nucleic acid has at least one of 75%, 85%, 95% or 100% identity to SEQ ID NO: 2, 4, 6, or 8. In another embodiment, the invention discloses a vector comprising the nucleic acid having 75%, 85%, 95% or 100% identity to at least one of SEQ ID NO: 1, 3, 5, 7 or 11. In one aspect, the vector is selected from an adenovirus, adeno-associated virus or lentivirus vector.

In another aspect, the present invention discloses a method of treating blindness comprising administering to a patient in need thereof a vector comprising the nucleic acid having 75%, 85%, 95% or 100% identity to at least one of SEQ ID NO: 1, 3, 5, 7 or 11.

In an aspect of the present invention, a light-sensitive ion-channel molecule (expressed in the transmembrane) is used that is capable of capturing blue light, along with a light-sensitive ligand to capture light from a green-red wavelength and a light-emitting enhancer that in an embodiment is located at the C-terminus. In a further aspect of the invention, an eMCO1 results in a fast light induced activity in a target cell at a low light threshold and over a broad spectral range. In another aspect of the invention, a blue light activates the trans-membrane (TM) domain of an eMCO1 and the eMCO1 acts as an ion channel. In a further aspect, red light absorbed by a non-TM, middle domain (non-ion channel) leads to a conformational change of a TM domain of an eMCO1, which results in an ion flow through the TM-domain of the eMCO1. In an aspect of the present invention, following the absorption by an eMCO1 of a green light, the C-terminus domain (RFP) of the eMCO1 emits a red light that results in an enhancement of eMCO1 efficacy.

In an aspect of the present invention, an enhanced Multi-Characteristic Opsin (eMCO1) is transduced into cells in-vitro or in-vivo and expressed by the transduced cells. In a further aspect the transduced eMCO1 modulates a cellular activity following exposure to different wavelengths of visible light.

In an aspect of the present invention, a method is provided for delivering (through for example transduction) an eMCO1 to a degenerated retina to restore light sensitivity. In a further aspect of the invention, In a further aspect, an eMCO1 transduced into a retina, and in a further aspect, one or more cells that comprise the retina) is efficiently and stably expressed in vivo. In another aspect, an eMCO1-reporter protein is administered to a patient through an intravitreal injection of an Adeno-Associated Virus (AAV) that includes a gene that codes for an eMCO1 into the retina. In an aspect of the present invention, the administration of an eMCO1, including an AAV containing a gene coding for an eMCO1 into the retina of a patient results in the behavioral restoration of vision.

In an aspect of the present invention, administration of an eMCO1 to a patient, including an AAV containing a gene coding for an eMCO1 into the retina results in the restoration of part of all of the vision of the patient. In an aspect of the present invention, administration of an eMCO1 to a patient, including an AAV containing a gene coding for an eMCO1 into the retina results in results in the arrest of retinal degeneration and disorganization in the retina of the patient. In an aspect of the present invention, administration of an eMCO1 to a patient, including an AAV containing a gene coding for an eMCO1 into the retina results in the arrest of the degeneration and disorganization of an inner nuclear layer of the retina and its connectivity with ganglion cell layer.

In another aspect, methods are provided for use in treating a patient suffering from a retinal degenerative disease in one or both eyes by administering an eMCO1 (including through administration of an AAV containing the gene coding for an eMCO1, through an intraocular injection into one eye.

In an aspect of the present invention, administration of an eMCO1 can be used to treat a retinal dystrophy or a retinal degeneration disease. In a further aspect, a retinal dystrophy or a retinal degeneration disease is characterized by the loss of part of all of the outer retina, including photoreceptor cells and/or retinal pigment epithelium.

BRIEF DESCRIPTION OF THE DRAWINGS

The following drawings illustrate by way of example and not limitation. For the sake of brevity and clarity, every feature of a given structure is not always labeled in every figure in which that structure appears.

Tables 1-4 show Amino acid sequences of Multi-Characteristics Opsins (MCOs): MCO1, MCO2, MCO1T, MCO2T. MCO2 contains mutation (S 132 L) of MCO1 and deletion of 7 amino acid residues 6(VNKGTGK (SEQ ID NO: 13)) after 308. MCO1T and MCO2T contain additional transmembrane sequence (TPARVVVWISLYYAAF-YVVVMTGLFALCIYVLMQTI (SEQ ID NO: 14)) after 315 and 308 amino acid residues respectively.

Table-05 shows the DNA sequences of promoter (mGluR6) used upstream of MCO-sequences for targeting specific cells as an example; and Table-06 shows the DNA sequences of reporter (mCherry) used downstream of MCO-sequences for confirming expression in specific cells as an example.

Table-06 shows DNA sequences of reporter-stabilizer (mCherry) used downstream of MCO-sequences for confirming expression in specific cells as an example.

Table-07 shows Amino acid and DNA sequences of Enhanced Multi-Characteristics Opsin-1 (eMCO1). It contains MCO1 sequence (Table-01) and biomarker-stabilizer sequence (Table-06).

Table-08 shows the comparison of stability of the MCO1 and eMCO1 based on secondary structure and folding using theoretical modeling by RaptorX.

Figure 1A:
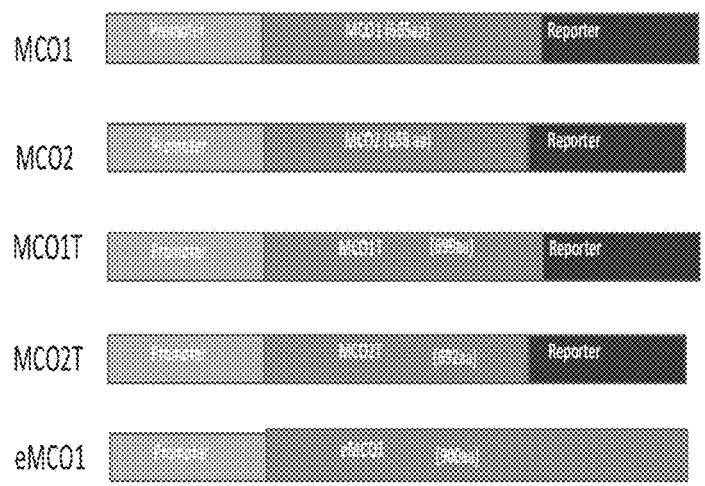
Figure 1B:
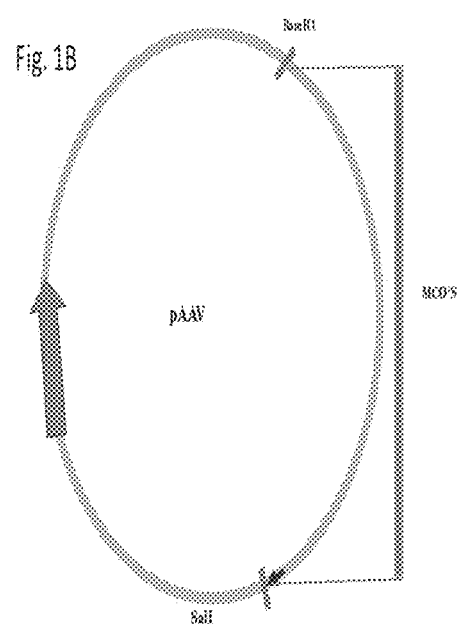

FIG. 1A illustrates domain architecture of Multi-Characteristics Opsins (MCOs) with reporter protein, which includes eMCO1. FIG. 1B shows typical circular map showing the insertion of MCO gene cloned at the restriction sites (BamH I and Sal I).

Figure 2A:
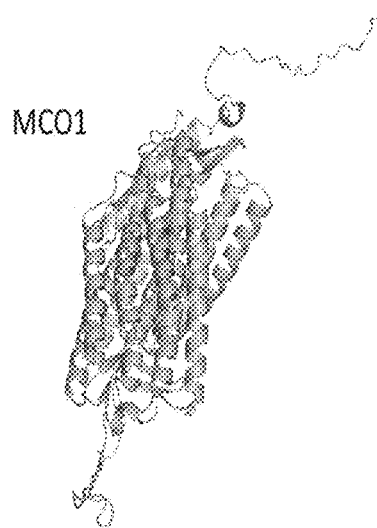
Figure 2B:
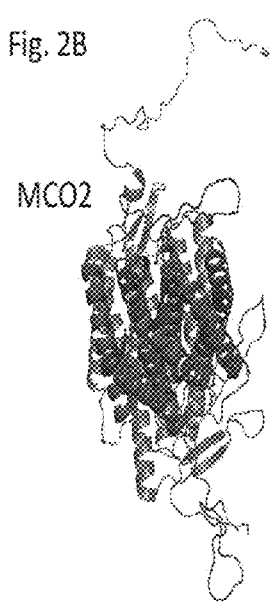
Figure 2C:
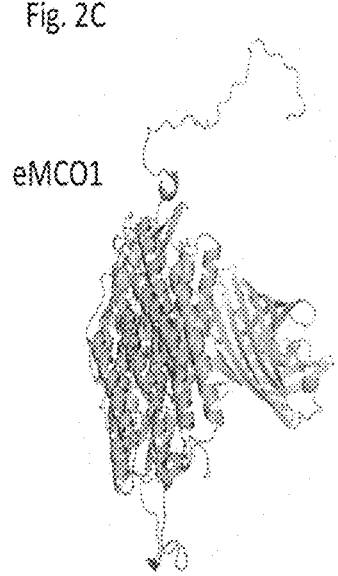

FIG. 2 shows Theoretical modeling of the three-dimensional arrangement of amino acid chains of Multi-Characteristics Opsins. FIG. 2A shows the theoretical modeling of the three-dimensional arrangement of amino acid chains of Multi-Characteristics Opsin, MCO 1. FIG. 2B depicts the theoretical modeling of the three-dimensional arrangement of amino acid chains of Multi-Characteristics Opsin, MCO 2. FIG. 2C shows the theoretical modeling of the three-dimensional arrangement of amino acid chains of Multi-Characteristics Opsin, eMCO1.

Figure 3A:
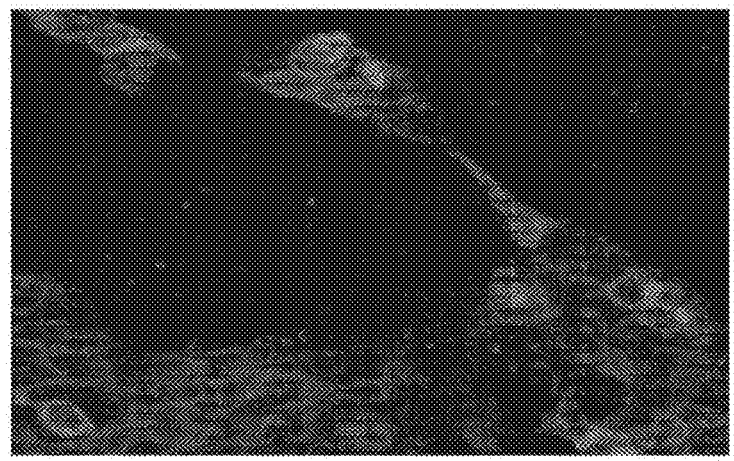
Figure 3B:
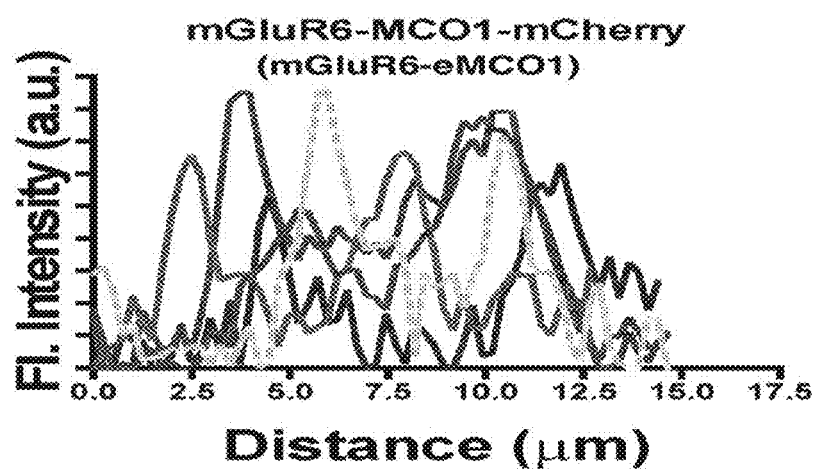

FIGS. 3A and 3B show expression of eMCO1 in model HEK 293 cells. FIG. 3A shows Expression of eMCO1 is localized in plasma membrane. Confocal fluorescence images of HEK293 cells transfected with mGluR6-MCO1-mCherry (mGluR6-eMCO1), FIG. 3B shows Intensity of MCO1 reporter fluorescence along line across representative cells.

Figure 4A:
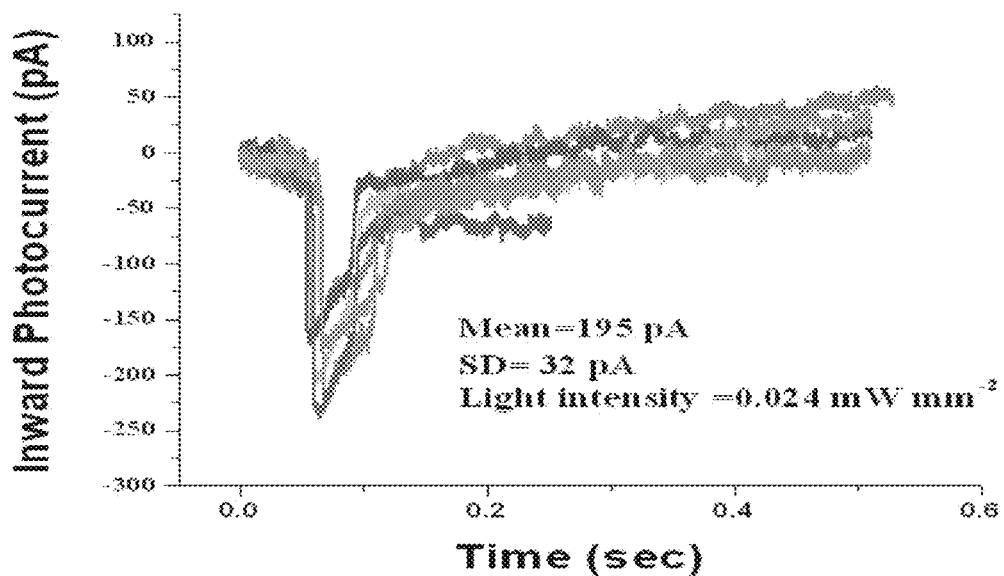
Figure 4B:
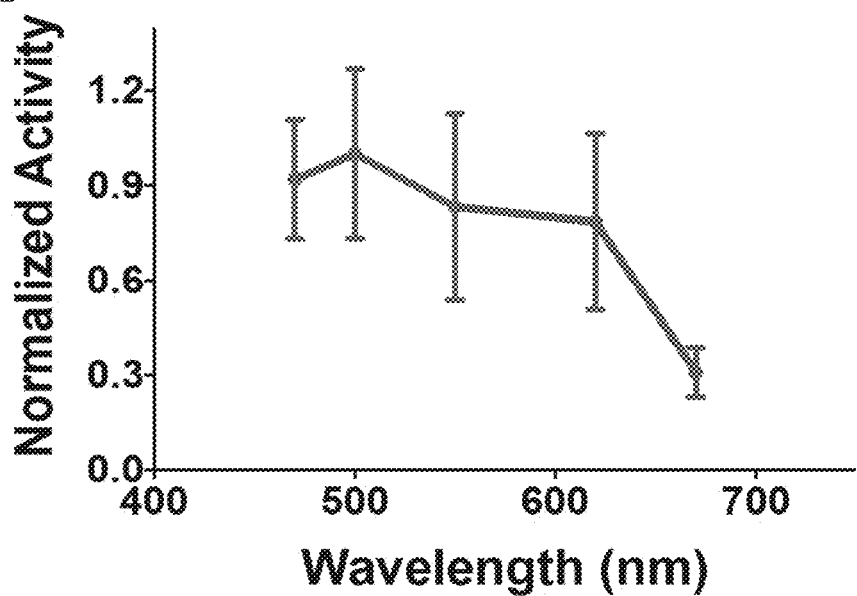

FIGS. 4A and 4B illustrate functioning of enhanced Multi-Characteristics Opsin (eMCO1). FIG. 4A shows inward current profiles in MCO1-expressing cells in response to light (average intensity: 0.024 mW/mm$^2$). FIG. 4B shows Activation spectrum of eMCO1. Average±SEM.

FIGS. 5A and 5B show the effect of eMCO1 (e.g., presence of mCherry on MCO1) function measured by cellular activity. Inward current profiles in HEK cells measured by Port-a-Patch automated Patch clamp electrophysiology. FIG. 5A shows photocurrent measured at white light intensity of 0.02 mW/mm$^2$ in cell transfected with mGluR6-eMCO1 (mGluR6-MCO1-mCherry). FIG. 5B depicts photocurrent measured at white light intensity of 0.02 mW/mm$^2$ in cell transfected with mGluR6-MCO1.

Figure 6A:
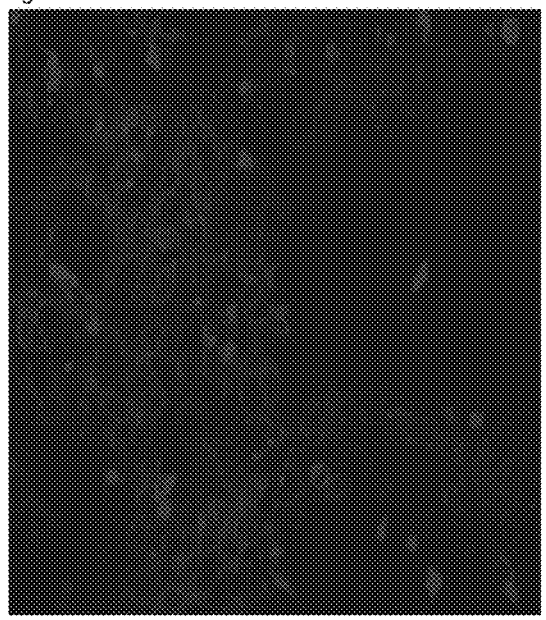
Figure 6B:
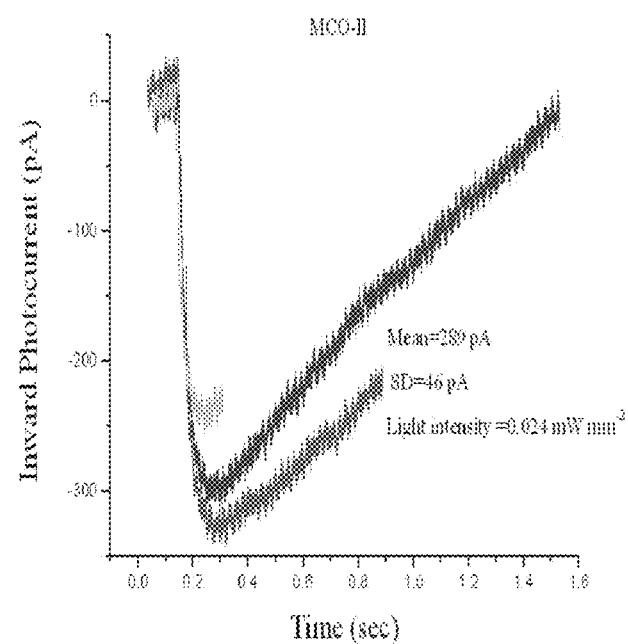

FIGS. 6A and 6B illustrate functioning of Multi-Characteristics Opsin (MCO2). FIG. 6A shows Fluorescence upon lipofection of MCO2-mCherry into HEK293 cells. FIG. 6B shows Inward current in MCO2-expressing cells in response to light (average intensity: 0.024 mW/mm$^2$) measured by Patch-clamp electrophysiology.

Figure 7A:
Figure 7B:
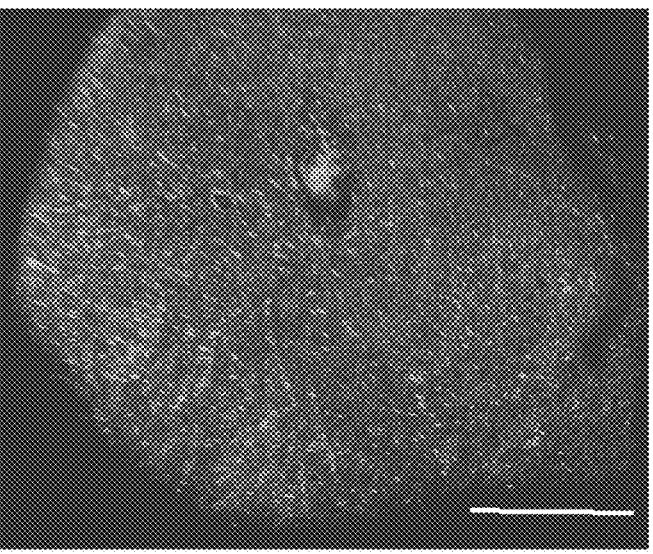

FIGS. 7A and 7B illustrate AAV2-carried mGluR6-eMCO1 (vMCO1) transfection of cells. FIG. 7A depicts Three-dimensional reconstruction of eMCO1 expression in HEK 293 cells, scale bar: 30 µm. FIG. 7B shows Three-dimensional reconstruction of eMCO1 expression in Whole retinal cup, scale bar: 0.8 mm.

FIGS. 8A and 8B show the patch-clamp recording of MCO1 transfected retina. FIG. 8A shows eMCO1 expression in the cells of mice retina explant. FIG. 8B shows Inward photocurrent induced by light pulse (100 ms) train.

FIGS. 9A-9F shows dose and time dependent layer-specific expression of MCO1 in rd10 mice after vMCO1 injection. FIG. 9A shows Fluorescence confocal image of rd10 mouse retina cup after 1 week of intravitreal vMCO1 injection. FIG. 9B shows Fluorescence confocal image of rd10 mouse retina cup 8 weeks after intravitreal injection of vMCO1. Scale bar: 200 µm. FIG. 9C shows Confocal fluorescence image of folded edge of retinal cup transfected with vMCO1 at dose of $1.6\times10^{11}$ VG/ml. Scale bar: 100 µm. FIG. 9D shows Cross-sectional view of vMCO1 expression in retina 16 weeks after intravitreal injection at dose of $1.6\times10^{12}$ VG/ml. Scale bar: 50 µm. FIG. 9E shows Kinetics of MCO1 expression in rd10 mice retina at two different doses of vMCO1. Average±SD. FIG. 9F shows Inter-animal variation of MCO1-mCherry (eMCO1) expression (after background subtraction) in retina of rd10 mice 16 weeks after transfection at dose of $1.6\times10^{12}$ VG/ml. Average+SD. * p<0.01 vMCO1 injected vs. non-injected.

Figure 10A:
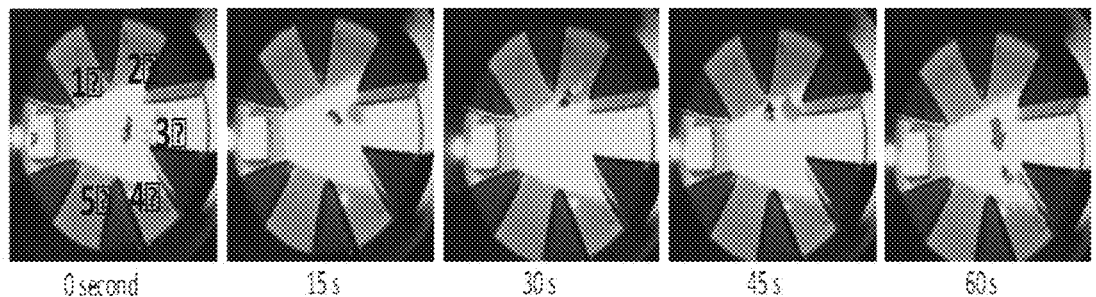
Figure 10B:
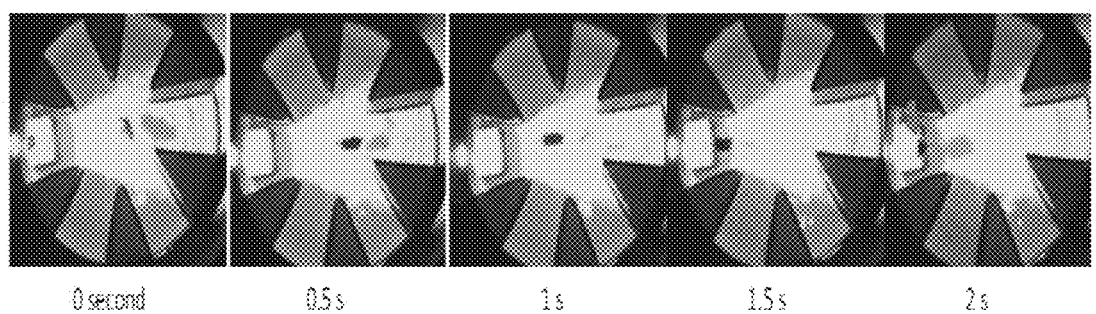
Figure 10C:
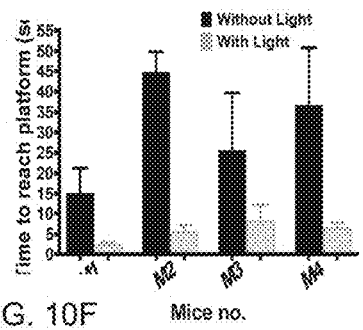
Figure 10D:
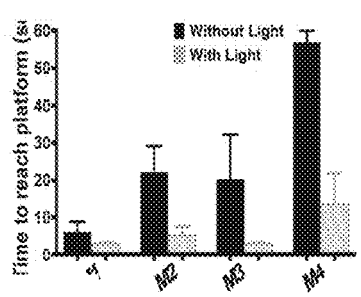
Figure 10E:
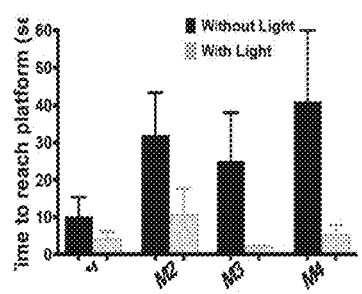
Figure 10F:
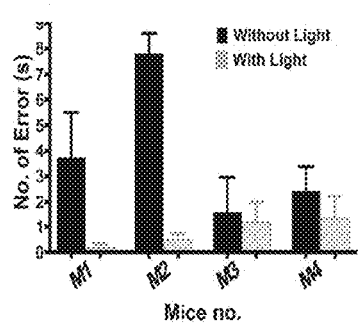
Figure 10G:
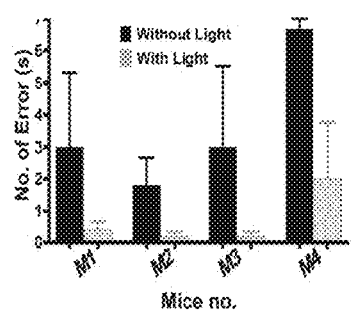
Figure 10H:
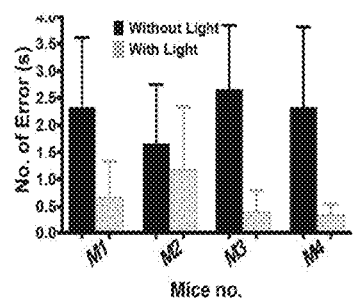

FIGS. 10A-10H show visually guided improvement in rd10 mice behavior in radial water maze. FIG. 10A shows Time-lapse images of visually guided rd10 mice behavior in radial water maze with white LED light before intravitreal vMCO1 injection. FIG. 10B shows Behavior of rd10 mouse with LED light ON six weeks after vMCO1 injection. FIG. 10C shows Latency to find the platform by the vMCO1 treated rd10 mouse, with and without light, dropped at center of the maze. Average±SEM. N=5 for each mouse. FIG. 10D depicts Latency to find the platform by the vMCO1 treated rd10 mouse, with and without light, dropped at side arms-2 & 4 of the maze. Average±SEM. N=5 for each mouse. FIG. 10E depicts Latency to find the platform by the vMCO1 treated rd10 mouse, with and without light, dropped at edge arm-3 of the maze. Average±SEM. N=5 for each mouse. FIG. 10F shows Number of error arms traversed by the vMCO1 treated rd10 mouse dropped at center before finding the platform in presence and absence of light. Average±SEM. N=5 for each mouse. FIG. 10G shows Number of error arms traversed by the vMCO1 treated rd10 mouse dropped at side arm before finding the platform in presence and absence of light. Average±SEM. N=5 for each mouse. FIG. 10H shows Number of error arms traversed by the vMCO1 treated rd10 mouse dropped at edge before finding the platform in presence and absence of light. Average±SEM. N=5 for each mouse.

FIGS. 11A and 11B show longitudinal study of visually guided improvement in rd10 mice behavior in radial water maze. FIG. 11A depicts Schematic of the radial-arm water maze used to test improvement in visually guided behavior of vMCO1 injected rd10 mice. FIG. 11B shows the Time to reach platform by the rd10 mice from center of the maze (light intensity: 0.007 mW/mm2) before vMCO1 injection and as a function of post-injection period. N=5; Average±S.D. *P<0.05. FIG. 11C shows the Time to reach platform by the rd10 mice from near arm of the maze (light intensity: 0.014 mW/mm$^2$) before vMCO1 injection and as a function of post-injection period. N=5; Average±S.D. *P<0.05. FIG. 11D plots the Time to reach platform by the rd10 mice from side arm (light intensity: 0.004 mW/mm$^2$) before vMCO1 injection and as a function of post-injection period. N=5; Average±S.D. *P<0.05.

FIG. 12 shows the Light-intensity dependence of improvement in rd10 mice behavior in radial water maze. Comparison of time to reach platform from center of the maze between two different light intensities as a function of post-injection period. Average±S.D. *P<0.01. L0=0.0005 mW/mm$^2$; L2=0.007 mW/mm$^2$. Bright ambient level is ~0.01 mW/mm$^2$.

Figure 13A:
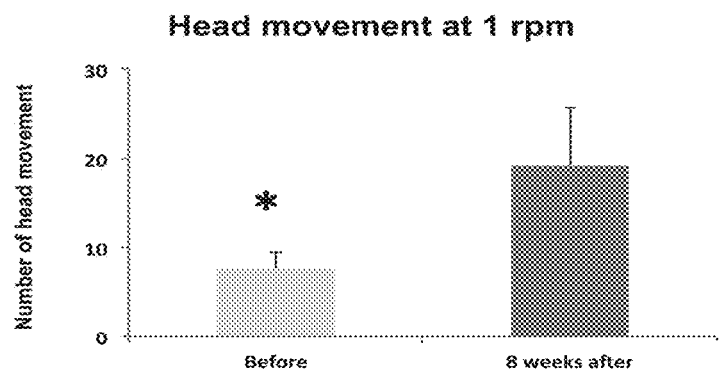
Figure 13B:
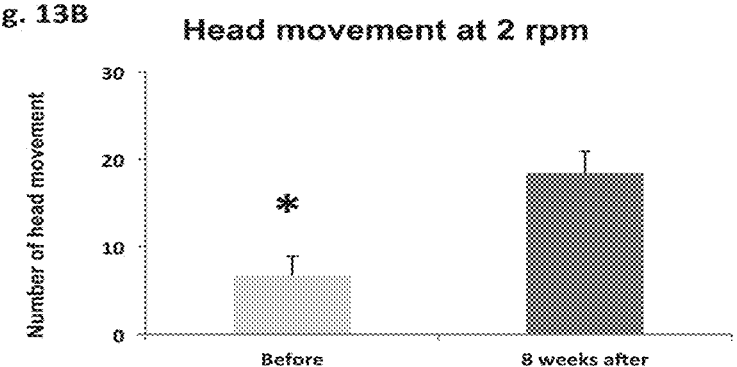

FIGS. 13A and 13B show optokinetic assessment of rd10 and MCO-sensitized rd10 mice. FIG. 13A shows Quantitative comparison of number of head movement of rd10 mice before and 8 weeks after vMCO1 injection at speed of rotation of the vertical stripes at 1 rpm. N=4 mice. Average+ SD. *p<0.05. The light intensity at the center of the chamber is 0.001 mW/mm$^2$. FIG. 13B shows Quantitative comparison of number of head movement of rd10 mice before and 8 weeks after vMCO1 injection at speed of rotation of the vertical stripes at 2 rpm. N=4 mice. Average+SD. *p<0.05. The light intensity at the center of the chamber is 0.001 mW/mm$^2$.

Figure 14A:
Figure 14B:
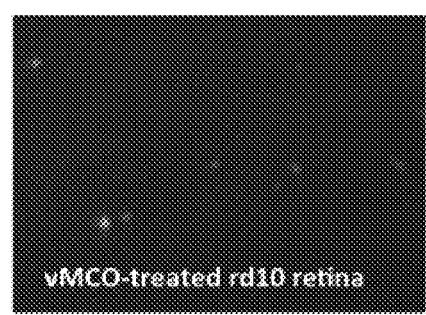
Figure 14C:
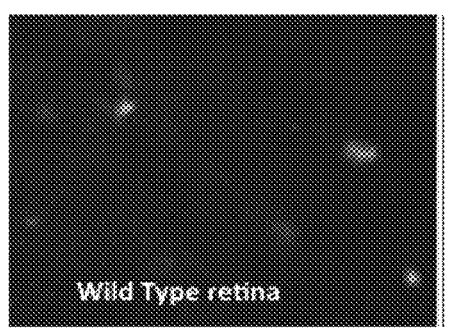
Figure 14D:
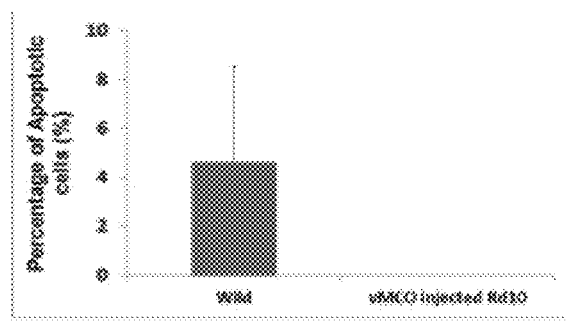

FIGS. 14A-14D show viability of MCO1 sensitized retinal cells after chronic light exposure. FIG. 14A shows that Similar to the wild-type (non-blind) mice, vMCO1 treated rd10 mice avoid bright light by staying away and blocking light (via creating a heap out of bedding material, as shown in the arrow). FIG. 14B shows Fluorescence image of retina stained with Caspase-3 (green) for vMCO1-treated rd10 mouse 4 weeks after 8-hr/day illumination of white light (intensity: 0.1 mW/mm$^2$). FIG. 14C shows Fluorescence image of retina stained with Caspase-3 (green) for wild-type mouse 4 weeks after 8-hr/day illumination of white light (intensity: 0.1 mW/mm$^2$). FIG. 14D shows Quantitative comparison of % apoptotic retinal cells between wild type and vMCO1 treated rd10 mice. 0% apoptotic cells in inner nuclear layer of vMCO1 treated rd10 mice.

Figure 15A:
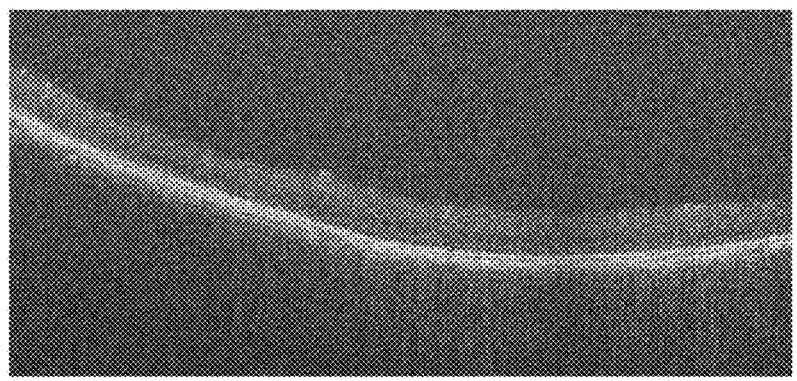
Figure 15B:
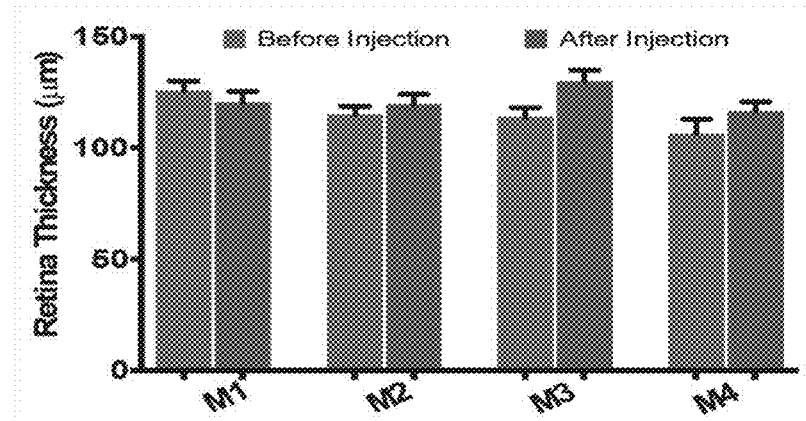

FIGS. 15A and 15B show results of evaluation of structural integrity of retina after vMCO1 injection in rd10 mice. FIG. 15A shows an OCT image of rd10 mice retina after vMCO1 injection. FIG. 15B shows the Comparison of retinal thickness of 4 different rd10 mice before and 1 week after injection. N=10 B-scans/mice. Average+SD.

FIGS. 16A-16C show results of immune-toxicity in vMCO1 injected rd10 mice. FIG. 16A shows Quantitative comparison of IL-6 (pro-inflammatory marker) in plasma between group-1 (1.6×10$^{10}$ VG/ml) and group-2 (1.6×10$^{11}$ VG/ml) before and after 7 and 14 days of vMCO1 injection. N=5 mice/group. Average±SD. FIG. 16B shows Quantitative comparison of IL-10 (anti-inflammatory marker) in plasma between group-1 (1.6×10$^{10}$ VG/ml) and group-2 (1.6×10$^{11}$ VG/ml) before and after 7 and 14 days of vMCO1 injection. N=5 mice/group. Average±SD. FIG. 16C shows Quantitative comparison of IFN-Y (pro-inflammatory marker) in plasma between group-1 (1.6×10$^{10}$ VG/ml) and group-2 (1.6×10$^{11}$ VG/ml) before and after 7 and 14 days of vMCO1 injection. N=5 mice/group. Average±SD.

FIG. 17 shows biodistribution of AAV2 packaged Multi-Characteristics Opsin (vMCO1). QPCR detection of vector sequences in rd10 mice at different doses and post-injection period very small or non-detectable quantities of vector DNA in tissues outside of the treated eyes. N=5 mice/dose/time-point FIGS. 18A-18F show immunohistochemistry of vMCO1 injected rd10 mice eye. FIG. 18A shows that MCO-mCherry (red) is selectively targeted and expressed in INL of rd10 mice 8 wks after intravitreal injection of vMCO1. The absence of arrestin (green) suggests a complete loss of photoreceptors. FIG. 18B shows PKCa stain (green) in rod bipolar cells expressing mCherry (red, intrinsic) in rd10 mice 8 wks after intravitreal injection of vMCO1. FIG. 18C shows mGluR6 stain (green) in ON bipolar cells expressing mCherry (red) in rd10 mice 8 wks after intravitreal injection of vMCO1. FIG. 18D shows mCherry (green-immunostained) expression in rd10 retina 8 wks following intravitreal delivery of vMCO1 to rd10 mice. FIG. 18E shows that GFAP (green) in rd10 mice 18 wks after intravitreal injection of vMCO1 as reported in photoreceptor degenerated retina. FIG. 18F shows no CD45 (green) expression suggesting no immune cells in rd10 mice 8 wks after intravitreal injection of vMCO1.

FIG. 19 illustrates the structure of eMCO1 and activation of its different domains by light. Blue light activates the trans-membrane (TM) domain (ion-channel) of eMCO1 allowing a flow of cations. Green & Red light activates the non-TM, middle domain (non-ion channel).

FIG. 20A shows the Inward current profile measured at blue (450 nm) light intensity of 0.06 mW/mm$^2$ in HEK cell transfected with eMCO1.

FIG. 20B shows the inward current profile measured at green (520 nm) light intensity of 0.06 mW/mm$^2$ in HEK cell transfected with eMCO1.

FIG. 20C shows the inward current profile measured at red (630 nm) light intensity of 0.06 mW/mm$^2$ in HEK cell transfected with eMCO1.

FIG. 20D shows Inward current profile measured at blue (450 nm) light intensity of 0.06 mW/mm$^2$ in HEK cell transfected with eMCO1, in presence of Ca$^{2+}$ chelator (BAPTA).

FIG. 20E shows the comparison of photocurrent in cells generated by light of different wavelengths and the effect of the presence of Ca$^{2+}$ chelator (BAPTA) on eMCO1 trans-membrane-domain function that has been probed by blue (450 nm) light activation. Average±SEM. FIG. 20F shows the comparison of light activation ON-time generated by blue and green light. Average±SEM, *p<0.05.

Figure 21A:
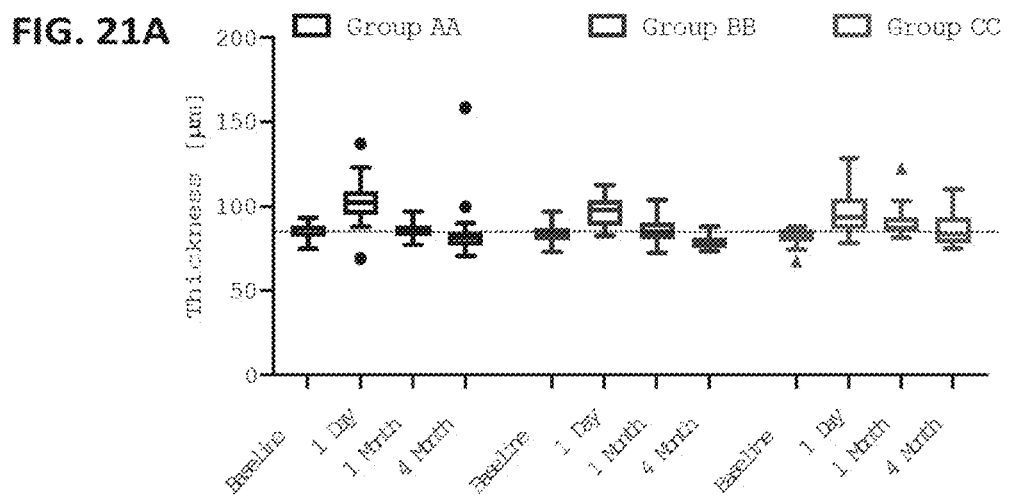

FIG. 21A shows results of longitudinal monitoring of retina of rd mice with SDOCT before and after different doses of AAV2-eMCO1 or AAV2-vehicle injection. Group AA: 1.0×10$^{12}$ VG/ml AAV2-eMCO1 (vMCO1); group BB: 1.0×10$^{12}$ VG/ml AAV2 (no transgene); and group CC: 1.0×10$^{10}$ VG/ml AAV2-eMCO1. Comparison of retinal thickness before, day 1, month 1 and 4 after injection in different groups and sexes in each group. Average±SEM.

Figure 21B:
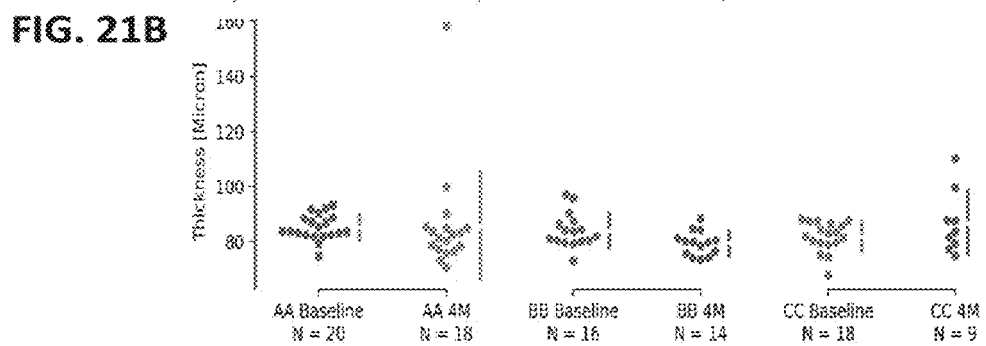

FIG. 21B shows the scattered plot showing comparison of retinal thickness before, and 4 months after injection in different groups. Group AA: 1.0×10$^{12}$ VG/ml AAV2-eMCO1; group BB: 1.0×10$^{12}$ VG/ml AAV2 (no transgene); and group CC: 1.0×10$^{10}$ VG/ml AAV2-eMCO1.

Figure 21C:
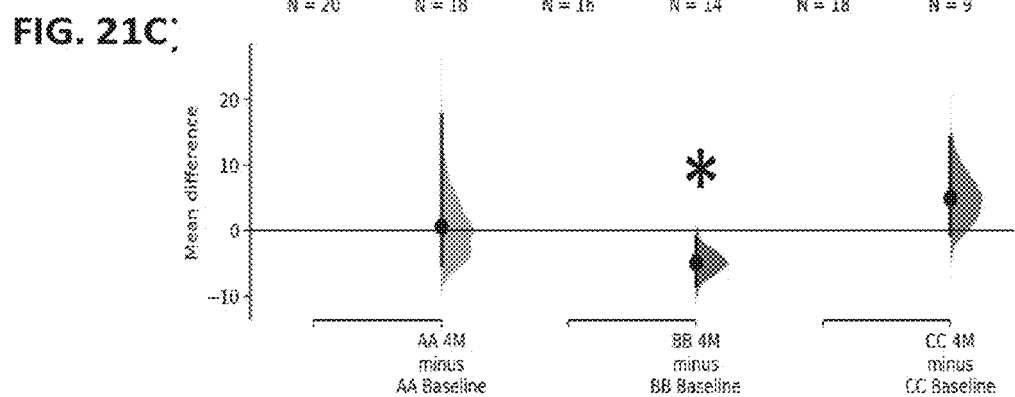

FIG. 21C shows the mean difference of retina-thickness between baseline and intravitreally-injected mice shown as Gardner-Altman estimation plot. Group AA: 1.0×10$^{12}$ VG/ml AAV2-eMCO1; group BB: 1.0×10$^{12}$ VG/ml AAV2 (no eMCO1); and group CC: 1.0×10$^{10}$ VG/ml AAV2-eMCO1. The curve indicates the resampled distribution of the mean difference, given the observed data. The 95% confidence level of the mean difference is illustrated by the black vertical line. * p<0.05 in Group BB between Baseline and 4 months after vehicle injection.

Figure 22A:
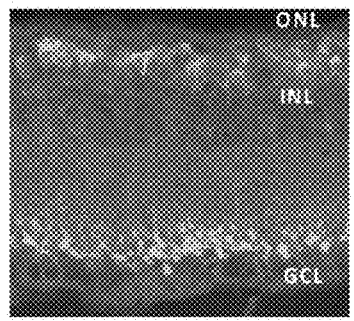

FIG. 22A shows the PKCa stain (green) showing rod bipolar cells expressing mCherry (red, intrinsic) in rd10 mouse after intravitreal injection of AAV2-eMCO1. ONL: Outer Nuclear layer; INL: Inner Nuclear Layer; GCL: Ganglion Cell Layer.

Figure 22B:
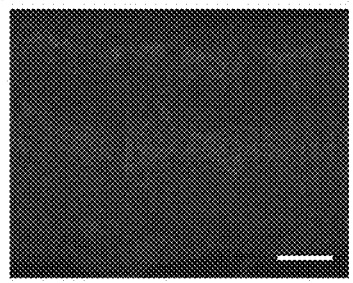

FIG. 22B shows eMCO1 (mCherry: red reporter) expression in bipolar cells (INL) of rd10 mouse after intravitreal injection of AAV2-eMCO1.

Figure 22C:
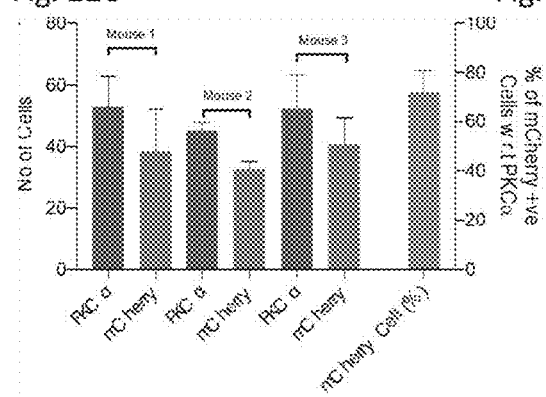

FIG. 22C shows the quantification of eMCO1 (reporter mCherry) expression in bipolar cells of three rd10 mice.

Figure 22D:
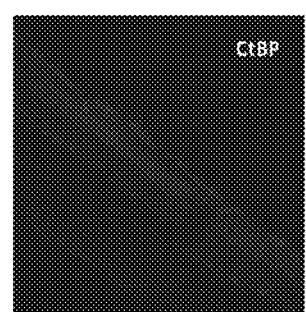

FIG. 22D shows the immunostained cross-sections of the retina showing Bipolar cell terminals (green: PKCa) costoring CtBP (a synaptic ribbon marker, red) in close contact with retinal ganglion cells (RGCs) in the AAV2-eMCO1 treated rd10 mouse retina.

Figure 22E:
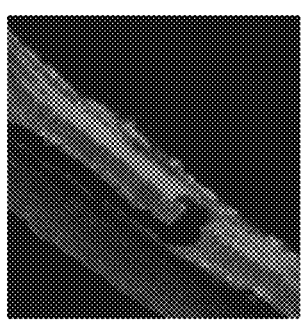

FIG. 22E shows the images of immunostained cross-sections of the retina showing Bipolar cell terminals (green: PKCa) costoring CtBP (a synaptic ribbon marker, red) in close contact with retinal ganglion cells (RGCs) in the untreated rd10 mouse retina.

Figure 22F:
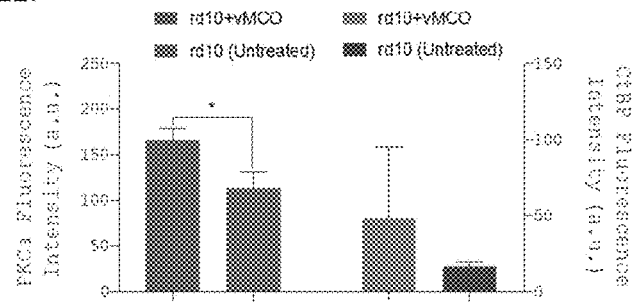

FIG. 22F illustrates stronger PKCa immunostained signal in axonal terminals (*p<0.05) and CtBP signal is found in the AAV2-eMCO1 treated rd10 mice retina.

Figure 23A:
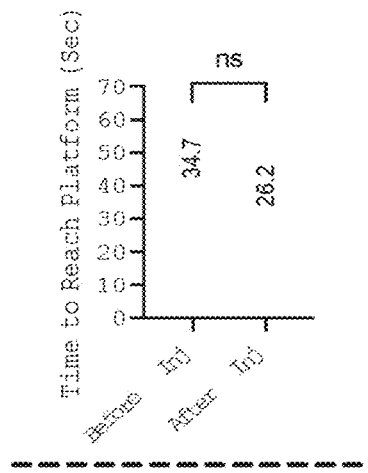

FIG. 23A illustrates the time to reach platform by the Stargardt (ABCA4−/−) mice from side-arms of the radial-arm water maze (light intensity: 0.004 mW/mm$^2$) before and after AAV2 (no transgene, -ve control) injection. N=5; Average±S.D, ns: Not statistically significant.

Figure 23C:
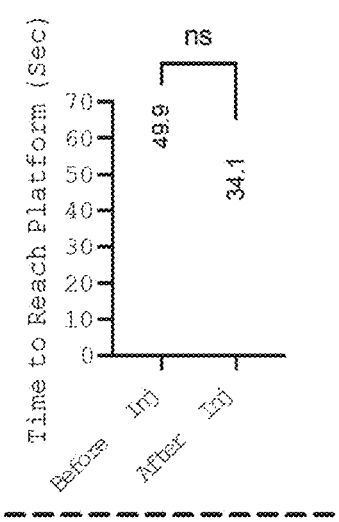
Figure 23B:
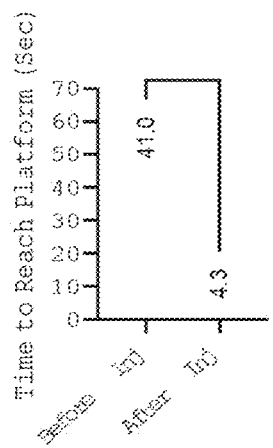

FIG. 23B shows the time to reach platform by the Stargardt (ABCA4−/−) mice from side-arms of the radial-arm water maze (light intensity: 0.004 mW/mm$^2$) before and after AAV2-eMCO1 (vMCO1) injection. N=5; Average±S.D. ****p<0.001.

FIG. 23C plots the time to reach platform by the Rpe65rd12 (LCA) mice from side-arms of the radial-arm water maze (light intensity: 0.004 mW/mm$^2$) before and after AAV2 (no transgene, -ve control) injection. N=5; Average±S.D, ns: Not statistically significant.

Figure 23D:
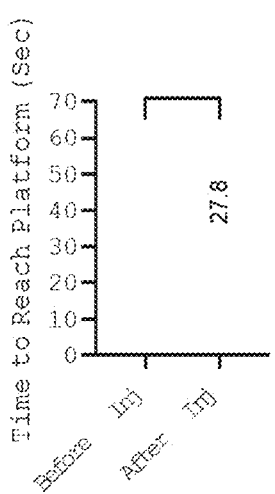

FIG. 23D shows the time to reach platform by the Rpe65rd12 (LCA) mice from side-arms of the radial-arm water maze (light intensity: 0.004 mW/mm$^2$) before and after AAV2-eMCO1 injection. N=5; Average±S.D. **p<0.01.

Figure 24A:
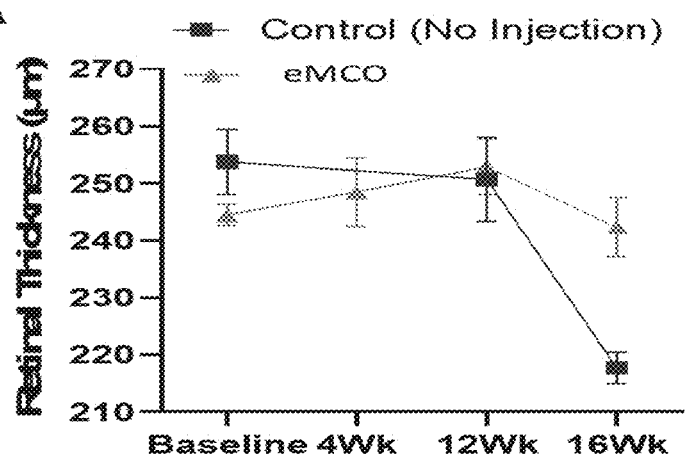

FIG. 24A shows results of longitudinal monitoring of retina of Abca4$^{tm1Ght/J}$ Stargardt mice using SDOCT before and after AAV2-eMCO1 injection as compared to control (non-injected group). Comparison of retinal thickness before, Week 4, 12 and 16 after injection. Average±SEM.

Figure 24B:
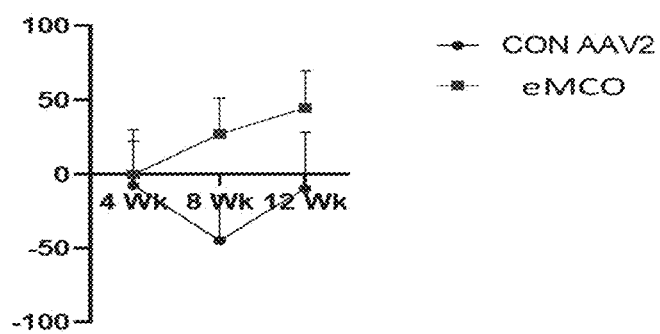

FIG. 24B shows the measured change in ERG b-wave amplitude (with respect to baseline) at 1 cd. s/m$^2$ of Abca4$^{tm1Ght/J}$ Stargardt mice after AAV2-eMCO1 injection as compared to control (non-injected group).

Figure 24C:
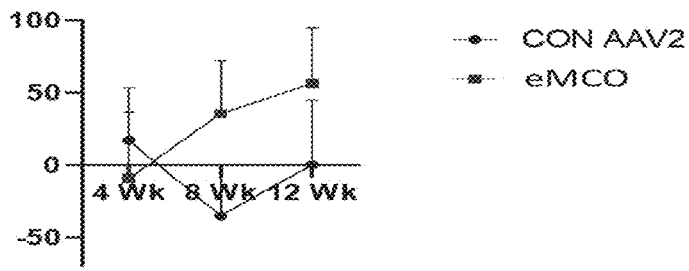

FIG. 24C shows the change in ERG b-wave amplitude (with respect to baseline) at 10 cd. s/m$^2$ of Abca4$^{tm1Ght/J}$ Stargardt mice after AAV2-eMCO injection as compared to control (non-injected group).

Figure 25:
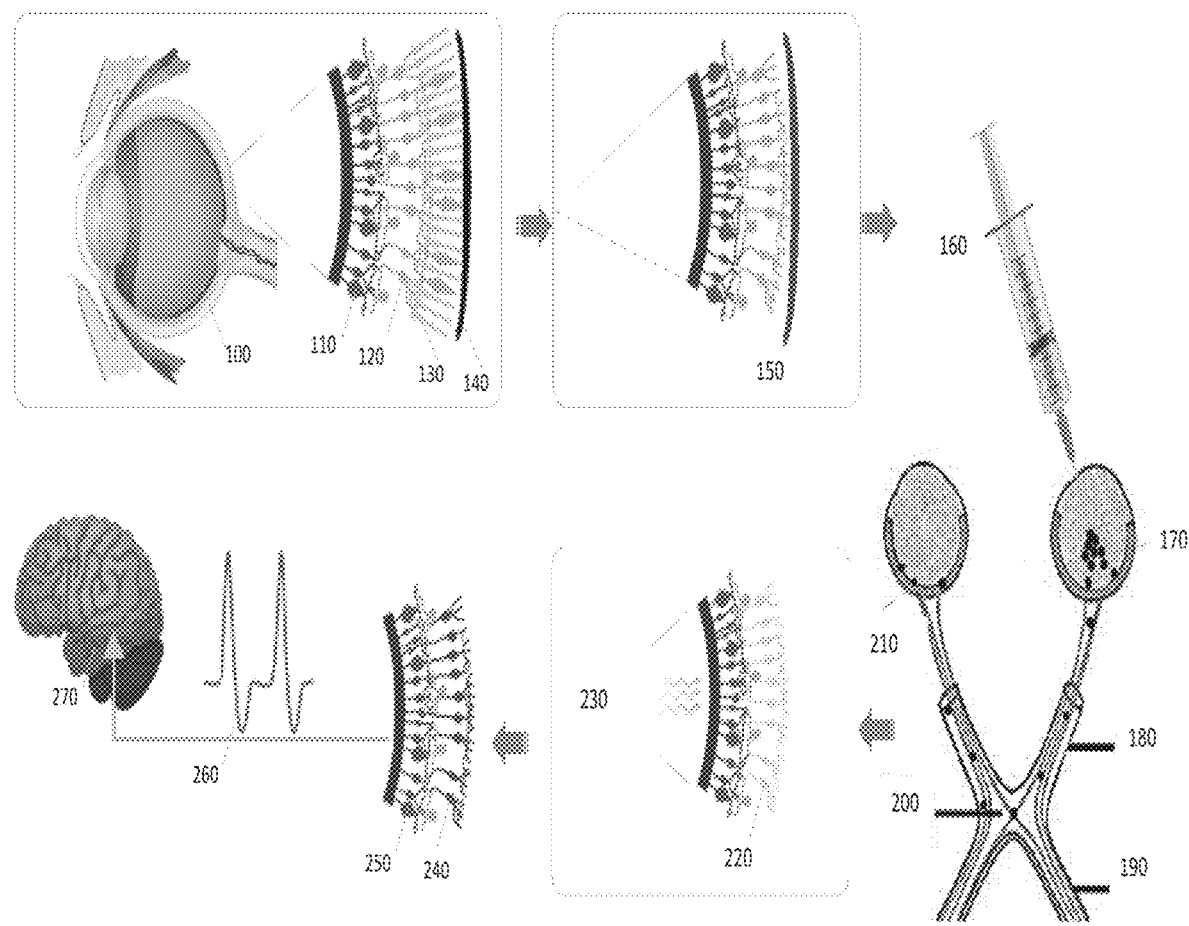

FIG. 25 illustrates the method of vison restoration via intraocular eMCO1 administration. 100: Retina; 110: Retinal Ganglion cells; 120: Bipolar cells; 130: photoreceptors; 140: Retinal pigment epithelium; 150: Loss of photoreceptors/retinal pigment epithelium; 160: Delivery device; 170: AAV-carried eMCO1; 180: Optic nerve; 190: Optic tract; 200: Optic Chiasm; 210: Transfer of AAV2-carried eMCO1 to contralateral eye; 220: AAV2-eMCO1 Transduced retinal cells; 230: Projected external visual field; 240: Light-activated bipolar cells; 250: Activated retinal ganglion cells; 260: Electro-chemical signal transmitted via optic nerve; 270: Brain for visual processing of light-activated signal received from eMCO1-sensitized retina.

Figure 26A:
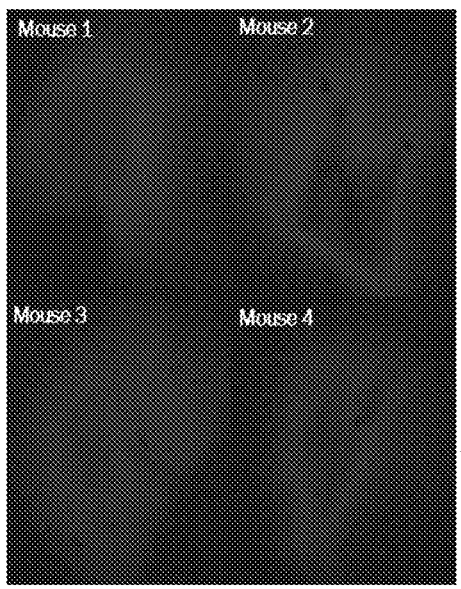

FIG. 26A shows eMCO1 gene expression in retina subsequent to intravitreal injection in mice. Reporter (mCherry) fluorescence images of retina cups from mice (N=4) eyes, 6 months after intravitreal injection with 1 µl of 1E12 vg/ml AAV2-eMCO1 (vMCO1).

Figure 26B:
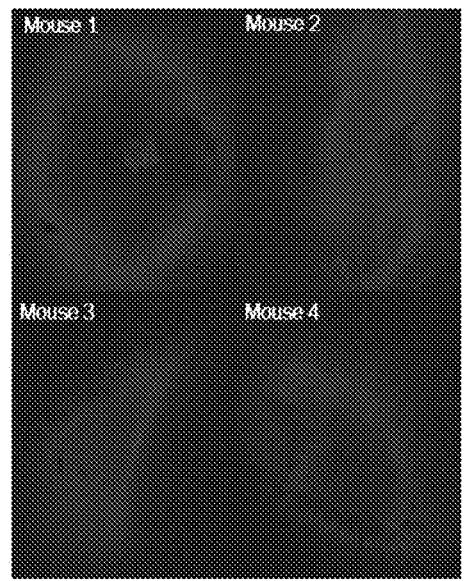
Figure 26C:
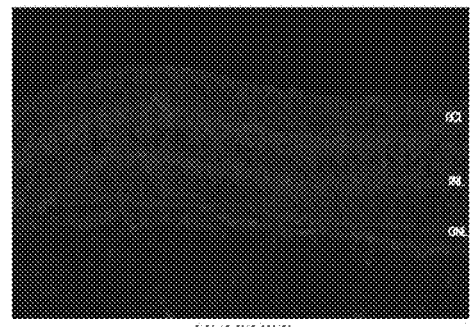

FIG. 26B shows contralateral transfer of eMCO1 gene and expression in retina subsequent to uniocular intravitreal injection in mice. Reporter (mCherry) fluorescence images of retina cups from mice (N=4) eyes, 6 months after intravitreal injection of 1 µl of 1E12 vg/ml AAV2-eMCO1 (vMCO1). FIG. 26C shows reporter (mCherry) immunofluorescence image of retina slice from a dog eye 4 months after uniocular (right eye) intravitreal injection with 75 µl of 2E11 VG/ml vMCO1. GCL: Ganglion Cell Layer; INL: Inner Nuclear layer; ONL: Outer Nuclear layer.

Figure 26D:
Figure 26E:
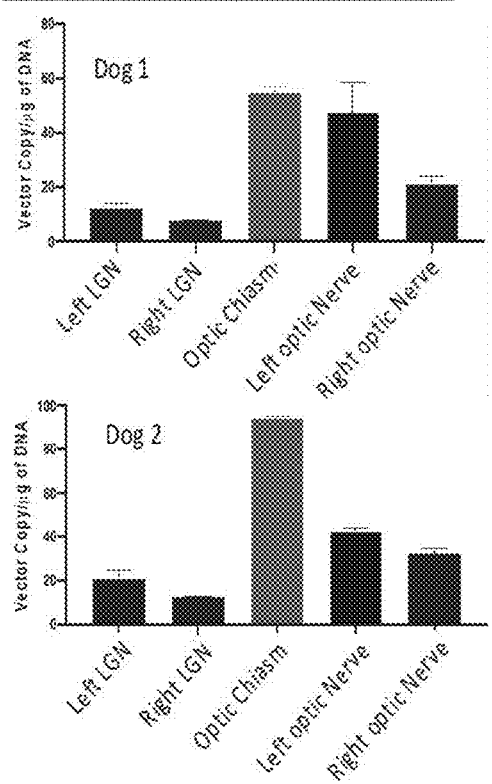

FIG. 26D shows evidence of contralateral transfer of eMCO1 gene and expression in retina subsequent to uniocular intravitreal injection in a dog. Immunofluorescence image of eMCO1 reporter (mCherry) in contralateral (left eye) retina. GCL: Ganglion Cell Layer; INL: Inner Nuclear layer; ONL: Outer Nuclear layer. FIG. 26E shows qPCR detection of vMCO1 vector sequences in tissues of visual system of dogs 1 and 2, after uniocular intravitreal injection of right eye with 75 µl of 2E11 VG/ml AAV2-eMCO. Av±SD.

Figure 27A:
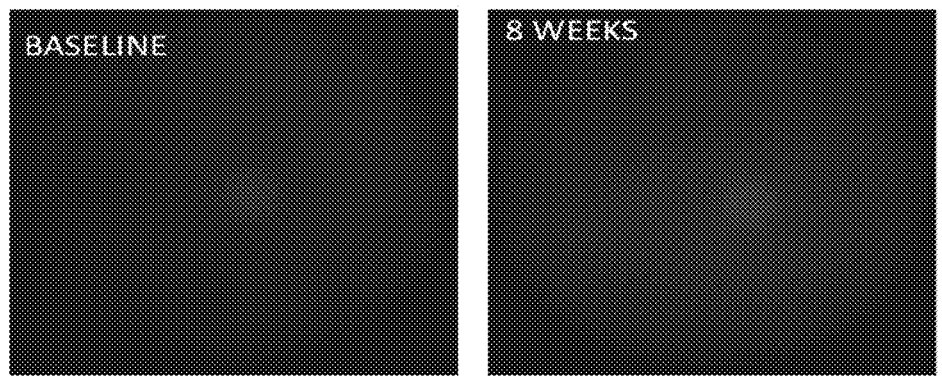
Figure 27B:
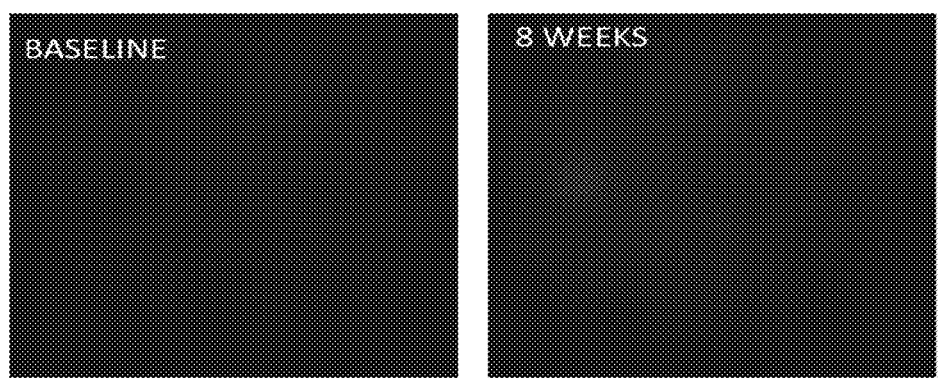
Figure 27C:
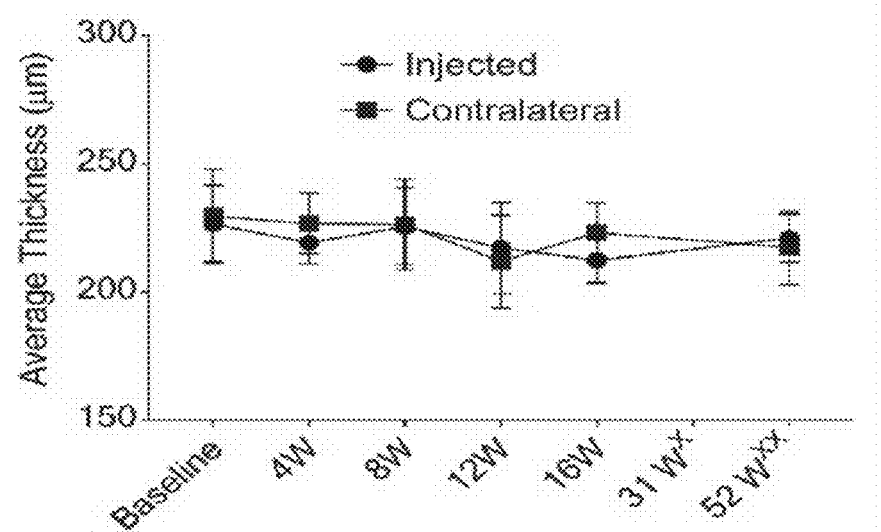

FIG. 27A shows the fundus imaging of mCherry (reporter for eMCO1) fluorescence. FIG. 27B shows the fundus imaging of mCherry(reporter) fluorescence showing enhancement in contralateral eye, 8 week after AAV2-eMCO1 injection in Retinitis Pigmentosa patient. FIG. 27C shows results of longitudinal monitoring of retinal thickness in injected and contralateral eyes by OCT imaging after injection of AAV2-eMCO1 in in Retinitis Pigmentosa patient. N=11, Av±SD. $^X$ 31 weeks data is missing patients 2-4, and 7-9 due to COVID-related lockdown; $^{XX}$ 52 weeks data does not include patient 8, who did not travel due to COVID-situation.

Figure 28:
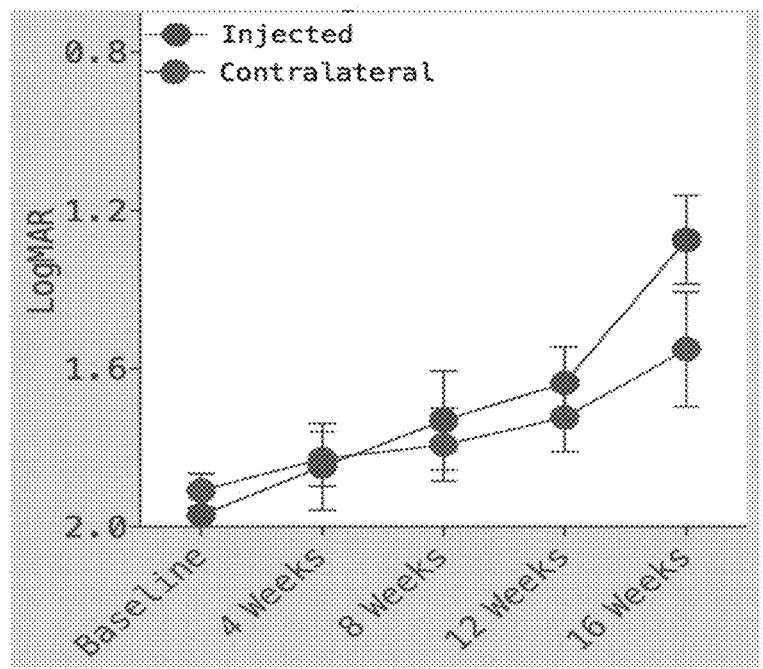

FIG. 28 shows results of longitudinal monitoring of Visual Acuity (LogMAR) in AAV2-eMCO1 injected (3.5E11 vg) and contralateral eyes of patients with severe retinal degeneration. Mean±SEM (N=8).

Figure 29A:
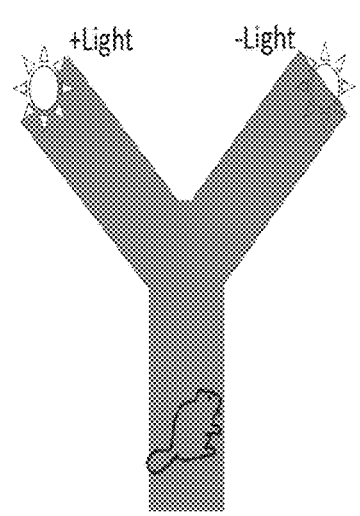
Figure 29B:
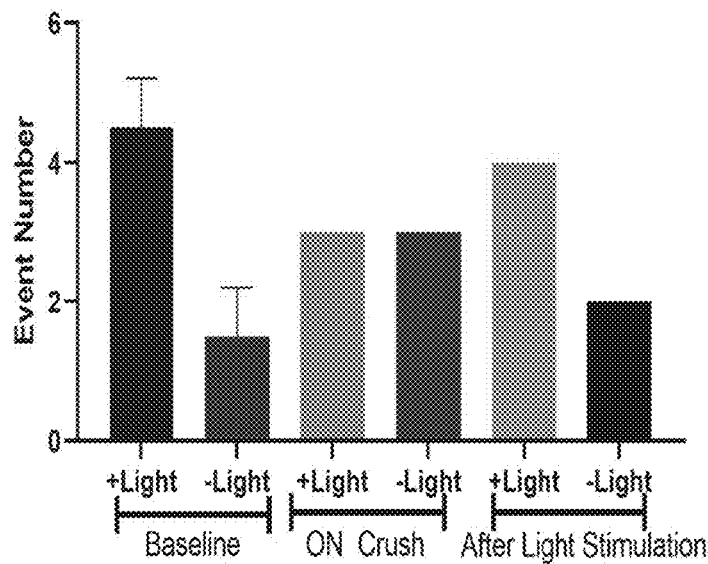

FIGS. 29A and 29B show improved visually-guided behavior in mice with opsin-sensitized retinal ganglion cells being stimulated by a strobe light of frequency ~0.5 Hz. FIG. 29A shows the Schematic of Visually-guided Y-mobility assay to evaluate vision in mice. +Light: Light ON; −Light: Light OFF. FIG. 29B shows the Number of events (finding Light ON vs. OFF) by mice for different conditions. Baseline: No optic nerve crush; ON crush: Optic nerve crush; After Light Stimulation: 2 weeks after (8 hours/day) 0.5 Hz strobe light stimulation of opsin-sensitized retinal ganglion cells in optic nerve crush mice.

DETAILED DESCRIPTION OF THE INVENTION

Modulation of cellular activities by electrical and other means has enabled quantitative evaluation of cellular characteristics and changes associated with disease progression. Opsins (light-sensitive ion-channel proteins) or ligands in combination with light have been used for modulation of cellular activity and can be used for different therapeutic applications including vision restoration, as well as for drug screening.

Since higher order neurons are still intact in degenerated retina, several stimulation methods target the higher order neurons, e.g. Bipolar cells and retinal Ganglion cells, which carry the visual information to the visual cortex. While direct electrical stimulation approaches require mechanical contact of electrodes to the retinal cells, indirect stimulation approaches such as optogenetic stimulation does not necessitate such physical contact. Thus, the indirect methods provide clear advantage of being non-intrusive. In addition, cellular specificity and high (single cell) resolution can be achieved while using optogenetic stimulation.

In order to achieve optogenetic stimulation of retinal neurons, the cells are generally transfected by a virus to express opsin (light-sensitive molecular ion-channel and ligand as well as enhancer), which is then activated. The opsin depolarizes the opsin-expressing cells following illumination by light of a specific visible wavelength. For example, retinal cells expressing Channelrhodopsin-2 (ChR2) are sensitive to blue light.

Various light-activated ion channels (opsins) and ligands have been developed to either enhance photosensitivity of cells, or to be activated by different wavelengths of visible light. In order to be activated by broadband visible light, complex of three opsins (ChR2 for blue, C1V1 for green, and ReaChR for red photosensitivity) has been delivered to cells by chemical or physical method. However, such large complexes cannot be packaged into commonly used viral vectors (i.e. Adeno-Associated Virus). Further, use of a chemical or physical method for delivery is less efficient and/or compromises cell viability, thus limiting their ready usefulness.

The opsins developed and utilized to date for vision restoration, when stimulated by light, do not produce a characteristic photoreceptor-rod signal, i.e., the voltage signal does not have a slower depolarizing phase after an initial fast response. The present invention provides for an effective optogenetic vision restoration at a low light level.

The present invention provides for vision restoration by optogenetics, protein administration or gene therapy methods by delivering an opsin or other genes, through methods that include viral means (e.g. recombinant adeno-associated virus, rAAV), and where the administration is into the vitreous of the eye.

In an embodiment, the present disclosure comprises an ability to produce characteristic photoreceptor-rod signal that do not require an external active stimulation device. This embodiment avoids obstacles that are associated with or encountered by existing opsin-based approaches. In an embodiment, the present invention provides for the restoration of an individual's vision that is lost due to a retinal degenerative disease. Further advantage of the present invention is that the method of delivering opsin/other therapeutic gene include a combination of rAAV and chemical agent that can transiently permeabilize the inner limiting membrane of the human eye.

The present invention highlights the unique structure of eMCO leading to fast light induced activity of cells at low light threshold and over a broad spectral range. The blue light activates the trans-membrane (TM) domain of eMCO1 that in an embodiment acts as an ion channel. In a further embodiment a red light absorbed by the non-TM, middle domain (non-ion channel) leads to a conformational change of an eMCO1-TM domain, which in turn leads to an ion flow via the eMCO1 TM-domain. In another embodiment, absorption of a green light by a C-terminus domain (RFP) results in the emission of a red light that enhances the eMCO1 efficacy.

In another embodiment, the present invention provides for the expression of an enhanced Multi-Characteristic Opsin (eMCO1) in cells in-vitro or in-vivo, as well as methods for modulating cellular activities by different wavelengths of visible light.

Currently, use of optogenetic sensitization of retinal cells combined with activation/inhibition has allowed the possibility of replacing the retinal implants, eliminating the requirement of placing electrodes near every single neuron for high resolution (4). Optogenetic stimulation provides high temporal precision (5-10) by introducing light-activatable molecular channels (e.g. channelrhodopsin-2, ChR2; halorhodopsin, NpHR) into cells by genetic targeting. In addition to higher temporal and spatial resolution, optogenetics has several advantages over electrical stimulation such as cellular specificity (e.g. spared cones, ganglion or bipolar cells) and minimal invasiveness (11). Light-induced activation of ChR2, a non-selective cation channel, results in depolarization of only those cells that express ChR2. Selective activation of neurons by ms-pulsed blue light has been demonstrated in culture (9), brain slices, as well as in small animals (12-15). This optogenetic activation method is very promising for controlling cellular activities in-vitro as well as in-vivo as it only requires light of moderate intensity ($\sim 0.1$ mW/mm$^2$) that can be delivered from a light emitting diode (LED) or laser (5, 6).

The present disclosure provides several light-sensitive ion-channel and ligand molecules (Multi-Characteristics Opsins) made by synthetic means: (i) having high photosensitivity at multiple visible wavelengths, (ii) with plasmid size small enough to be packaged into safe Adeno Associated Virus. The invention also includes isolated nucleic acid sequences that encode light-sensitive ion-channels and ligands of the invention, and constructs that comprise such nucleic acid sequences. In some embodiments MCOs that find use the methods disclosed herein comprise amino acids as shown in Tables 1-4, 7 and as represented by SEQ ID NOS: 1, 3, 5, 7, or 11. In some embodiments the MCO has at least around 70, or 75, or 80, or 85 or 90 or 95, or 96 or 97, or 98 or 99% identity with a sequence as shown in SEQ ID NOS: 1, 3, 5, 7, or 11, wherein said MCO has the photosensitivity characteristics of SEQ ID NOS: 1, 3, 5, 7, or 11. In some embodiments, the MCO is encoded by a nucleic acid as shown in Tables 1-4, 7 and as represented by SEQ ID NOS: 2, 4, 6, 8, or 12. In some embodiments the nucleic acids encoding the MCO have at least around 70, or 75, or 80, or 85, or 90, or 95, or 96, or 97, or 98 or 99% identity with a sequence as shown in SEQ ID NOS: 2, 4, 6, 8, or 12, wherein said encoded MCO has the photosensitivity characteristics of SEQ ID NOS: 1, 3, 5, 7, or 11.

The nucleic acids encoding the MCO find use when incorporated into vectors for delivery to a patient in need thereof. In some embodiments the vectors are plasmids with appropriate promoters as is known in the art. In some embodiments the vectors are viral vectors. Viral vectors that find use in the methods disclosed herein include adenovirus vectors, adeno-associated virus vectors, and the like.

The invention in some aspects includes expression of Multi-Characteristics Opsins (MCOs) in cells in-vitro or in-vivo as well as methods for modulating cellular activities by these synthetic opsins.

One of the examples where MCO is used for treatment of disease is blindness caused by retinal degenerative diseases. Retinitis Pigmentosa (RP) and age-related macular degeneration (AMD) refer to disorders characterized by degeneration of photoreceptors in the eye, which hinders visual ability by non-functional neuronal activation and transmission of signals to the visual cortex (16-20). While AMD is the leading cause of new vision loss in ~15 million persons older than 65 years of age (21), the prevalence of RP is at least one million individuals world-wide (22, 23). RP is most often inherited as an autosomal recessive trait with large number of cases having this form of inheritance (18, 22, 24). Further, the degree of visual loss increases with ageing (25) and this is a major concern for our demographic changes towards elderly population.

Most of the current clinical treatments are primarily focused on slowing down the progression of the disease (26), as there is neither a cure that can stop the degeneration (27) nor a therapy, other than retinal prostheses, that can restore vision lost due to the degeneration (28). Partial restoration of vision involves invasive surgical procedure for retinal implants (29). Two different types of retinal implants are being developed: subretinal and epiretinal implants (30). The subretinal implants are positioned in the area of the retina where the photoreceptor cells reside, between the pigmented epithelium and the bipolar cells (31). These retinal prostheses have been successful in generating visual perception in blind subjects (32-34). The disadvantages of using such subretinal implants include (i) chronic damage of the implanted electrodes, and (ii) insufficient current produced by microphotodiode from the ambient light to stimulate adjacent neurons (35, 36). The epiretinal implants are placed in the area of the retinal ganglion cells (RGCs) and the device functions by stimulating the RGCs in response to input obtained from a camera that is placed outside of the eye or within an intraocular lens (36, 37). The disadvantages of epiretinal implants include (i) cellular outgrowth due to surgical implantation, and (ii) disordered stimulation pattern resulting from the electrical stimulation of both the axons and cell bodies of the RGCs (36). Besides being invasive in nature, these methods for restoration of vision in blind patients are based on non-specific cellular activation and have low spatial resolution due to low number of electrodes (higher number or density of electrodes requires more power, leading to damage of neural tissue by heat), and hence able to improve vision with low spatial resolution.

Optogenetic method has been employed for vision restoration in blind mice model either by non-specific stimulation of retina (38) or in a promoter-specific manner including Thy1 for RGCs (39-43), mGluR6 targeting ON bipolar cells (44, 45). Attempts have also been made for stimulation of RGCs by use of melanopsin (46) or photochemical genetics (47). Further, use of active light stimulation of chloride-channel opsin (Halorhodopsin) expressing in longer-persisting cone photoreceptors (48) has shown new promise for therapeutic intervention for restoration of vision (49). The re-sensitized photoreceptors have shown to drive retinal circuitry functions, activate cortical circuits, and mediate visually guided behaviors.

The earlier approaches for restoration of vision by optogenetic stimulation of retinal cells use opsins such as ChR2 (38) and others, which requires light intensities order of magnitude higher than ambient lighting conditions. Therefore, clinical success of such opsin molecules in ambient environment for vision restoration is not yet achieved. Further, use of external light source or device (e.g. LED array (50)) to activate such opsins can substantially damage the retinal cells in long-term usage. In addition, these opsins (used for vision restoration) have fast (millisecond) ON and OFF response to light pulses. i.e., when stimulated by light the opsin-sensitized cells do not produce characteristic photoreceptor-rod signal, i.e., the voltage signal do not have slower depolarizing phase after initial fast response to light pulse. Therefore, effective optogenetic vision restoration at ambient light level has not been shown until the present invention.

The disclosed invention includes methods of preparation of extremely-light sensitive ion-channels and ligands as well as different uses including vision restoration. In some aspect, expression of a specific MCO in cell produces a long-lasting inward current in response to white light similar to characteristic photoreceptor-rod signal. According to another aspect of the invention, the disclosed invention provides method for the use of synthetic opsins for vision restoration and other applications, wherein the amino acid sequence of the synthetic opsin is modified to provide enhanced light sensitivity, kinetics and ion-selectivity.

The results presented in this invention show efficient and stable in-vivo expression of MCO-reporter protein in mice retina after intravitreal injection of Adeno-Associated Virus carrying MCO. The results also demonstrated that the expression of MCO in retina of mouse model of retinal degeneration enables behavioral restoration of vision. The number of error arms and time to reach platform in a radial-arm water maze significantly reduced after delivery of MCO to the mice having degenerated retina. Notably, the improvement in visually guided behavior was observed even at light intensity levels orders of magnitude lower than that required for Channelrhodopsin-2 opsin (1). According to yet another aspect of the invention, method of efficient restoration of vision in human is provided. The method include use of MCO which when expressed in retinal cells produces a slower depolarizing phase after initial response to white light similar to characteristic photoreceptor-rod signal, and delivery of the opsin to retinal cells in-vivo by Adeno-Associated Virus (AAV) carrying promoter-MCO-gene in eye, and/or in combination with pronaseE or Alpha-Aminoadipic Acid (AAA) for enhancing delivery efficiency to targeted retinal layer crossing the thick inner limiting membrane in humans.

In an embodiment, a method is provided to administer an eMCO1 to a degenerated retina to restore light sensitivity in a patient. In another embodiment, administration of an eMCO1 to a patient suffering from a retinal degeneration or a retinal dystrophy, including through an intravitreal injection an Adeno-Associated Virus that includes a gene that codes for an eMCO1, results in the efficient expression of the eMCO1 gene and the production of the eMCO1 protein. In another embodiment, the invention comprises a method wherein the administration of an eMCO1 to a retinal degenerated eye of a patient results in a long-term improvement in a retinal function and a visual behavior compared to a patient who is not administered an eMCO1 into a retinal degenerated eye. In another embodiment, administration of an eMCO1 into the retina of a patient reverses the retinal degeneration (including as measured by Stargardt and LCA) and results in the behavioral restoration of vision.

In yet another embodiment, the invention describes a method wherein the administration of eMCO1 to a retinal degenerated eye results in the arrest of a retinal degeneration or retinal dystrophy. In another embodiment, the invention describes a method wherein the administration of eMCO1 to a retinal degenerated eye results in the arrest or slowing down of a disorganization of an inner nuclear layer and its connectivity with ganglion cell layer. In a further embodiment, administration of an eMCO1 to a patient to one eye results in the expression of the eMCO1 in the other eye of the patient. In an embodiment of the present invention, administration of an eMCO1 to a patient to one eye results in the expression in non-injected eye and the arrest of a retinal degeneration or a retinal dystrophy and the maintenance of retinal thickness in the non-injected eye.

The present invention provides an approach to treat a retinal dystrophy or a retinal degeneration that is characterized by loss/mutation of outer retina including photoreceptors and/or retinal pigment epithelium.

In another embodiment, administration of an eMCO1 (including through administration of an AAV that includes the gene for the eMCO1) into one eye of a patent results in expression of the eMCO1 in the other eye of the patient, which results in in long term improved retinal function and visual behavior in the non-injected eye of the patient as compared to a patient who did not receive an administration of an eMCO1. In another embodiment, an eMCO1 administered into one eye of a patient is only expressed in the other eye of the patient.

In yet another embodiment, following administration of an eMCO1 into a patient, the patient has improved visual function and behavior. The administration of an eMCO1 results in improved visual function and behavior regardless of the retinal dystrophy or retinal degeneration.

In an embodiment, administration of an eMCO1 to a patient results in a restoration of vision and arresting of the symptoms associated with the progression of a retinal dystrophy ora retinal degeneration.

In a further embodiment, an enhanced multi-characteristic opsin (eMCO1) is administered to a patient suffering from a neurodegeneration. In an embodiment, an eMCO1 is administered to a patient to modulate retinal cellular activities.

In an embodiment, a method to administer an eMCO1, including an AAV containing a gene coding for an eMCO1 is through the use of a device that is capable of injecting the eMCO1 (protein alone or an AAV) through one or more of intraocularly, intravitreally or intraretinally.

EXAMPLES

Example 1

FIG. 1A illustrates domain architecture of Multi-Characteristics Opsins (MCOs) with reporter protein. These MCOs were synthesized using A typical circular map with insertion of MCO gene cloned at the restriction sites is shown in FIG. 1B. The MCO genes were synthesized using DNA synthesizer and sequence was verified. Gel electrophoresis was carried out on amplified MCO1 gene (digested by restriction enzymes BamH I and Sal I with restriction fragments) using 0.8% agarose. Western blot was performed to confirm that the MCO is expressed in retinal cells. Retinas of mice were transfected using lipofectamine and expressed protein was extracted for western blot. Western blot was developed using primary (anti-mCherry polyclonal) antibody and secondary (Goat anti-Rabbit IgG) antibody with 1-step NBT/BCIP substrate.

Example 2

FIG. 2 shows Theoretical modeling of the three-dimensional arrangement of amino acid chains of Multi-Characteristics Opsins using web-based protocol (RaptorX). The RaptorX uses a conditional neural fields (CNF), a variant of conditional random fields and multiple template treating procedure to develop the following predicted structure of MCO. FIG. 2A shows the theoretical modeling of the three-dimensional arrangement of amino acid chains of Multi-Characteristics Opsin, MCO 1. FIG. 2B depicts the theoretical modeling of the three-dimensional arrangement of amino acid chains of Multi-Characteristics Opsin, MCO 2. FIG. 2C shows the theoretical modeling of the three-dimensional arrangement of amino acid chains of Multi-Characteristics Opsin, eMCO1. The expression of the gene and functioning of the MCO1 and eMCO1 was investigated. The eMCO1 was found to fold/express in membrane better, and therefore, function effectively as compared to MCO1. In the eMCO1 design, a special element between MCO1 and mCherry was placed, thus increasing the interaction between the MCO1 gene and mCherry, which makes mCherry play an active role in stabilizing the whole therapeutic molecule (eMCO1) in the membrane. Table-08 shows higher percentage of beta sheets and lower percentage of disordered structure (i.e. less prone to cleavage) in eMCO1 as compared to MCO1. Further, the presence of mCherry in eMCO1 serves as an indicator for determining efficacy of gene delivery to targeted tissue(s), and to determine presence of the opsin at different time points. In case of loss of opsin expression, re-injection of the opsin-gene for re-photosensitization of targeted cells can thus be carried out. For example, if visual ability is reduced or lost with time after initial improvement (by vMCO-1 injection), examination of mCherry expression in retina (by fundoscopy) will serve as a biomarker to determine if the vMCO-1 expression is lost (requiring reinjection). If the mCherry expression is intact (but the improvement in vision is lost/degraded), it will imply that the targeted retinal cells have lost connection with retinal ganglion cells, which carry visual information to visual cortex.

Example 3

For evaluating membrane trafficking of MCOs, the expression of MCOs in cell membrane (vs. cytoplasm) of transfected HEK293 cells was quantified using fluorescence intensity of reporter protein (mCherry). HEK293 cells were transfected with MCO constructs using lipofectamine 3000 (Life Technologies). After transfection, the HEK293 cells were maintained in DMEM/F-12 with 10% fetal bovine serum, 0.2 mg/mL Gentamycin in Petri dishes. The cultures were maintained at 37° C. in a 5% $CO_2$ humidified atmosphere. Cells were incubated for 48 hours after transfection to allow MCO expression. Visualization of the reporter (mCherry) fluorescence was carried out under epifluorescence microscope. The fluorescence images of HEK293 cells expressing eMCO1(MCO1-mCherry) and MCO2-mCherry are shown in FIG. 3A and FIG. 6A respectively. Further, to quantify the relative expression of the eMCO1 in cell membrane and intracellular components, intensity profiles are plotted. FIG. 3B shows the Intensity of eMCO1 reporter fluorescence along line across representative HEK293 cells transfected with mGluR6-MCO1-eMCO1 (mGluR6-mCherry). No significant intracellular (cytoplasmic) aggregation was observed implying effective trafficking of MCOs to the plasma membrane.

Example 4

To determine the light dependent inward photocurrent, the MCOs-expressing cells were exposed to pulses of light with intensity of 0.024 $mW/mm^2$. A single mode optical fiber coupled to a supercontinuum laser source (NKT Photonics) delivered the broadband light to the sample for optogenetic stimulation. A power meter (818-SL, Newport) was used to quantify the light intensity at the sample plane. The light pulse width was synchronized with the electrophysiology recording system, controlled by Axon Instruments Digidata system (Molecular Devices). Cells, transfected with MCOs were incubated with all-trans retinal (ATR, 1 μM) for 4 hours before conducting the patch clamp experiments.

The patch-clamp recording setup includes an inverted Nikon fluorescence microscope (TS 100) platform using an amplifier system (Axon Multiclamp 700B, Molecular Devices). Micropipettes were pulled using a two-stage pipette puller (Narshinghe) to attain resistance of 3 to 5 MΩ when filled with a solution containing (in mM) 130 K-Gluoconate, 7 KCl, 2 NaCl, 1 MgCl2, 0.4 EGTA, 10 HEPES, 2 ATP-Mg, 0.3 GTP-Tris and 20 sucrose. The micropipetteelectrode was mounted on a micromanipulator. The extracellular solution contained (in mM): 150 NaCl, 10 Glucose, 5 KCl, 2 CaCl$_2$), 1 MgCl2 was buffered with 10 mM HEPES (pH 7.3). Photocurrents were measured while holding cells in voltage clamp at −70 mV. The electrophysiological signals from the amplifier were digitized using Digidata 1440 (Molecular devices), interfaced with patch-clamp software (Clampex, Molecular Devices). For activation of MCO expressing cells, the light stimulation beam was delivered by the optical fiber. pClamp 10 software was used for data analysis. FIG. 4A shows representative inward current in MCO1-expressing cells in response to light (average intensity: 0.024 mW/mm$^2$) measured by Patch-clamp electrophysiology. The inward photocurrent was found to be order of magnitude higher in eMCO1 sensitized cells than that in the ChR2 expressing cells. Inward photocurrent (195±32 pA) in eMCO1-sensitized cells at ambient light level (0.02 mW/mm$^2$) is above threshold for action potential (AP) unlike that in cells sensitized with ChR2 and White-Opsin (51). It may be noted that for a good fidelity of the light-evoked spiking of opsin-sensitized cells, faster response time is required. The ON response time of ambient-light activatable MCO1 (FIG. 4A) is measured to be 2.94±0.70 ms, which is similar to that measured for other fast-opsins (52). However, the on response time depends on the intensity of activation light and is known to increase as the light intensity decreases (53).

To obtain the activation spectrum of eMCO1, the inward photocurrent was measured using stimulation light at different wavelengths (with bandwidth: 30 nm). In FIG. 4B, we show the normalized activation spectrum of eMCO1. In addition to acting as stabilizer-biomarker, mCherry enhances the photo-induced current in the cells expressing eMCO1 by (i) better orientation-stabilization of eMCO1 across the membrane; and (ii) light emitted/re-emitted from the stabilizer-biomarker molecule enhance the activation of eMCO1. FIG. 5 shows Inward current profiles in HEK cells measured by Nanion Port-a-Patch automated Patch clamp electrophysiology. FIG. 5A shows photocurrent measured at white light intensity of 0.02 mW/mm$^2$ in cell transfected with mGluR6-eMCO1 (mGluR6-MCO1-mCherry). FIG. 5B depicts photocurrent measured at white light intensity of 0.02 mW/mm$^2$ in cell transfected with mGluR6-MCO1. The effect of presence of mCherry on enhanced MCO1 function is clearly demonstrated here. MCO1 was found to have broad activation spectrum matching to the white ambient light.

The inward photocurrent in MCO2-expressing cells in response to light at the same average intensity (0.024 mW/mm$^2$) is shown in FIG. 6B. The peak photocurrent generated in eMCO1-cells at light intensity of 0.024 mW/mm$^2$ was ~160 pA as compared to ~320 pA in MCO2 expressing cells. While the on-rate of induced photocurrent in eMCO1 and MCO2 expressing cells in response to light did not differ significantly, the off-response (decay of current in absence of light) of MCO2 was found to be significantly slower than eMCO1 (FIG. 6B vs. FIG. 4A). In MCO2 expressing HEK293 cells, the threshold peak current for generating action potential (54) could be achieved at light intensity of 0.02 mW/mm$^2$, which is at the ambient light level. Therefore, ambient light is expected to generate sufficient photocurrent (for action potential) in MCO expressing retinal cells. FIG. 8 shows the patch-clamp recording of MCO1 transfected rd mouse retina. FIG. 8A shows eMCO-1 expression in the cells of mice retina explant. FIG. 8B shows Inward photocurrent induced by light pulse (100 ms) train. The spectral and intensity sensitivity combined with the fast kinetics and small size (allowing packaging by AAV) of eMCO1 makes it uniquely suitable for photosensitizing higher-order retinal neurons in subjects with retinal degeneration to enable vision restoration in ambient light environment.

Example 5

MCO1 and MCO2 plasmids were packaged in Adeno-associated virus (serotype 2) with mGluR6 promoter and mCherry reporter. The synthesized plasmids were cloned into pAAV MCS vector via its BamH1 and Sall sites. AAV physical titers were obtained by quantitative PCR using primers designed to selectively bind AAV inverted terminal repeats. TCID50 assay was conducted according to ATCC protocol. Verification of purity of purified virus was confirmed by SDS/PAGE. FIG. 7A illustrates fluorescence image of HEK293 cells expressing mCherry, 2 days after transfection with AAV2-mGluR6-MCO1-mCherry. Robust expression was observed with no detectable change in morphology, confirm that transfected cells are healthy. For in-vivo transfection of rd10 mice, intravitreal injection of 1 μl of AAV2-mGluR6-MCO1-mCherry (vMCO1), was carried out for targeted expression in ON bipolar cells. Uniformity of MCO expression was confirmed by the 3D reconstruction from the confocal mCherry-expression in z-slices of the whole retinal cup of rd10 mice injected with vMCO1 intravitreally (FIG. 7B).

Example 6

The rd10 mice (retinal degeneration 10, spontaneous missense point mutation in Pde6b) have a later onset and progressive retinal degeneration, closer to the human retinal degeneration phenotype. After anesthetization of the rd10 mice, AAV2-mGluR6-MCO1-mCherry (1 μl) solution (1.6× 10$^{12}$ GC/ml) was injected by a sterilized needle of a Hamilton syringe inserted through the sclera into the vitreous cavity. The AAV2-mGluR6-MCO1-mCherry solution was injected to both the eyes. The cornea was kept moist with a balanced salt solution during the entire surgical procedure. In-vivo transfection of vMCO1 in rd10 mouse retina was carried out for four different final doses of vMCO1. At different time points after vMCO1 injection, the mice in each group were euthanized and retina tissues harvested. Confocal fluorescence microscopy was carried out for analysis of eMCO1 expression in retina. To evaluate retention of the MCO, the reporter fluorescence expression level (fluorescence intensity) of transfected retina was evaluated using confocal microscope. At different time points after vMCO1 injection, the mice were sacrificed and retina was extracted and imaged by confocal microscopy. The vMCO1-transfected rd10 mice retina showed distinct expression of reporter (mCherry) on cell membrane in targeted cell layer. In contrast to significant expression in vMCO1-injected eyes, no characteristic mCherry expression (only background autofluorescence) was observed in PBS injected eyes monitored up to 16 weeks. Further, no significant increase in mCherry expression (only background autofluorescence) was observed 1 wk after injection for three different vMCO1 doses. eMCO1 expression was significantly higher at 4-8 wk after intravitreal injection of vMCO1 (FIG. 9B). In-vivo viral transfection was conducted for delivery of the eMCO1 to the bipolar cells in the retina of the rd10 mouse model. eMCO1 expression was found to be localized in targeted retinal cells (FIG. 9C). FIG. 9D shows cross-sectional view of eMCO1 expression in retina 16 weeks after intravitreal injection at dose of $1.6 \times 10^{12}$ VG/ml. Furthermore, expression level was significant even after 4 months of injection. FIG. 9E shows kinetics of MCO1 expression in rd10 mice retina at two different doses of vMCO1. FIG. 9F shows the inter-animal variation of MCO1-mCherry (eMCO1) expression (after background subtraction) in retina of rd10 mice 16 weeks after transfection of vMCO1 at dose of $1.6 \times 10^{12}$ VG/ml.

Example 7

For testing spatial memory and learning capabilities of vMCO treated rd10 mice towards light, a visual radial arm water maze was used (55). Briefly, mice are placed into the center of the maze and a platform is placed just below the water's surface at the end of one of the arms. The mice rapidly learn to determine the location of the platform by utilizing visual cues (LEDs emitting light with visible spectrum). The platform (in one of the arms) provided a reward to them where they can rest instead of having to swim. The time to reach platform and number of error(s) made before finding the platform was quantified for both light On and off conditions. Data (video) recording was stopped once the mice find the platform or before 60 sec of dropping the mice in water in order to prevent the mice from getting tired of swimming. The selection of dropping site (center, side, edge) was random for each mice and each trial. The exclusion criterion consists of mouse that does not swim (and floats). Visual acuity in this test was determined by measuring the latency to reach the platform, and the number of errors the mouse makes before reaching the platform as the quality of the visual stimulus (cue) degrades. At ~10 wks after birth, the rd10 mice were intravitreally injected with vMCO targeting the bipolar cells. The platform provides a reward where mice can rest instead of having to swim. Intravitreal injection of virus carrying vMCO1 led to significant improvement in visually guided behavior of rd10 mice as assessed by radial-arm water maze assay. At ~8 weeks after birth, the rd10 mice, were intravitreally injected with MCO1 targeted to bipolar cells in retina. FIG. 10 shows visually guided improvement in rd10 mice behavior in radial water maze. FIG. 10A shows Time-lapse images of visually guided rd10 mice behavior in radial water maze with white LED light before intravitreal vMCO1 injection. FIG. 10B shows Behavior of rd10 mouse with LED light ON six weeks after vMCO1 injection. The distances and time traveled by the MCO-transfected rd10 mice before arriving at the platform were much shorter than the rd10 mice. FIG. 10C shows Latency to find the platform by the vMCO1 treated rd10 mouse, with and without light, dropped at center of the maze. Average±SEM. N=5 for each mouse. FIG. 10D depicts Latency to find the platform by the vMCO1 treated rd10 mouse, with and without light, dropped at side arms-2 & 4 of the maze. FIG. 10E depicts the latency to find the platform by the vMCO1 treated rd10 mouse, with and without light, dropped at edge arm-3 of the maze. In consistence with the latency to find the platform, the number of errors made by the MCO-transfected rd10 mice before they reached the platform is significantly smaller (<1) than that of the mice without transfection (>2) (56). FIG. 10F shows the number of error arms traversed by the vMCO1 treated rd10 mouse dropped at center before finding the platform in presence and absence of light. FIG. 10G shows Number of error arms traversed by the vMCO1 treated rd10 mouse dropped at side arm before finding the platform in presence and absence of light. Average±SEM. N=5 for each mouse. FIG. 10H shows Number of error arms traversed by the vMCO1 treated rd10 mouse dropped at edge before finding the platform in presence and absence of light. Average±SEM. N=5 for each mouse.

FIG. 11 shows longitudinal study of visually guided improvement in rd10 mice behavior in radial water maze. We collected data to determine visual acuity at baseline (previral transfection) and over time (every 4 wks for 4 months). FIG. 11A depicts Schematic of the radial-arm water maze used to test improvement in visually guided behavior of vMCO1 injected rd10 mice. 4 wks after injection, all mice significantly restored their visually guided behavior that lasted through the 16 wks trial. The number of errors made by the MCO-transfected rd10 mice before they reached the platform is significantly smaller (<1) than that of the mice without transfection (>2) (56). In consistence with the number of error arms, the distances and time traveled by the MCO-transfected mice before arriving at the platform were much shorter than the rd10 mice (n=5 for both groups). FIG. 11B shows the Time to reach platform by the rd10 mice from center of the maze (light intensity: 0.007 mW/mm$^2$) before vMCO1 injection and as a function of post-injection period. N=5; Average±S.D. *P<0.05. FIG. 11C shows the Time to reach platform by the rd10 mice from near arm of the maze (light intensity: 0.014 mW/mm$^2$) before vMCO1 injection and as a function of post-injection period. N=5; Average±S.D. *P<0.05. FIG. 11D plots the Time to reach platform by the rd10 mice from side arm (light intensity: 0.004 mW/mm$^2$) before vMCO1 injection and as a function of post-injection period. N=5; Average±S.D. *P<0.05.

Most importantly, the MCO-treated rd10 mice, when randomly placed in five different arms of the radial water maze in a single sequence, they could find the platform (in 6th arm) from all the other arms without a single error. Furthermore, the MCO treated rd10 mice performed better in visually guided tasks even at low light intensities (0.005-0.01 mW/mm$^2$), comparable to ambient light levels. To determine the light intensity-dependence of improvement of behavior for the vMCO1-treated mice, the intensity of the diverging LED light was varied from 0.0005 to 0.03 mW/mm$^2$. The mean time taken by vMCO1-treated rd10 mice to reach the platform was <20 sec, at ambient light intensity level of 0.007 mW/mm$^2$. The behavioral scores were correlated with the light intensities and threshold for improvement in visually guided behavior was determined to be 0.004 mW/mm$^2$. FIG. 12 shows the Light-intensity dependence of improvement in rd10 mice behavior in radial water maze. Comparison of time to reach platform from center of the maze between two different light intensities as a function of post-injection period. This is the first-time opsin-treated mice could perform significantly better at such low light levels. Earlier behavioral studies using ChR2-treated mice have utilized much higher light intensities, not suitable for practical application of optogenetics in vision restoration without use of active illumination sources.

Example 8—Because measurement of the optomotor response is commonly used to determine thresholds of the visual system in humans and animals (57, 58), we utilized this tool for evaluating improvement in visual performance of rd10 mice with MCO sensitized retinas. The advantage of this method is that it does not require any previous training of the animal. Briefly, rd10 mouse was placed on a platform (in the center of a drum) surrounded by rotating stripes (FIG. 10). The optokinetic stimulation with varying speed was applied and average optomotor response and the score of the mice was measured. FIG. 13 shows optomotor assessment of rd10 and MCO-sensitized rd10 mice. FIG. 13A shows Quantitative comparison of number of head movement of rd10 mice before and 8 weeks after vMCO1 injection at speed of rotation of the vertical stripes (0.07 cpd) at 1 rpm. The light intensity at the center of the chamber is 0.001 mW/mm$^2$. FIG. 13B shows Quantitative comparison of number of head movement of rd10 mice before and 8 weeks after vMCO1 injection at speed of rotation of the vertical stripes at 2 rpm. The light intensity at the center of the chamber is 0.001 mW/mm$^2$. Even at this low light intensity, the MCO-treated mice rotated its head in response to rotating stripes implying improved spatial visual acuity.

Example 9

Similar to the wild-type (non-blind) mice, vMCO treated rd10 mice were observed to avoid bright light by staying away and blocking light (FIG. 14).

Example 10

Chronic exposure of opsin transfected retinal cells to light may raise concern about their viability. Therefore, to evaluate any detrimental effect of light exposure on retinal cell viability, wild type and MCO-injected rd10 mice were exposed to white light with intensity (i.e. 0.1 mW/mm$^2$) ~10 times higher than that of ambient light level (~0.01 mW/mm$^2$) for 4 weeks (8 hr/day). 4 weeks after light exposure, the MCO transfected rd10 as well as wild-type (control) mice were sacrificed, and the retina tissue was harvested for immuno-histochemical analysis. The retina was immunostained with apoptotic markers and imaged using confocal microscopy. FIG. 14 shows viability of eMCO1 sensitized retinal cells after chronic light exposure. FIG. 14A shows that Similar to the wild-type (non-blind) mice, vMCO1 treated rd10 mice avoid bright light by staying away and blocking light (via creating a heap out of bedding material, as shown in the arrow). FIG. 14B shows Fluorescence image of retina stained with Caspase-3 (green) for vMCO1-treated rd10 mouse 4 weeks after 8-hr/day illumination of white light (intensity: 0.1 mW/mm$^2$). FIG. 14C shows Fluorescence image of retina stained with Caspase-3 (green) for wild-type mouse 4 weeks after 8-hr/day illumination of white light (intensity: 0.1 mW/mm$^2$). Quantitative comparison (FIG. 14D) shows that there is no significant cell death in either of the wild type or MCO-injected rd10 mice, indicating no compromise of cell viability under chronic light exposure. 0% apoptotic cells in inner nuclear layer of vMCO1 treated rd10 mice. Furthermore, since light-sensitivity of MCO expressing cells significantly reduces the required light intensity for generating action potential, use of MCO will minimize light-induced chronic damage to the retinal cells.

Example 11

Optical sectioning/imaging using SDOCT was carried out to monitor any changes in ocular structure due to intravitreal injection of vMCO1. SDOCT images of cornea, lens, and retina 1 wk after intravitreal vMCO injection in rd10 mice were compared to the images before injection. FIG. 15 shows results of evaluation of structural integrity of retina after vMCO1 injection in rd10 mice. FIG. 15A shows an OCT image of rd10 mice retina after vMCO1 injection. FIG. 15B shows the Comparison of retinal thickness of 4 different rd10 mice before and 1 week after injection. No detectable alteration to cornea, lens or retina (e.g. detachment) was observed after intravitreal injection of vMCO1. ImageJ was used to analyze the SDOCT images. Quantitative comparison of retinal thickness before and 1 wk after vMCO1 injection (FIG. 15D) shows no change in retinal thickness.

Example 12

Though gene therapy has been controversial for the last decade due to undesired side effects (59, 60), opsins (e.g. ChR2) are reported to be non-toxic, not generate immune response, and maintain stable cell membrane properties. Therefore, the health of the mice was monitored to confirm the safety of our approach. For immunotoxicity studies, blood was drawn from mice (N=5/dose) before and after intravitreal injection of two different doses (Group 1: 1.66× 10$^{10}$, Group 2: 1.66×10$^{11}$ GC/ml) of vMCO at 7 and 14 days. After anesthetization, blood (~0.2 ml) is drawn from facial vein (using sterile animal lancet) 1 week before intravitreal injection. After vMCO1 injection, blood was drawn (Table 6.1) for analysis. After the completion of the study period, the mouse was euthanized. For collecting the blood from the facial vein of the mice, the hairless freckle on the side of the jaw was located and pricked with a lancet. The pro-inflammatory (IL-6 and IFN-γ) and anti-inflammatory (IL-10) cytokines in plasma were quantified using ELISA kits. FIG. 16 summarizes the results of the ELISA quantification of inflammatory cytokines showing that the intravitreal dose of vMCO is within safe limit. FIG. 16A shows quantitative comparison of IL-6 (pro-inflammatory marker) in plasma between group-1 and group-2 before and after 7 and 14 days of vMCO1 injection. FIG. 16B shows the quantitative comparison of IL-10 (anti-inflammatory marker) in plasma between the two groups. FIG. 16C shows the quantitative comparison of IFN-Y (pro-inflammatory marker) in plasma between the two groups before and after 7 and 14 days of vMCO1 injection.

Example 13

After monitoring behavioral restoration of vision by intravitreal injection of MCO, the mice were sacrificed and different organs were collected for analyzing the spread of MCO expression in non-targeted tissues samples (eye, heart, liver, muscle, skin, etc). The organs were stored in the 1.8 ml cryovials and stored at −80° C. Each vial was properly labeled with study number, animal identification number, date of extraction, and name of organ. qPCR detection of vector sequences in rd10 mice at different time points post-injection shows very small quantities of MCO-1 DNA in tissues outside of the treated eyes, confirming safety of our molecule and treatment method. Intravitreal administration of vMCO1 in eye led to locally restricted distribution, minimizing off-target effects. FIG. 17 shows biodistribution of AAV2 packaged enhanced Multi-Characteristics Opsin (vMCO1). At a fixed time point after injection (1 week), the measured vector copy number in eye was found to decrease with decrease in injected dose. Further, 4-8 week after injection, very small or non-detectable quantities of vector DNA in the injected eyes was found. The Biodistribution studies showed minimal or non-detectable levels of the vector in non-targeted organs of intravitreally-injected rd10 mice. qPCR detection of vector sequences in rd10 mice at different doses and post-injection period very small or non-detectable quantities of vector DNA in tissues outside of the treated eyes. The biodistribution profile and the kinetics of transgene expression following administration of vMCO1 via the intravitreal administration at multiple time points coincide with the onset of detection, peak vector/transgene levels, and decline/plateau of these levels.

Example 14

To further evaluate the safety, specificity and efficacy of our opsins, immunohistochemistry of vMCO1 injected rd10 retina was conducted. FIG. 18 shows immunohistochemistry of retinal sections of vMCO1 injected rd10 mice eye. FIG. 18A shows that MCO-mCherry (red) is selectively targeted and expressed in inner nuclear layer (INL) of rd10 mice 8 wks after intravitreal injection of vMCO1. The absence of arrestin (green) suggests a complete loss of photoreceptors. FIG. 18B shows PKCa stain (green) in rod bipolar cells expressing mCherry (red, intrinsic) in rd10 mice 8 wks after intravitreal injection of vMCO1. FIG. 18C shows mGluR6 stain (green) in ON bipolar cells expressing mCherry (red) in rd10 mice 8 wks after intravitreal injection of vMCO1. FIG. 18D shows mCherry (green-immunostained) expression in rd10 retina 8 wks following intravitreal delivery of vMCO1 to rd10 mice. FIG. 18E shows that GFAP (green) in rd10 mice 18 wks after intravitreal injection of vMCO1 as reported in photoreceptor degenerated retina. FIG. 18F shows no CD45 (green) expression suggesting no immune cells in rd10 mice 8 wks after intravitreal injection of vMCO1.

The invention provides a method of improving or restoring vision, comprising administering to a subject any one of the compositions described herein. Compositions of methods of the invented enhanced MCO (eMCO) may be delivered and packaged in the plasmid or viral vectors that includes: (i) MCO Plasmid, (ii) rAAV-MCO, (iii) pAAV-MCO and (iii) Lenti Virus-MCO. Invention delivery is improvised by use of optimized formulation of AAA together with this invention molecule-MCO (naked plasmid or virus) to transiently permeabilize inner limiting membrane of retina.

TABLE 01

Amino acid and DNA sequences of
Multi-Characteristics Opsin-1 (MCO1)

Amino acid sequence:
MDYGGALSAVGRELLFVTNPVVVNGSVLVPEDQCY
CAGWIESRGTNGAQTASNVLQVVLAAGFSILLLMF
YAYQTVVKSTCGWEEIYVCAIEMVKVILEFFFEFK
NPSMLYLATGHRVQWLRYAEWLLTCPVISIHLSNL
TGLSNDYSRRTMGLLVSDIGTIVWGATSAMATGYV
KVIFFCLGLCYGANTFFHAAKAYIEGYHTVPKGRC
RQVVTGMAWLFFVSWGMFPILFILGPEGFGVLSVY
GSTVGHTIIDLMSKNCWGLLGHYLRVLIHEHILIN
GDIRKTTKLNIGGTEIEVETLVEDESEAGSVNKGT
GKMAELISSATRSLFAAGGINPWPNPYHHEDMGCG
GMTPTGECFSTEVWVCDPSYGLSDAGYGYCFVEAT
GGYLVVGVEKKQAWLHSRGTPGEKIGAQVCQWIAF
SIAIALLTFYGFSAWKATCGWEEVYVCCVEVLFVT
LEIFKEFSSPATVYLSTGNHAYCLRYFEWLLSCPV
ILIRLSNLSGLKNDYSKRTMGLIVSCVGMIVFGMA
AGLATDWLKWLLYIVSCIYGGYMYFQAAKCYVEAN
HSVPKGHCRMVVKLMAYAYPASWGSYPILWAVGPE
GLLKLSPYANSIGHSICEIIAKEFVVTFLAHHLRI
KIHEHILIHGDIRKTTKMEIGGEEVEVEEFVEEED
EDTV
(SEQ ID NO: 1)

DNA sequence:
ATGGATTATGGCGGCGCGCTGAGCGCGGTGGGCCG
CGAACTGCTGTTTGTGACCAACCCGGTGGTGGTGA
ACGGCAGCGTGCTGGTGCCGGAAGATCAGTGCTAT
TGCGCGGGCTGGATTGAAAGCCGCGGCACCAACGG
CGCGCAGACCGCGAGCAACGTGCTGCAGTGGCTGG TABLE 01-continued Amino acid and DNA sequences of
Multi-Characteristics Opsin-1 (MCO1)

CGGCGGGCTTTAGCATTCTGCTGCTGATGTTTTAT
GCGTATCAGACCTGGAAAAGCACCTGCGGCTGGGA
AGAAATTTATGTGTGCGCGATTGAAATGGTGAAAG
TGATTCTGGAATTTTTTTTTGAATTTAAAAACCCG
AGCATGCTGTATCTGGCGACCGGCCATCGCGTGCA
GTGGCTGCGCTATGCGGAATGGCTGCTGACCTGCC
CGGTGATTAGCATTCATCTGAGCAACCTGACCGGC
CTGAGCAACGATTATAGCCGCCGCACCATGGGCCT
GCTGGTGAGCGATATTGGCACCATTGTGTGGGGCG
CGACCAGCGCGATGGCGACCGGCTATGTGAAAGTG
ATTTTTTTTTGCCTGGGCCTGTGCTATGGCGCGAA
CACCTTTTTTCATGCGGCGAAAGCGTATATTGAAG
GCTATCATACCGTGCCGAAAGGCCGCTGCCGCCAG
GTGGTGACCGGCATGGCGTGGCTGTTTTTTGTGAG
CTGGGGCATGTTTCCGATTCTGTTTATTCTGGGCC
CGGAAGGCTTTGGCGTGCTGAGCGTGTATGGCAGC
ACCGTGGGCCATACCATTATTGATCTGATGAGCAA
AAACTGCTGGGGCCTGCTGGGCCATTATCTGCGCG
TGCTGATTCATGAACATATTCTGATTCATGGCGAT
ATTCGCAAAACCACCAAACTGAACATTGGCGGCAC
CGAAATTGAAGTGGAAACCCTGGTGGAAGATGAAT
CGGAAGCGGGCTCGGTGAACAAAGGCACCGGCAAA
ATGGCTGAGCTGATCAGCAGCGCCACCAGATCTCT
GTTTGCCGCCGGAGGCATCAACCCTTGGCCTAACC
CCTACCACCACGAGGACATGGGCTGTGGAGGAATG
ACACCTACAGGCGAGTGCTTCAGCACCGAGTGGTG
GTGTGACCCTTCTTACGGACTGAGCGACGCCGGAT
ACGGATATTGCTTCGTGGAGGCCACAGGCGGCTAC
CTGGTCGTGGGAGTGGAGAAGAAGCAGGCTTGGCT
GCACAGCAGAGGCACACCAGGAGAAAAGATCGGCG
CCCAGGTCTGCCAGTGGATTGCTTTCAGCATCGCC
ATCGCCCTGCTGACATTCTACGGCTTCAGCGCCTG
GAAGGCCACTTGCGGTTGGGAGGAGGTCTACGTCT
GTTGCGTCGAGGTGCTGTTCGTGACCCTGGAGATC
TTCAAGGAGTTCAGCAGCCCCGCCACAGTGTACCT
GTCTACCGGCAACCACGCCTATTGCCTGCGCTACT
TCGAGTGGCTGCTGTCTTGCCCCGTGATCCTGATC
AGACTGAGCAACCTGAGCGGCCTGAAGAACGACTA
CAGCAAGCGGACCATGGGCCTGATCGTGTCTTGCG
TGGGAATGATCGTGTTCGGCATGGCCGCAGGACTG
GCTACCGATTGGCTCAAGTGGCTGCTGTATATCGT
GTCTTGCATCTACGGCGGCTACATGTACTTCCAGG
CCGCCAAGTGCTACGTGGAAGCCAACCACAGCGTG
CCTAAAGGCCATTGCCGCATGGTCGTGAAGCTGAT
GGCCTACGCTTACTTCGCCTCTTGGGGCAGCTACC
CAATCCTCTGGGCAGTGGGACCAGAAGGACTGCTG
AAGCTGAGCCCTTACGCCAACAGCATCGGCCACAG
CATCTGCGAGATCATCGCCAAGGAGTTTTGGACCT
TCCTGGCCCACCACCTGAGGATCAAGATCCACGAG
CACATCCTGATCCACGGCGACATCCGGAAGACCAC
CAAGATGGAGATCGGAGGCGAGGAGGTGGAAGTGG
AAGAGTTCGTGGAGGAGGAGGACGAGGACACAGTG
(SEQ ID NO: 2)

TABLE 02

Amino acid and DNA sequences of Multi-
Characteristics Opsin-2 (MCO2).
It contains mutation (S 142 L) and
deletion of 7 amino acid residues
(VNKGTGK) after 308 of MC01 sequence
(TABLE 01).

Amino acid sequence:
MDYGGALSAVGRELLFVTNPVVVNGSVLVPEDQCY
CAGWIESRGTNGAQTASNVLQVVLAAGFSILLLMF
YAYQTVVKSTCGWEEIYVCAIEMVKVILEFFFEFK
NPSMLYLATGHRVQWLRYAEWLLTCPVILIHLSNL
TGLSNDYSRRTMGLLVSDIGTIVWGATSAMATGYV
KVIFFCLGLCYGANTFFHAAKAYIEGYHTVPKGRC
RQVVTGMAWLFFVSWGMFPILFILGPEGFGVLSVY
GSTVGHTIIDLMSKNCWGLLGHYLRVLIHEHILIH
GDIRKTTKLNIGGTEIEVETLVEDESEAGSMAELI
SSATRSLFAAGGINPWPNPYHHEDMGCGGMTPTGE

TABLE 02-continued

Amino acid and DNA sequences of Multi-Characteristics Opsin-2 (MCO2). It contains mutation (S 142 L) and deletion of 7 amino acid residues (VNKGTGK) after 308 of MC01 sequence (TABLE 01).

CFSTEVWVCDPSYGLSDAGYGYCFVEATGGYLVVG
VEKKQAWLHSRGTPGEKIGAQVCQWIAFSIAIALL
TFYGFSAWKATCGWEEVYVCCVEVLFVTLEIFKEF
SSPATVYLSTGNHAYCLRYFEWLLSCPVILIRLSN
LSGLKNDYSKRTMGLIVSCVGMIVFGMAAGLATDW
LKWLLYIVSCIYGGYMYFQAAKCYVEANHSVPKGH
CRMVVKLMAYAYFASWGSYPILWAVGPEGLLKLSP
YANSIGHSICEIIAKEFVVTFLAHHLRIKIHEHIL
INGDIRKTTKMEIGGEEVEVEEFVEEEDEDTV
(SEQ ID NO: 3)

ATGGACTATGGCGGAGCATTGAGTGCAGTTGGGCG
AGAATTGCTGTTCGTGACGAATCCCGTTGTTGTAA
ACGGAAGTGTACTGGTGCCAGAAGACCAATGTTAT
TGCGCGGGCTGGATAGAGTCGCGCGGAACGAATGG
AGCACAGACAGCGTCCAACGTACTGCAATGGCTCG
CCGCTGGTTTCTCTATCCTGTTGTTGATGTTCTAC
GCATATCAAACGTGGAAAGACCTGCGGGTGGGA
GGAAATATATGTGTGTGCCATCGAGATGGTAAAAG
TAATTTTAGAGTTTTTTTTTGAATTCAAGAACCCC
TCAATGTTGTACCTTGCTACGGGGCATAGAGTTCA
ATGGCTTCGGTATGCGGAATGGCTCTTGACATGTC
CAGTAATACTAATTCATCTTAGTAACTTAACGGGA
CTCTCTAACGACTATTCACGGCGTACCATGGGACT
ACTGGTGTCAGACATTGGGACGATAGTATGGGGAG
CGACGAGCGCAATGGCTACAGGCTACGTAAAGGTT
ATCTTTTTCTGCCTCGGGCTTTGTTACGGCGCGAA
TACCTTCTTTCATGCCGCAAAGGCCTACATAGAGG
GTTACCATACCGTACCGAAAGGGCGGTGCCGGCAA
GTCGTCACAGGAATGGCTTGGCTCTTCTTTGTGAG
TTGGGGAATGTTCCCTATCCTATTTATCTTAGGGC
CTGAGGGTTTCGGCGTGCTTAGTGTTTACGGCAGT
ACGGTCGGTCACACGATCATCGACCTGATGTCAAA
GAATTGCTGGGGCTTGCTTGGTCATTATTTGCGTG
TGTTAATCCACGAACATATTCTGATTCATGGTGAC
ATCCCGAAAAACTACCAAACTCAATATTGGCGGCAC
AGAGATAGAGGTTGAAACGTTGGTCGAGGACGAGT
CTGAAGCGGGGTCAATGGCGGACCGGTTAGTGTAA
GCAACACGGTCGCTATTTGCTGCCGGGGGATAAA
TCCCTGGCCCAACCCGTATCACCACGAAGATATGG
GATGCGGAGGGATGACTCCCACAGGAGAGTGTTTT
TCGACCGAATGGTGGTGTGACCCCTCGTACGGGTT
ATCAGATGCAGGCTATGGTTATTGTTTCGTGGAGG
CCACGGGTGGTTATTTAGTCGTAGGGGTAGAGAAG
AAACAGGCATGGCTTCATTCCCGGGGAACCCCCGG
GGAGAAAATTGGAGCTCAGGTATGCCAGTGGATAG
CGTTTTCTATCGCGATAGCTCTCCTGACTTTTTAT
GGATTTTCGGCTTGGAAGGCCACGTGCGGATGGGA
AGAGGTATACGTATGTTGCGTCGAAGTGCTTTTCG
TAACTCTGGAAATATTTAAAGAATTCTCAAGTCCG
GCCACAGTTTATTGAGCACTGGCAACCACGCCTA
TTGTTTGCGGTATTTTGAGTGGCTATTATCTTGCC
CTGTTATTCTTATACGGTTATCAAACCTATCGGGT
CTGAAGAATGATTATTCCAAGAGAACCATGGGCCT
AATTGTCAGTTGCGTCGGGATGATCGTGTTCGGGA
TGGCCGCGGGTCTTGCAACGGACTGGCTTAAGTGG
CTATTATACATCGTCAGCTGCATTTACGGTGGTTA
CATGTACTTTCAAGCGGCTAAGTGCTATGTGGAGG
CGAACCATTCAGTCCCGAAAGGCCACTGTCGCATG
GTGGTTAAGTTAATGGCGTATGCGTACTTCGCTTC
GTGGGGTTCATATCCAATCCTGTGGGCGGTCGGAC
CTGAAGGTCTCCTGAAACTGAGCCCCTATGCGAAC
TCCATAGGACATTCCATCTGTGAGATCATCGCCAA
GGAATTCTGGACCTTCTTAGCTCACCATTTGCGGA
TTAAGATCCATGAACACATTCTCATTCACGGTGAT
ATTAGGAAAACTACCAAGATGGAGATAGGTGGAGA
AGAGGTGGAGGTAGAAGAGTTTGTAGAAGAGGAGG
ACGAGGACACTGTAGTATCAAAGGGGGAAGAAGAC
AAT(SEQ ID NO :4)

TABLE 03

Amino acid and DNA sequences of Multi-Characteristics Opsin-1T (MCO1T). It contains additional trans-membrane sequence (TPARVVVWISLYYAAFYVVMTGL FALCIYVLMQTI) after 315 amino acid residues of MC01 (TABLE 01).

Amino acid sequence:
MDYGGALSAVGRELLFVTNPVVVNGSVLVPEDQCY
CAGWIESRGTNGAQTASNVLQVVLAAGFSILLLMF
YAYQTVVKSTCGWEEIYVCAIEMVKVILEFFFEFK
NPSMLYLATGHRVQWLRYAEWLLTCPVISIHLSNL
TGLSNDYSRRTMGLLVSDIGTIVWGATSAMATGYV
KVIFFCLGLCYGANTFFHAAKAYIEGYHTVPKGRC
RQVVTGMAWLFFVSWGMFPILFILGPEGFGVLSVY
GSTVGHTIIDLMSKNCWGLLGHYLRVLIHENILIH
GDIRKTTKLNIGGTEIEVETLVEDESEAGSVNKGT
GKTPARWVVISLYYAAFYVVMTGLFALCIYVLMQT
IMAELISSATRSLFAAGGINPWPNPYHHEDMGCGG
MTPTGECFSTEVWVCDPSYGLSDAGYGYCFVEATG
GYLVVGVEKKQAWLHSRGTPGEKIGAQVCQWIAFS
IAIALLTFYGFSAWKATCGWEEVYVCCVEVLFVTL
EIFKEFSSPATVYLSTGNHAYCLRYFEWLLSCPVI
LIRLSNLSGLKNDYSKRTMGLIVSCVGMIVFGMAA
GLATDWLKWLLYIVSCIYGGYMYFQAAKCYVEANH
SVPKGHCRMVVKLMAYAYFASWGSYPILWAVGPEG
LLKLSPYANSIGHSICEIIAKEFVVTFLAHHLRIK
IHEHILIHGDIRKTTKMEIGGEEVEVEEFVEEEDE
DTV (SEQ ID NO: 5)

Nucleotide sequence
ATGGATTACGGAGGAGCACTGAGCGCTGTTGGCCG
CGAGTTGCTATTTGTGACCAACCCCGTCGTGGTCA
ATGGCAGCGTCCTTGTGCCTGAGGATCAATGTTAT
TGCGCTGGGTGGATTGAATCCCGAGGTACAAATGG
TGCCCAGACGGCAAGCAACGTTTTGCAATGGCTAG
CAGCTGGGTTTTCAATTCTACTTTTAATGTTTTAC
GCTTATCAAACCTGGAAGAGTACATGTGGCTGGGA
GGAAATTTATGTCTGCGCTATTGAAATGGTTAAAG
TAATTTTGGAATTTTTTTTTGAATTTAAGAATCCA
TCAATGTTGTATCTTGCCACAGGTCACAGGGTCCA
ATGGCTCCGATACGCGGAATGGCTTCTAACTTGCC
CTGTTATTTCCATTCACCTAAGCAATCTGACTGGC
CTTTCGAATGACTATAGCAGACGCACCATGGGACT
GTTAGTTAGTGACATAGGGACTATAGTTTGGGGTG
CCACTAGCGCCATGGCGACCGGTTATGTTAAAGTA
ATTTTTTTCTGCCTTGGGTTGTGTTATGGCGCTAA
CACTTTTTTTCCACGCTGCTAAAGCATATATAGAAG
GGTACCATACGGTGCCCAAAGGAAGATGTCGCCAA
GTAGTTACAGGGATGGCGTGGCTGTTCTTTGTGAG
CTGGGGGATGTTCCCTATACTGTTTATCCTTGGTC
CAGAGGGTTTTGGAGTCCTAAGCGTGTACGGCAGT
ACTGTTGGGCATACTATAATAGATTTGATGAGCAA
AAACTGCTGGGGGCTTCTCGGGCATTATTTACGAG
TTCTTATTCACGAACATATTTTAATTCATGGGGAT
ATCAGAAAAACAACGAAACTAAATATAGGAGGCAC
GGAAATAGAGGTTGAAACGCTCGTCGAAGACGAAT
CAGAGGCCGGCTCCGTGAATAAGGGAACTGGTAAA
ACTCCTGCTCGCTGGGTATGGATATCGCTTTACTA
CGCAGCATTTTACGTAGTTATGACTGGGCTTTTTG
CTTTGTGCATATACGTGCTAATGCAGACGATTATG
GCTGAGCTAATTTCATCTGCAACTAGATCCCTTTT
CGCGGCAGGAGGGATCAACCCCTGGCCCAATCCAT
ATCATCATGAAGATATGGGCTGTGGCGGTATGACC
CCAACTGGTGAGTGCTTTTCTACCGAATGGTGGTG
TGATCCGAGTTACGGTCTGTCAGATGCTGGGTATG
GTTATTGCTTTGTCGAAGCCACGGGGGGATACCTT
GTCGTCGGAGTAGAAAAAACAGGCCTGGCTCCA
TTCCCGGGGGACCCCAGGAGAGAAGATAGGGGCCC
AAGTTTGCCAGTGGATCGCATTTAGTATTGCGATC
GCATTACTGACATTCTATGTTTCTCAGCGTGGAA
GGCAACCTGCGGCTGGGAGGAGGTTTACGTATGCT
GTGTTGAGGTACTGTTCGTAACCCTTGAGATTTTC
AAAGAGTTTTCTTCCGGCGACGGTCTATCTCAG
TACCGGTAACCATGCATATTGTTACGGTTATTTCG
AATGGTTGCTTTCTTGCCCAGTGATTTTGATACGC
TTGAGTAATTTATCTGGCCTAAAGAACGACTATAG
CAAGCGAACCATGGGACTTATTGTATCTTGTGTTG
GCATGATAGTTTTTGGTATGGCAGCCGGGCTCGCC
ACTGACTGGCTGAAGTGGTTGCTCTATATAGTGAG

TABLE 03-continued

Amino acid and DNA sequences of Multi-Characteristics Opsin-1T (MCO1T). It contains additional trans-membrane sequence (TPARVVVWISLYYAAFYVVMTGL FALCIYVLMQTI) after 315 amino acid residues of MC01 (TABLE 01).

CTGTATTTATGGTGGCTACATGTACTTTCAGGCGG
CCAAGTGTTACGTTGAAGCAAACCATTCGGTACCT
AAAGGACATTGCCGTATGGTAGTTAAGCTGATGGC
GTATGCGTACTTCGCGAGCTGGGGCAGCTACCCCA
TTCTGTGGGCGGTGGGACCAGAGGGGTTACTTAAG
TTGTCGCCCTATGCTAATTCAATAGGCCATAGCAT
CTGTGAGATTATCGCGAAGGAATTTTGGACTTTCC
TAGCACATCACCTTCGAATTAAAATACACGAACAC
ATACTCATTCACGGGGACATACGCAAGACAACCAA
GATGGAAATCGGAGGTGAGGAAGTGGAAGTAGAGG
AGTTTGTAGAGGAGGAAGATGAGGACACGGTT
(SEQ ID NO: 6)

TABLE 04

Amino acid and DNA sequences of Multi-Characteristics Opsin-2T (MCO2T).
It contains additional trans-membrane sequence (TPARWVWISLYYAAFYVVMTGLFAL CIYVLMQTI) after 308 amino acid residues of MCO2 (TABLE 02).

Amino acid sequence:
MDYGGALSAVGRELLFVTNPVVVNGSVLVPEDQCY
CAGWIESRGTNGAQTASNVLQVVLAAGFSILLLMF
YAYQTVVKSTCGWEEIYVCAIEMVKVILEFFFEFK
NPSMLYLATGHRVQWLRYAEWLLTCPVILIHLSNL
TGLSNDYSRRTMGLLVSDIGTIVNGATSAMATGYV
KVIFFCLGLCYGANTFFHAAKAYIEGYHTVPKGRC
RQVVTGMAWLFFVSWGMPPILFILGPEGFGVLSVY
GSTVGHTIIDLMSKNCWGLLGHYLRVLIHENILIN
GDIRKTTKLNIGGTEIEVETLVEDESEAGSPARWV
WISLYYAAFYVVMTGLFALCIYVLMQTIMAELISS
ATRSLFAAGGINPWPNPYHHEDMGCGGMTPTGECF
STEVWWVCDPSYGLSDAGYGYCFVEATGGYLVVGVE
KKQAWLHSRGTPGEKIGAQVCQWIAFSIAIALLTF
YGFSAWKATCGWEEVYVCCVEVLFVTLEIFKEFSS
PATVYLSTGNHAYCLRYFEWLLSCPVILIRLSNLS
GLKNDYSKRTMGLIVSCVGMIVFGMAAGLATDWLK
WLLYIVSCIYGGYMYFQAAKCYVEANHSVPKGHCR
MVVKLMAYAYFASWGSYPILWAVGPEGLLKLSPYA
NSIGHSICEIIAKEFVVTFLAHHLRIKIHENILHG
DIRKTTKMEIGGEEVEVEEFVEEEDEDTV
(SEQ ID NO: 7)

Nucleotide Sequence:
ATGGACTATGGAGGAGCACTGTCAGCCGTTGGGAG
AGAGTTGTTGTTTGTTACCAATCCTGTAGTAGTCA
ATGGCAGTGTGCTTGTACCAGAGGATCAATGCTAC
TGTGCCGGGTGGATAGAGTCCCGGGGAACCAACGG
GGCACAAACTGCGAGTAACGTTCTGCAATGGCTAG
CAGCAGGCTTTAGCATACTGCTACTAATGTTCTAT
GCTTACCAAACATGGAAGTCGACTTGCGGGTGGGA
GGAGATATACGTCTGCGCAATTGAAATGGTCAAGG
TTATTCTCGAGTTCTTCTTCGAATTCAAAAACCCA
TCAATGTTATACTTAGCGACAGGACATCGAGTCCA
GTGGTTACGTTACGCCGAGTGGCTCCTGACGTGCC
CGGTAATTTTAATCCACCTCTCTAATTTGACCGGA
CTTTCCAATGATTACAGTCGAAGAACTATGGGCTA
TTAGTCTCTGACATCGGGACTATTGTCTGGGGTG
CGACTAGCGCTATGGCTACCGGGTATGTAAAAGTC
ATCTTCTTCTGTTTAGGACTGTGCTACGGCGCGAA
TACATTCTTTCACGCTGCGAAAGCTTATATTGAAG
GCTATCACACTGTACCTAAAGGTCGGTGTAGGCAG
GTCGTCACCGGTATGGCCGTGGTTGTTCTTCGTATC
ATGGGGAATGTTTCCAATCTTGTTTATACTAGGTC
CCGAAGGATTGGAGTGTTGTCCGTTTACGGATCA
ACAGTAGGCCACACTATTATCGATTTGATGTCTAA
AAACTGCTGGGGCTTTTAGGTCACTATCTAAGGG
TGCTCATTCATGAGCACATATTAATCCATGGCGAT

TABLE 04-continued

Amino acid and DNA sequences of Multi-Characteristics Opsin-2T (MCO2T).
It contains additional trans-membrane sequence (TPARWVWISLYYAAFYVVMTGLFAL CIYVLMQTI) after 308 amino acid residues of MCO2 (TABLE 02).

ATCAGAAAGACGACGAAACTGAATATTGGAGGCAC
TGAGATCGAAGTAGAGACGCTTGTCGAAGACGAAT
CCGAAGCTGGTAGCCCCGCACGCTGGGTCTGGATA
TCTTTGTACTATGCCGCCTTCTATGTTGTTATGAC
AGGACTCTTTGCTTTATGCATCTATGTCCTAATGC
AAACTATTATGGCTGAACTTATATCATCGGCAACA
AGGAGTTTATTTGCGGCTGGGGGAATAAATCCGTG
GCCCAACCCCTACCATCATGAAGTATGGGTTGCG
GCGGCATGACCCCGACAGGGGAATGCTTCTCGACG
GAGTGGTGGTGTGATCCTTCTTATGGACTGAGTGA
TGCTGGGTATGGCTATTGCTTCGTAGAGGCTACGG
GGGGGTACTTGGTCGTTGGAGTCGAGAAAAACAG
GCATGGTTACATAGCAGGGGGACTCCTGGAGAGAA
AATAGGTGCCCAGGTTTGTCAATGGATTGCTTTCT
CGATTGCAATAGCTCTGTTAACGTTCTATGGGTTC
TCCGCGTGGAAGGCTACTTGTGGCTGGGAAGAGGT
ATATGTTTGTTGTGTTGAAGTTCTATTTGTAACAC
TTGAGATATTTAAAGAATTTTCTTCACCCGCAACG
GTCTACTTAAGTACAGGCAATCATGCATACTGTCT
AAGATACTTCGAATGGCTCTTATCATGTCCGGTGA
TCTTAATTCGACTCTCGAACCTCTCTGGACTCAAG
AATGACTATAGTAAGAGGACTATGGGACTCATTGT
GTCGTGCGTTGGTATGATTGTGTTTGGTATGGCGG
CAGGGCTGGCTACGGACTGGCTAAAGTGGCTGCTA
TATATAGTGAGCTGTATCTATGGCGGTTACATGTA
TTTCCAGGCGGCCAAGTGTTATGTCGAGGCGAATC
ACTCGGTCCCCAAAGGTCATTGTCGGATGGTGGTC
AAGCTTATGGCGTACGCATATTTCGCCAGCTGGGG
ATCGTACCCGATACTTTGGGCCGTTGGCCCAGAAG
GGCTACTAAAGTTGAGCCCGTACGCCAATTCAATT
GGGCATAGTATCTGTGAGATAATTGCTAAGGAGTT
TTGGACGTTTTAGCTCACCATCTGAGAATTAAGA
TTCATGAGCACATCTTAATTCACGGGGATATCCGC
AAGACTACCAAGATGGAGATAGGTGGGAGGAGGT
GGAGGTAGAAGAGTTTGTAGAAGAAGAGGATGAAG
ATACTGTA (SEQ ID NO: 8)

TABLE 05

DNA sequences of promoter (mGluR6) used upstream of MCO-sequences for targeting specific cells as an example.

CAGGGNNGATTGATTATTGACTAGTGATCTCCAGA
TGGCTAAACTTTTAAATCATGAATGAAGTAGATAT
TACCAAATTGCTTTTTCAGCATCCATTTAGATAAT
CATGTTTTTTGCCTTTAATCTGTTAATGTAGTGAA
TTACAGAAATACATTTCCTAAATCATTACATCCCC
CAAATCGTTAATCTGCTAAAGTACA
(SEQ ID NO: 9)

TABLE 06

DNA sequences of reporter-stabilizer (mCherry) used downstream of MCO-sequences for confirming expression in specific cells as an example.

ATGGCCATCATCAAGGAGTTCATGCGCTTCAAGGT
GCACATGGAGGGCTCCGGAACGGCCCGAGTTCGAG
ATCGAGGGCGAGGGCGAGGGCCGCCCCTACGAGGG
CACCCAGACCGCCAAGCTGAAGGTGACCAAGGGTG
GCCCCCTGCCCTTCGCCTGGGACATCCTGTCCCCT
CAGTTCATGTACGGCTCCAAGGCCTACGTGAAGCA
CCCCGCCGACATCCCCGACTACTTGAAGCTGTCCT
TCCCCGAGGGCTTCAAGTGGGAGCGCGTGATGAAC
TTCGAGGACGGCGGCGTGGTGACCGTGACCCAGGA

TABLE 06-continued

DNA sequences of reporter-stabilizer (mCherry) used downstream of MCO-sequences for confirming expression in specific cells as an example.

CTCCTCCCTGCAGGACGGCGAGTTCATCTACAAGG
TGAAGCTGCGCGGCACCAACTTCCCCTCCGACGGC
CCCGTAATGCAGAAGAAGACCATGGGCTGGGAGGC
CTCCTCCGAGCGGATGTACCCCGAGGACGGCGCCC
TGAAGGGCGAGATCAAGCAGAGGCTGAAGCTGAAG
GACGGCGGCCACTACGACGCTGAGGTCAAGACCACC
TACAAGGCCAAGAAGCCCGTGCAGCTGCCCGGCGC
CTACAACGTCAACATCAAGTTGGACATCACCTCCC
ACAACGAGGACTACACCATCGTGGAACAGTACGAA
CGCGCCGAGGGCCGCCACTCCACCGGCGGCATGGA
CGAGCTGTACAAGTAA (SEQ ID NO: 10)

TABLE 07

Amino acid and DNA sequences of Enhanced Multi-Characteristics Opsin-1 (eMC01). It contains MC01 sequence (TABLE 01) and biomarker-stabilizer sequence (TABLE 06) with a linking sequence.
Amino acid sequence:

MDYGGALSAVGRELLFVTNPVVVNGSVLVPEDQCY
CAGWIESRGTNGAQTASNVLQVVLAAGFSILLLMF
YAYQTVVKSTCGWEEIYVCAIEMVKVILEFFFEFK
NPSMLYLATGHRVQWLRYAEWLLTCPVICIHLSNL
TGLSNDYSRRTMGLLVSDIGTIVWGATSAMATGYV
KVIFFCLGLCYGANTFFHAAKAYIEGYHTVPKGRC
RQVVTGMAWLFFVSWGMFPILFILGPEGFGVLSVY
GSTVGHTIIDLMSKNCWGLLGHYLRVLIHEHILIH
GDIRKTTKLNIGGTEIEVETLVEDEAEAGAVNKGT
GKMAELISSATRSLFAAGGINPWPNPYHHEDMGCG
GMTPTGECFSTEVVWVCDPSYGLSDAGYGYCFVEAT
GGYLVVGVEKKQAWLHSRGTPGEKIGAQVCQWIAF
SIAIALLTFYGFSAWKATCGWEEVYVCCVEVLFVT
LEIFKEFSSPATVYLSTGNHAYCLRYFEWLLSCPV
ILIRLSNLSGLKNDYSKRTMGLIVSCVGMIVFGMA
AGLATDWLKWLLYIVSCIYGGYMYFQAAKCYVEAN
HSVPKGHCRMVVKLMAYAYFASWGSYPILWAVGPE
GLLKLSPYANSIGHSICDIIAKEFVVTFLAHHLRI
KIHEHILIHGDIRKTTKMEIGGEEVEVEEFVEEED
EDTVVSKGEEDNMAIIKEFMRFKVHMEGSVNGHEF
EIEGEGEGRPYEGTQTAKLKVTKGGPLPFAWDILS
PQFMYGSKAYVKHPADIPDYLKLSFPEGFKWERVM
NFEDGGVVTVTQDSSLQDGEFIYKVKLRGTNFPSD
GPVMQKKTMGWEASSERMYPEDGALKGEIKQRLKL
KDGGHYDAEVKTTYKAKKPVQLPGAYNVNIKLDIT
SHNEDYTIVEQYERAEGRHSTGGMDELYK
(SEQ ID NO: 11)

Nucleotide sequence:
ATGGATTATGGCGGCGCGCTGAGCGCGGTGGGCCGC
GAACTGCTGTTTGTGACCAACCCGGTGGTGGTGAA
CGGCAGCGTGCTGGTGCCGGAAGATCAGTGCTATT
GCGCGGGCTGGATTGAAAGCCGCGGCACCAACGGC
GCGCAGACCGCGAGCAACGTGCTGCAGTGGCTGGC
GGCGGGCTTTAGCATTCTGCTGCTGATGTTTTATG
CGTATCAGACCGTGGAAAGCACCTGCGGCTGGGAA
GAAATTTATGTGTGCGCGATTGAAATGGTGAAAGT
GATTCTGGAATTTTTTTTTGAATTTAAAAACCCGA
GCATGCTGTATCTGGCGACCGGCCATCGCGTGCAG
TGGCTGCGCTATGCGGAATGGCTGCTGACCTGCCC
GGTGATTTGCATTCATCTGAGCAACCTGACCGGCC
TGAGCAACGATTATAGCCGCCGCACCATGGGCCTG
CTGGTGAGCGATATTGGCACCATTGTGTGGGGCGG
GACCAGCGCGATGGCGACCGGCTATGTGAAAGTGA
TTTTTTTTTGCCTGGGCCTGTGCTATGGCGCGAAC
ACCTTTTTTCATGCGGCGAAAGCGTATATTGAAGG
CTATCATACCGTGCCGAAAGGCCGCTGCCGCCAGG
TGGTGACCGGCATGGCGTGGCTGTTTTTTGTGAGC
TGGGGCATGTTTCCGATTCTGTTTATTCTGGGCCC
GGAAGGCTTTGGCGTGCTGAGCGTGTATGGCAGCA
CCGTGGGCCATACCATTATTGATCTGATGAGCAAA TABLE 07-continued Amino acid and DNA sequences of Enhanced Multi-Characteristics Opsin-1 (eMC01). It contains MC01 sequence (TABLE 01) and biomarker-stabilizer sequence (TABLE 06) with a linking sequence.
Amino acid sequence:

AACTGCTGGGGCCTGCTGGGCCATTATCTGCGCGT
GCTGATTCATGAACATATTCTGATTCATGGCGATA
TTCGCAAAACCACCAAACTGAACATTGGCGGCACC
GAAATTGAAGTGGAAACCCTGGTGGAAGATGAAGC
GGAAGCGGGCGCGGTGAACAAAGGCACCGGCAAA
TGGCTGAGCTGATCAGCAGCGCCACCAGATCTCTG
TTTGCCGCCGGAGGCATCAACCCTTGGCCTAACCC
CTACCACCACGAGGACATGGGCTGTGGAGGAATGA
CACCTACAGGCGAGTGCTTCAGCACCGAGTGGTGG
TGTGACCCTTCTTACGGACTGAGCGACGCCGGATA
CGGATATTGCTTCGTGGAGGCCACAGGCGGCTACC
TGGTCGTGGGAGTGGAGAAGAAGCAGGCTTGGCTG
CACAGCAGAGGCACACCAGGAGAAAAGATCGGCGC
CCAGGTCTGCCAGTGGATTGCTTTCAGCATCGCCA
TCGCCCTGCTGACATTCTACGGCTTCAGCGCCTGG
AAGGCCACTTGCGGTTGGGAGGAGGTCTACGTCTG
TTGCGTCGAGGTGCTGTTCGTGACCCTGGAGATCT
TCAAGGAGTTCAGCAGCCCCGCCACAGTGTACCTG
TCTACCGGCAACCACGCCTATTGCCTGCGCTACTT
CGAGTGGCTGCTGTCTTGCCCCGTGATCCTGATCA
GACTGAGCAACCTGAGCGGCCTGAAGAACGACTAC
AGCAAGCGGACCATGGGCCTGATCGTGTCTTGCGT
GGGAATGATCGTGTTCGGCATGGCCGCAGGACTGG
CTACCGATTGGCTCAAGTGGCTGCTGTATATCGTG
TCTTGCATCTACGGCGGCTACATGTACTTCCAGGC
CGCCAAGTGCTACGTGGAAGCCAACCACAGCGTGC
CTAAAGGCCATTGCCGCATGGTCGTGAAGCTGATG
GCCTACGCTTACTTCGCCTCTTGGGGCAGCTACCC
AATCCTCTGGGCAGTGGGACCAGAAGGACTGCTGA
AGCTGAGCCCTTACGCCAACAGCATCGGCCACAGC
ATCTGCGACATCATCGCCAAGGAGTTTTGGACCTT
CCTGGCCCACCACCTTGAGGATCAAGATCCACGAGC
ACATCCTGATCCACGGCGACATCCGGAAGACCACC
AAGATGGAGATCGGAGGCGAGGAGGTGGAAGTGGA
AGAGTTCGTGGAGGAGGAGGACGAGGACAGTGG
TGAGCAAGGGCGAGGAGGATAACATGGCCATCATC
AAGGAGTTCATGCGCTTCAAGGTGCACATGGAGGG
CTCCGTGAACGGCCACGAGTTCGAGATCGAGGGCG
AGGGCGAGGGCCGCCCCTACGAGGCACCCAGACC
GCCAAGCTGAAGGTGACCAAGGGTGGCCCCCTGCC
CTTCGCCTGGGACATCCTGTCCCCTCAGTTCATGT
ACGGCTCCAAGGCCTACGTGAAGCACCCCGCCGAC
ATCCCCGACTACTTGAAGCTGTCCTTCCCCGAGGG
CTTCAAGTGGGAGCGCGTGATGAACTTCGAGGACG
GCGGCGTGGTGACCGTGACCCAGGACTCCTCCCTG
CAGGACGGCGAGTTCATCTACAAGGTGAAGCTGCG
CGGCACCAACTTCCCCTCCGACGGCCCCGTAATGC
AGAAGAAGACCATGGGCTGGGAGGCCTCCTCCGAG
CGGATGTACCCCGAGGACGGCGCCCTGAAGGGCGA
GATCAAGCAGAGGCTGAAGCTGAAGGACGGCGGCC
ACTACGACGCTGAGGTCAAGACCACCTACAAGGCC
AAGAAGCCCGTGCAGCTGCCCGGCGCCTACAACGT
CAACATCAAGTTGGACATCACCTCCCACAACGAGG
ACTACACCATCGTGGAACAGTACGAACGCGCCGAG
GGCCGCCACTCCACCGGCGGCATGGACGAGCTGTA
CAAGTAA (SEQ ID NO: 12)

TABLE-08

Comparison of stability of the MCO1 and eMCO1 based on secondary structure and folding using theoretical modeling by RaptorX.

| Protein | Alpha helix (%) | Beta sheet (%) | Random Coil (%) | Prediction of disordered region |
|---------|-----------------|----------------|-----------------|-------------------------------|
| MCO1    | 58              | 7              | 33              | 29 (4%) positions predicted as disordered |
| eMCO1   | 46              | 17             | 36              | 15 (1%) position predicted as disordered |

Example 15

Structure of eMCO1 and activation of its different domains by light is shown in FIG. 19. Blue light activates the trans-membrane (TM) domain (ion-channel) of eMCO1 allowing for the flow of cations. Green & Red light activates the non-TM, middle domain (non-ion channel) leading to its conformational change that result in the conformational change of the TM domain and thus, facilitate flow of cations via the TM-domain. Upon green light absorption, the C-terminus domain (enhancer) emits red light that enhances overall eMCO1 efficacy. These unique structures of eMCO1 allow for the activation of the eMCO1 even at a low level of light with a wavelength ranging from the blue to red spectrum in a fast and efficient manner. Patch clamp experiment (voltage clamp) on eMCO1 transfected HEK cells (transfected by JetPrime) was conducted under different stimulation wavelengths. FIG. 20A shows an inward current profile measured at a blue (450 nm) light intensity of 0.06 mW/mm$^2$ in HEK cells transfected with eMCO1. FIG. 20B shows an inward current profile measured at a green (520 nm) light intensity of 0.06 mW/mm$^2$ in HEK cell transfected with eMCO1. FIG. 20C shows an inward current profile measured at a red (630 nm) light intensity of 0.06 mW/mm$^2$ in HEK cell transfected with eMCO1. BAPTA (known calcium chelator) was added to the extracellular solution (final concentration up to 100 mM). FIG. 20D shows a reduced inward current profile measured at blue (450 nm) light intensity of 0.06 mW/mm$^2$ in HEK cells transfected with eMCO1, in presence of Ca$^{2+}$ chelator BAPTA. Comparison of photocurrent in cells generated by light of different wavelengths and the effect of the presence of a Ca$^{2+}$ chelator (BAPTA) on the eMCO transmembrane-domain function that was probed by blue (450 nm) light activation is shown in FIG. 20E. The fact that use of the BAPTA reduced the current by more than half at 450 nm means that the ratio of Ca$^{2+}$ permeability to other cation permeability is determined to be >1.

In addition to broad activation spectrum, specific ion conductivity, and light sensitivity, eMCO has fast ON and OFF-kinetics. FIG. 20F shows a quantitative comparison of photocurrent ON-time (time to the -ve peak from baseline) generated by the blue and green light. The ON-time of photocurrent measured in cell was ~4 times higher at 520 nm light stimulation as compared to that at 450 nm.

Example 16

To determine if eMCO1 sensitization of retinal bipolar cells could preserve their organization, a structural comparison of the retinal thickness before, and after intravitreal injection in rd mice was conducted using different doses of an AAV2 carried eMCO1 protein (vMCO1 vehicle), including AAV-vehicle (without eMCO1) using OCT based measurement. Group AA mice eyes were intravitreally injected with 1 µl of 1.0×10$^{12}$ VG/ml AAV2-eMCO; group BB mice eyes were injected by 1 µl of 1.0×10$^{12}$ VG/ml AAV2 (no transgene, -ve control). Another group CC mice were injected with 1 µl of low dose (1.0×10$^{10}$ VG/ml) AAV2-eMCO. FIG. 21A shows longitudinally measured retinal thickness of rd mice measured by SDOCT before and after different doses of AAV2-eMCO or AAV2-vehicle injection. The measurement of the retinal thickness from prior to injection, one day after injection and one and four months after injection for each group was carried out. A scattered plot showing the comparison of retinal thickness prior to injection, and 4 months after injection in the different groups is shown in FIG. 21B. FIG. 21C shows the mean difference of retinal-thickness between baseline and intravitreally-injected mice shown as a Gardner-Altman estimation plot. In the eMCO1 injected mice group (AA and CC), retina thickness was preserved over time compared to vehicle injected group (BB). The observed stable retina thickness in eMCO1 injected groups (as compared to vehicle injected group) can be attributed to stabilization of retina thickness by arresting further disorganization of the retinal layer(s).

Example 17

To determine if the synaptic spread of bipolar cells and/or connectivity between bipolar cells and retinal ganglion cells is enhanced due to eMCO1 sensitization of bipolar cells, immunostaining of the retinal section of rd10 mice after vMCO injection (intravitreally injected of 1 µl of vMCO1) was conducted. The expression of reporter mCherry in bipolar cells (INL) 16 weeks after AAV2-eMCO1 injection is shown in FIG. 22B. Quantification of eMCO1 (reporter mCherry) expression in bipolar cells of three rd10 mice is shown in FIG. 22C. FIG. 22D shows immunostained cross-sections of the retina showing Bipolar cell terminals (green: PKCa) co-stained with CtBP (a synaptic ribbon marker, red) in close contact with retinal ganglion cells (RGCs) in the eMCO injected rd10 mouse retina. FIG. 22E shows immunostained cross-sections of the retina showing Bipolar cell terminals (green: PKCa) co-stained with CtBP (a synaptic ribbon marker, red) in close contact with retinal ganglion cells (RGCs) in the untreated rd10 mouse retina. Stronger PKCa immunostained signal in axonal terminals (*p<0.05) and CtBP signal was found in the AAV2-eMCO1 treated rd10 mice retina compared to non-treated mice (FIG. 22F). The results show that though synaptic connections of bipolar cells with ganglion cells deteriorate in photoreceptor-degenerated retina, eMCO1 sensitization (and ambient light activation) enhanced the synaptic terminals allowing transmission of light activated signals from eMCO1 expressing bipolar cells to brain via retinal ganglion cell axons (the optic nerve).

Example 18

The gene agnostic therapeutic benefit of an eMCO1 was established by demonstrating improvement of the vision in retinal degenerated mice models for Retinitis pigmentosa (rd1, rd10), Stargardt (ABCA4-/-) and Lieber Congenital Amaurosis (LCA). Intravitreal injection of vMCO1 (1 µL of 3.5E12 vg/mL) lead to behavioral improvement of vision assayed by a radial water maze. FIG. 23A shows the time to reach the platform by the Stargardt (ABCA4-/-) mice from side-arms of the radial-arm water maze (light intensity: 0.004 mW/mm$^2$) before and after AAV2 (no transgene, -ve control) injection. In the absence of the transgene (eMCO), there was no statistical difference before and after AAV2-vehicle injection. However, after injection with AAV2-eMCO, the latency to find the lighted platform decreased significantly. FIG. 23B shows the time to reach the platform by the Stargardt (ABCA4-/-) mice from side-arms of the radial-arm water maze (light intensity: 0.004 mW/mm$^2$) before and after vMCO1 injection. Similar, behavioral efficacy results were obtained in an LCA mice model after vMCO1 injection (FIG. 23C and FIG. 23D). The vehicle (AAV2) injected LCA mice did now show improvement in the water maze (FIG. 23C). However, the time taken to reach the platform (latency) significant decreased in the vMCO1 treated LCA mice group compared to baseline (FIG. 23D).

Example 19

To determine if eMCO1 sensitization of bipolar cells could lead to electrophysiological recovery in addition to arresting degeneration and imparting light-sensitivity to the retina, the Stargardt mice were injected with AAV2-eMCO. Arresting of further retinal degeneration in Stargardt mice model is demonstrated by longitudinal monitoring of retina thickness in Stargardt (ABCA4−/−) mice after vMCO1 injection using SDOCT. For comparison, a separate mouse group that was not treated was followed up longitudinally. Comparison of retinal thickness before, Week 4, 12 and 16 after vMCO1 injection found that the retinal thickness does not decrease significantly over time (further degeneration is arrested). In contrast, in the non-treated mouse group, the retinal thickness decreased significantly with progression of time as shown in FIG. 24A. An electroretinogram (ERG) study conducted on vMCO1 treated Stargardt mice found an enhanced ERG response at 1 cds/m$^2$ and 10 cd s/m$^2$ compared to a vehicle injected mouse group (FIG. 24B and FIG. 24C). Both the SDOCT and ERG measurement demonstrated the therapeutic benefit (arresting of further retinal degeneration as well as improved light sensitivity) of eMCO treatment for vision restoration.

Example 20

FIG. 25 illustrates a method of vison restoration via intraocular AAV2-eMCO administration. As the retina (100) degenerates, the retinal ganglion cells (110) and bipolar cells (120) survive. Further, the photoreceptors (130) and/or retinal pigment epithelium (140) are mutated or lost (150). In those retinal degenerated subjects, via use of a delivery device (160), AAV-carried eMCO (vMCO1) (170) is delivered intraocularly. As evidenced in our animal and human studies, the vMCO1 propagates via the Optic nerve (180), Optic tract (190) and Optic Chiasm (200) to get transferred to the contralateral eye (210). This contralaterally-transferred AAV-eMCO transduces retinal cells (220). With a natural scene in the visual field or projected patterns to retina (230) activates bipolar cells (240), which in turn activates the retinal ganglion cells (250). The electro-chemical signal (260) is transmitted via the optic nerve to the brain (270) for visual processing of light-activated signal received from eMCO1-sensitized retina.

Example 21

This example demonstrates that an AAV that includes a gene that codes for an eMCO1 that is injected intravitreal is capable of contralateral transfer. An eMCO1 gene expressed in the retina subsequent to an intravitreal injection in a mouse was observed in the injected as well as the contralateral eye (FIGS. 26 A: Injected eye and 26B: Contralateral eye). The transfer of vMCO1 from the injected eye to the non-injected eye was also observed in rd10 mice wherein the expression of eMCO1 (reporter mCherry) expression was observed in both the injected and the non-injected eye after 6 month of injection. The contralateral vMCO1-010 transfer after intravitreal injection was also identified in dogs 4 months after each received a uniocular injection (75 µl of 2E11 VG/ml AAV2-eMCO). This was measured in the dogs by immunofluorescence of the transgene (eMCO with mCherry enhancer/reporter) (FIG. 26C: injected eye, FIG. 26D: Contralateral eye). Further, qPCR was performed to quantify the presence of vMCO1 vector copies. FIG. 26E shows the measured vector copy numbers in left/right optic nerves, optic chiasm and left/right LGN in treated dogs that were intravitreally injected with vMCO1 in the right eye (only). The data indicates contralateral transport of vMCO1 via optic nerve and optic chiasm.

Example 22

To determine if uniocular injection of vMCO1 will lead to contralateral transfer (as seen in animals) in humans, subjects with advanced retinal pigmentosa were injected with vMCO1 through a single intravitreal injection in the eye that had the greater impaired vision (the eye with the greater reduction in sight). For the evaluation of eMCO1 expression in the subjects after vMCO1 injection, visualization of the reporter (mCherry) fluorescence was carried out by Fundus Autofluorescence imaging through a red filter using a Topcon Triton Plus imaging system. As shown in FIG. 27A, the reporter fluorescence increased in the injected eye. Similarly, the contralateral eye elicited higher reporter fluorescence intensity eight weeks after vMCO1 injection in the other eye. Besides an increase in diffused fluorescence in the fundus, patches and speckles of fluorescence were visible (FIG. 27A, FIG. 27B). To examine if eMCO1 expression in a retina leads to arrest of further retinal degeneration in retinitis pigmentosa patients, longitudinal monitoring of retinal thickness in injected and contralateral eyes by OCT imaging was conducted before and after injection of vMCO1 was carried out. Longitudinally monitoring of retinal thickness in injected and contralateral eyes was carried out by OCT imaging and quantified (FIG. 27C). Measured average retinal thickness did not change after vMCO1 injection. No significant change in retina thickness was observed even at 52 weeks with respect to baseline, implying arrest/slowdown of the degeneration process.

Example 23

To determine vision restoration by vMCO1 in humans, 11 subjects with advanced retinal pigmentosa were injected with 1.75E11 vg/eye (in low dose group n=3) and 3.5E11 vg/eye (in high dose, n=8) through a single intravitreal injection in worse seeing eye. The mean visual acuity value of injected eyes in the high-dose group showed >0.68 logMAR improvement as compared to 0.1 logMAR improvement in the low-dose group 16 weeks after injection. Remarkably, at 16 weeks after injection, 7 out of these 8 subjects demonstrated >0.3 logMAR gain (with respect to baseline) and 6 out of 8 high-dose subjects showed >0.6 logMAR gain. FIG. 28 shows longitudinally monitored Visual Acuity (LogMAR) in vMCO1 injected (3.5E11 vg) and contralateral eyes of patients with severe retinal degeneration. As can be seen, the intravitreal injection of AAV2-eMCO in humans also led to improvement of vision in contralateral eyes. The mean improvement in the logMAR acuity value in high-dose contralateral eyes was found to be 0.34 logMAR at 16 weeks as compared to 0.68 logMAR in the injected eyes (FIG. 28).

Example 24

To determine if opsin sensitization and optogenetic stimulation of retinal ganglion cells would enable axonal regeneration leading to vision restoration, visually guided behavior in mice during baseline and after optic nerve crush was examined in two different groups: (i) without optogenetic stimulation and (ii) with optogenetic stimulation. FIG. 29A shows the Schematic of Visually-guided Y-mobility assay to evaluate vision in mice. FIG. 29B shows the Number of events (finding Light ON vs. OFF) by mice for different conditions. 6 trials per conditions were conducted. In Baseline (No optic nerve crush) measurements, the number of mice finding the light ON (+Light) panel of the Y-maze is significantly higher than the event of finding light OFF (−Light) panel. With optic nerve crush (ON crush), the number of events of finding light ON and OFF are same. After optic nerve crush, the mice were exposed to strobe (0.5 Hz) light (Philips Hue) stimulation (8 hours/day). 2 weeks after strobe light stimulation in optic nerve crush animals, improved visually-guided behavior of mice toward light ON panel was observed, similar to baseline (prior to ON crush) behavior. This implied that optogenetic stimulation of opsin-sensitized retinal ganglion cells led to regeneration of the degenerated (by ON crush) axons, which led to vision restoration.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a molecule or method that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements but is not limited to possessing only those elements. Likewise, a method that "comprises," "has," "includes" or "contains" one or more steps possesses those one or more steps but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Below, the presently disclosed invention will be further described by way of examples, which are provided for illustrative purposes only and accordingly are not to be construed as limiting the scope of the invention.

Some references, which may include publications, patents, and patent applications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference were individually incorporated by reference.

The specification and examples herein provide a complete description of the structure and use of illustrative embodiments. Although certain embodiments have been described with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

Furthermore, the claims are not intended to include, and should not be interpreted to include, means-plus-or step-plus-function limitations, unless such a limitation is explicitly recited in a given claim using the phrase(s) "means for" or "step for," respectively.

To the extent that any specific disclosure in the references or other literature may be considered to anticipate any generic aspect of the present invention, the disclosure of the present invention should be understood to include a proviso or provisos that exclude of disclaim any such species that were previously disclosed. The aspects of the present invention, which are not anticipated by the disclosure of such literature, are also nonobvious from the disclosure of these publications, due at least in part to the unexpectedly superior results disclosed herein.

What is claimed is:

1. A method to restore the vision of a patient suffering from a retinal dystrophy or a retinal degeneration, wherein a vector that encodes an amino acid sequence having 75%, 85%, 95% or 100% identity to SEQ ID NO: 1 is administered to the patient suffering from the retinal degeneration or retinal dystrophy.

2. The method of claim 1, wherein the amino acid sequence comprises a sequence of an eMCO protein that is comprised of a blue light-sensitive transmembrane ion-channel domain, which is attached to a ligand, a non-transmembrane domain, wherein the ligand attached to the transmembrane domain of the MCO protein provides greater sensitivity to a green light and a red light.

3. The method of claim 2, wherein the MCO protein has enhanced calcium ion permeability as compared to the permeability of an MCO protein with other cations.

4. The method of claim 2, wherein the greater light sensitivity of the MCO protein is due to the attached ligand domain.

5. The method of claim 1, wherein the method is to arrest a retinal degeneration or retinal dystrophy by administering to a patient in need thereof, a vector that encodes an amino acid sequence whose coding region has a 75%, 85%, 95% or 100% identity to SEQ ID NO: 1.

6. A method to restore the vision of a patient suffering from a retinal dystrophy or a retinal degeneration, wherein a vector that encodes an amino acid sequence having 75%, 85%, 95% or 100% identity to SEQ ID NO: 3 is administered to the patient suffering from the retinal degeneration or retinal dystrophy.

7. The method of claim 6, wherein the vector is administered into the eye by one or both of a chemical or physical transduction method.

8. The method of claim 6, wherein prior to administration the vector, the internal limiting membrane is peeled back.

9. The method of claim 6, wherein administration of the vector results in localized expression of an MCO amino acid sequence that targets retinal degenerated regions of a retina.

10. The method of claim 6, wherein following administration of the vector comprising an MCO amino acid sequence, the patient experiences improvement in visually guided behavioral improvement.

11. The method of claim 6, wherein the vector comprising the MCO amino acid sequence is administered two or more times to the patient.

12. The method of claim 1, wherein the expression of the amino acid sequence in cells that results in light activation leads to improved structural organization and cellular connectivity in targeted tissue.

13. The method of claim 6, wherein the method for restoration of vision is through the regeneration of a damaged retinal ganglion cell (RGC) axons in a patient in need thereof.

14. A method to restore the vision of a patient suffering from a retinal dystrophy or a retinal degeneration, wherein a vector that encodes an amino acid sequence having 75%, 85%, 95% or 100% identity to SEQ ID NO: 11 is administered to the patient suffering from retinal degeneration or retinal dystrophy.

15. The method of claim 6, wherein the amino acid sequence comprises a sequence of a MCO protein that is comprised of a blue light-sensitive transmembrane ion-channel domain, which is attached to a ligand, a non-transmembrane domain, and an enhancer that has a fluorescence reporter and stabilizer activity, wherein the ligand attached to the transmembrane domain of the MCO protein provides greater sensitivity to a green light and a red light.

16. The method of claim 6, wherein an MCO protein encoded by the amino acid sequence has enhanced calcium ion permeability as compared to the permeability of an MCO protein with other cations.

17. The method of claim 15, wherein the greater light sensitivity of the MCO protein encoded by the amino acid sequence is due to the attached ligand domain.

18. The method of claim 6, wherein the method is to arrest a retinal degeneration or retinal dystrophy by administering to a patient in need thereof, a vector that encodes an amino acid sequence whose coding region has a 75%, 85%, 95% or 100% identity to SEQ ID NO: 3.

19. The method of claim 14, wherein the amino acid comprises a sequence of an MCO protein that is comprised of a blue light-sensitive transmembrane ion-channel domain, which is attached to a ligand, a non-transmembrane domain, and an enhancer that has a fluorescence reporter and stabilizer activity, wherein the ligand attached to the transmembrane domain of the MCO protein provides greater sensitivity to a green light and a red light.

20. The method of claim 14, wherein an MCO protein encoded by the amino acid has enhanced calcium ion permeability as compared to the permeability of an MCO protein with other cations.

21. The method of claim 19, wherein the greater light sensitivity of the MCO protein is due to the attached ligand domain.

22. The method of claim 14, wherein the method is to arrest a retinal degeneration or retinal dystrophy by administering to a patient in need thereof, a vector that encodes an amino acid sequence whose coding region has a 75%, 85%, 95% or 100% identity to SEQ ID NO: 11.

23. The method of claim 14, wherein the vector comprising a vector that is administered into the eye by one or both of a chemical or physical transduction method.

24. The method of claim 14, wherein prior to administration the vector comprising an MCO gene into the eye, the internal limiting membrane is peeled back.

25. The method of claim 14, wherein administration of the vector comprising an amino acid sequence that encodes an MCO protein results in localized expression of the MCO1 in targeted retinal degenerated regions of a retina.

26. The method of claim 14, wherein following administration of the vector comprising an amino acid sequence that encodes an MCO protein, the patient experiences improvement in visually guided behavioral improvement.

27. The method of claim 14, wherein the vector comprising an amino acid sequence that encodes an MCO protein is administered two or more times to the patient.

28. The method of claim 14, wherein the expression of an amino acid sequence that encodes an MCO protein in cells and separately, light activation, leads to improved structural organization and cellular connectivity in targeted tissue.

29. The method of claim 14, wherein the method for restoration of vision is through the regeneration of the damaged retinal ganglion cell (RGC) axons in a patient in need thereof, wherein the patient is administered a vector that encodes an amino acid sequence having 75%, 85%, 95% or 100% identity to SEQ ID NO: 11.

30. The method of claim 14, wherein the administration of the vector to a retinal degenerated eye results in expression of a transgene having 75%, 85%, 95% or 100% identity to SEQ ID NO: 11 in a non-administered eye.

31. The method of claim 14, wherein the improvement in retinal function and visual behavior is observed in both an administration eye and a non-administered eye.

32. The method of claim 1, wherein administration of the vector results in maintenance of the retinal thickness of a patient's eye.

33. The method of claim 6, wherein administration of the vector results in maintenance of the retinal thickness of a patient's eye.

34. The method of claim 14, wherein administration of the vector results in maintenance of the retinal thickness of the patient's eye.

* * * * *